United States Patent
Kamijima et al.

(10) Patent No.: US 7,401,926 B2
(45) Date of Patent: *Jul. 22, 2008

(54) SPACE LIGHT MODULATING APPARATUS, PROJECTOR INCLUDING SAME, PROCESS FOR MANUFACTURING MICROSTRUCTURE ELEMENT USED IN SAME, AND MICROSTRUCTURE ELEMENT MANUFACTURED BY THE SAME PROCESS

(75) Inventors: Shunji Kamijima, Hara-mura (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/806,953

(22) Filed: Jun. 5, 2007

(65) Prior Publication Data

US 2007/0236670 A1 Oct. 11, 2007

Related U.S. Application Data

(62) Division of application No. 10/793,866, filed on Mar. 8, 2004, now Pat. No. 7,242,444.

(30) Foreign Application Priority Data

| Mar. 28, 2003 | (JP) | 2003-091327 |
| Jul. 18, 2003 | (JP) | 2003-199462 |
| Dec. 5, 2003 | (JP) | 2003-407318 |

(51) Int. Cl.
*G03B 21/00* (2006.01)
*G03B 21/14* (2006.01)
*G03B 21/28* (2006.01)
*G02B 27/10* (2006.01)
*G02F 1/1333* (2006.01)

(52) U.S. Cl. .............. 353/31; 353/33; 353/38; 353/81; 353/122; 359/619; 359/625; 349/5; 349/56; 349/95

(58) Field of Classification Search ............. 353/24, 353/30, 31, 34, 94, 102, 121, 122, 33, 84; 362/600–634; 385/146; 359/619, 625; 349/5, 349/110, 61, 62, 66, 56, 95

See application file for complete search history.

(56) References Cited

U.S. PATENT DOCUMENTS 5,151,801 A 9/1992 Hiroshima (Continued)

FOREIGN PATENT DOCUMENTS

EP 0 758 100 A2 12/1997

(Continued)

*Primary Examiner*—Melissa Jan Koval
(74) *Attorney, Agent, or Firm*—Oliff & Berridge, PLC

(57) ABSTRACT

A space light modulating apparatus includes a modulating unit that modulates incident light based on an image signal including a plurality of pixels and a light-shielding part placed between the pixels, and a refracting unit that refracts modulated light including a group of prisms formed with a prism element that has at least a refracting surface. Light from the pixels is incident on at least a part of the prisms, and a direction of the refracting surface is such that a projection image of the pixels is guided onto a projection image of the light-shielding part on a projection surface at a predetermined distance. The refracting surface and a reference surface formed in a direction perpendicular to an optical axis make a predetermined angle.

13 Claims, 40 Drawing Sheets

U.S. PATENT DOCUMENTS

| | | | |
|---|---|---|---|
| 5,423,713 A | 6/1995 | Mishima | |
| 5,506,786 A | 4/1996 | Itoh et al. | |
| 5,621,487 A | 4/1997 | Shirochi | 349/112 |
| 5,833,517 A | 11/1998 | Konda et al. | |
| 6,104,446 A * | 8/2000 | Blankenbecler et al. | 349/5 |
| 6,252,412 B1 | 6/2001 | Talbot et al. | |
| 6,254,237 B1 | 7/2001 | Booth | |
| 6,692,133 B2 * | 2/2004 | Katsu et al. | 362/620 |
| 6,738,118 B2 | 5/2004 | Hwang et al. | |
| 6,859,326 B2 | 2/2005 | Sales | |
| 6,869,190 B2 * | 3/2005 | Goto et al. | 353/85 |
| 6,981,773 B2 * | 1/2006 | Kamijima et al. | 353/81 |
| 7,040,796 B2 * | 5/2006 | Sugiura et al. | 362/608 |
| 7,113,341 B2 * | 9/2006 | Kamijima | 359/619 |
| 7,202,896 B2 * | 4/2007 | Wako et al. | 348/277 |
| 2003/0028407 A1 | 2/2003 | Ibaraki et al. | |
| 2005/0078278 A1 | 4/2005 | Uehara et al. | |
| 2005/0225693 A1 | 10/2005 | Kamijima | |

FOREIGN PATENT DOCUMENTS

| | | |
|---|---|---|
| JP | A-60-241024 | 11/1985 |
| JP | U-1-81687 | 5/1989 |
| JP | U-1-81688 | 5/1989 |
| JP | U-1-85781 | 6/1989 |
| JP | U-5-50426 | 7/1993 |
| JP | A-6-3642 | 1/1994 |
| JP | A-6-130356 | 5/1994 |
| JP | A-6-130378 | 5/1994 |
| JP | A-5-34677 | 2/1996 |
| JP | A-8-122709 | 5/1996 |
| JP | A-8-129168 | 5/1996 |
| JP | A-9-113928 | 5/1997 |
| JP | A-2002-22914 | 1/2002 |
| JP | A-2003-511735 | 3/2003 |
| KR | A-2002-0037289 | 5/2002 |

* cited by examiner

INCIDENT LIGHT

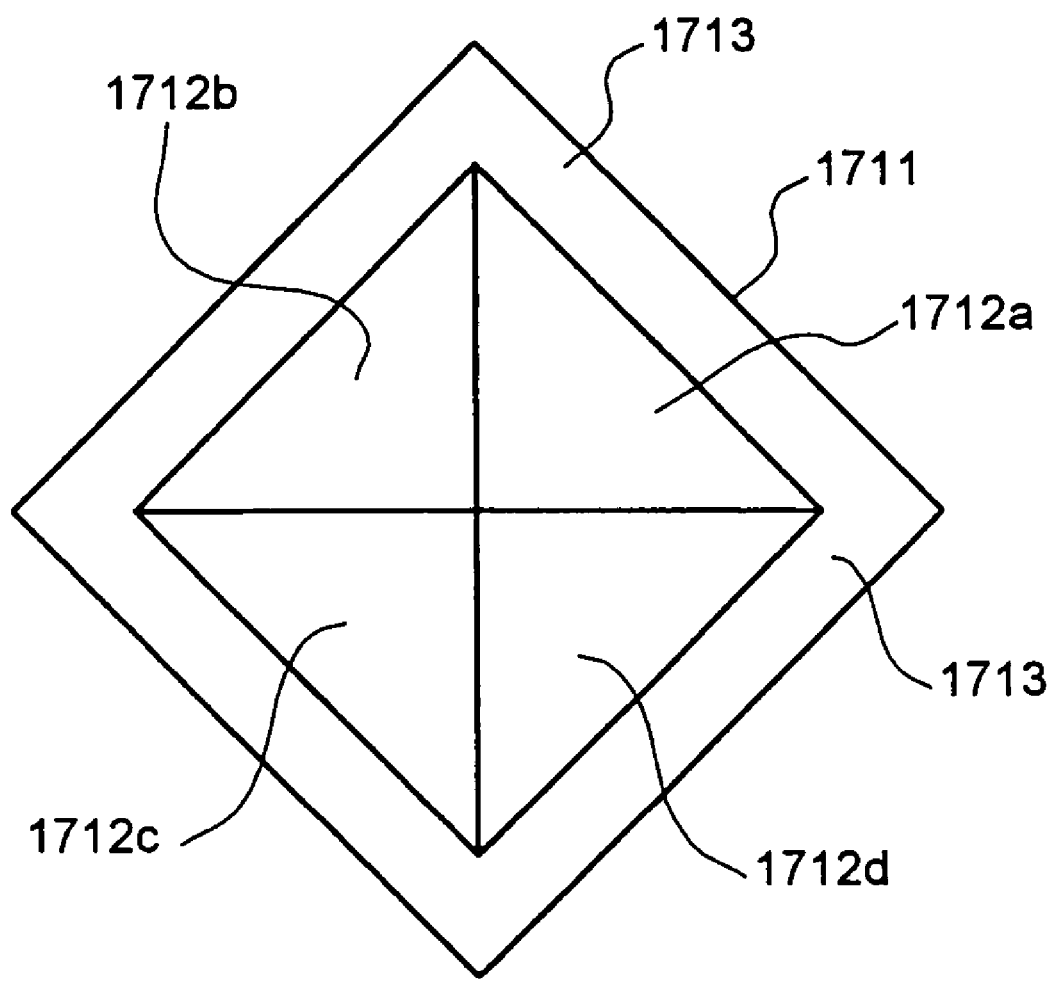

OUTPUT LIGHT

R-LIGHT
INCIDENT LIGHT

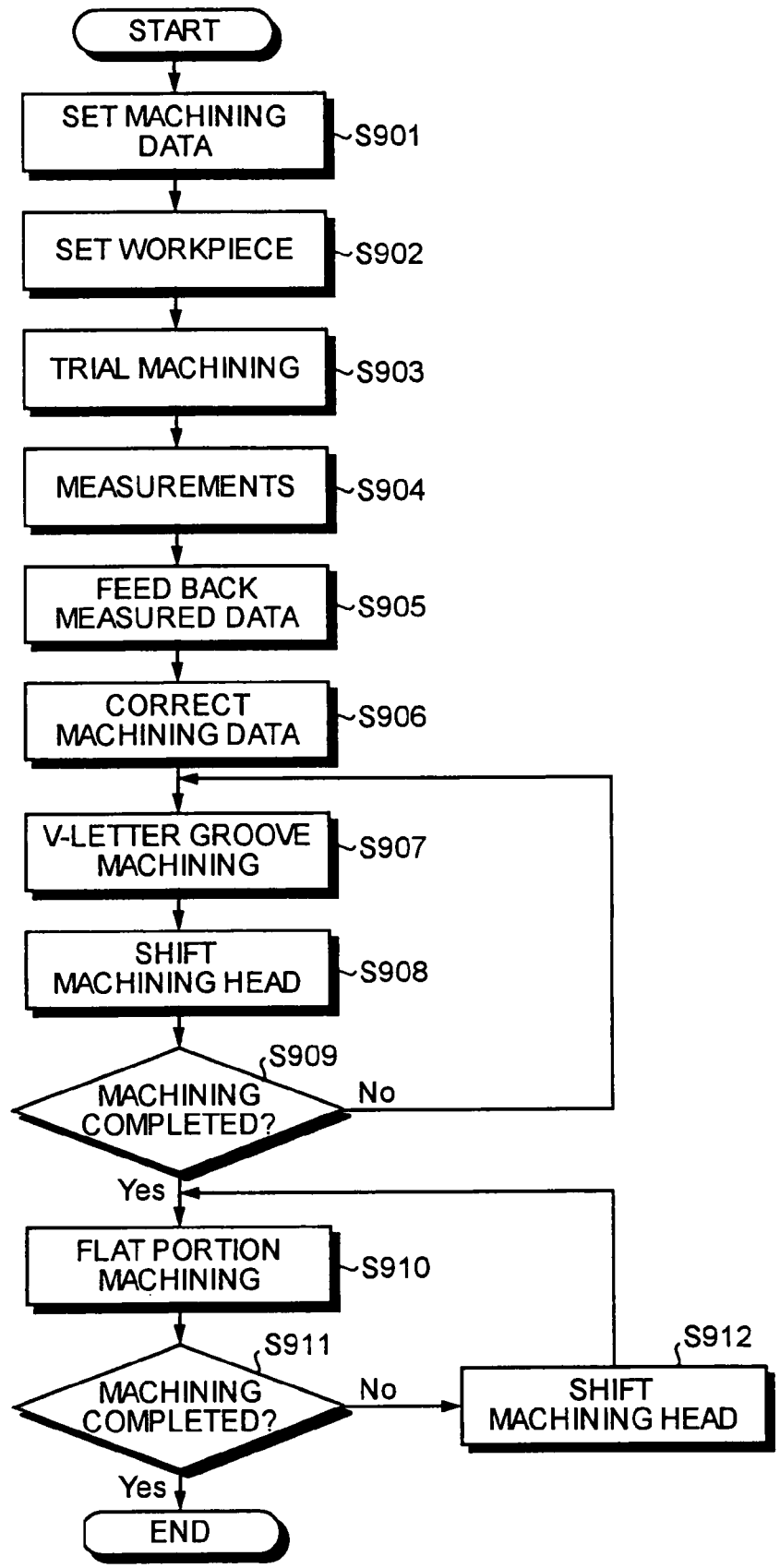

SPACE LIGHT MODULATING APPARATUS, PROJECTOR INCLUDING SAME, PROCESS FOR MANUFACTURING MICROSTRUCTURE ELEMENT USED IN SAME, AND MICROSTRUCTURE ELEMENT MANUFACTURED BY THE SAME PROCESS

CROSS-REFERENCE TO RELATED APPLICATIONS

This is a Division of application Ser. No. 10/793,866, filed Mar. 8, 2004, which is based upon and claims the benefit of priority from the prior Japanese Patent Applications No. 2003-091327 filed on Mar. 28, 2003, No. 2003-199462 filed on Jul. 18, 2003 and No. 2003-407318 filed on Dec. 5, 2003. The disclosures of the prior applications are hereby incorporated by reference herein in their entirety.

BACKGROUND

The present invention relates to a space light modulating apparatus, a process for manufacturing a microstructure element used in the space light modulating apparatus, a microstructure element manufactured by the process, and a projector including the space light modulating apparatus, and more particularly, to a liquid crystal space light modulating apparatus.

A dot-matrix image display is one of the popular image displays currently in use, such as a liquid crystal panel (liquid crystal display), a cathode ray tube (CRT) display, and a plasma display. The dot-matrix image display represents an image by using a number of pixels that are two-dimensionally arranged in a cyclic manner. In this case, so-called sampling noise tends to occur due to the cyclic alignment structure, resulting in degradation in the image quality (images with a rough texture). A method to reduce such degradation in the image quality is disclosed in, for example, Japanese Patent Application Laid-Open Publication No. 8-122709.

In the dot-matrix image display, a light-shielding part, referred to as a black matrix, is formed in an area between pixels to reduce unnecessary light. However, in recent years, the application mode of the image display has been increasing cases in which people watch a large screen from a comparatively short distance. For this reason, the viewers sometimes recognize an image of the black matrix. Consequently, the conventional dot-matrix image display offers an image of deteriorated image quality, such as an image with less smoothness or rough texture, because of the black matrix image. The technology described in the above patent document can hardly reduce the degradation in the image quality due to the black matrix image.

A method to prevent the viewer from recognizing a light-shielding area such as the black matrix is to input light from an image display onto a group of prisms. The flat portion of the prisms transmits the light from the image display as it is. Refracting surfaces of the prisms refract the light from the image display. The light passed through the prisms generates lights that are deflected by the refracting surfaces of the prisms in addition to lights that proceeded straight through the flat portion. The lights deflected form a pixel image on the black matrix, making it possible to reduce recognition of the black matrix.

Each of prism elements that constitute the group of prisms is formed into a fine shape in micrometers. In conventional technologies, the prism element is manufactured by carrying out a cutting process on a predetermined area. In this case, even with the same machining data, it is difficult to repeatedly form prism elements having a desired shape within the predetermined area for the following three reasons. Firstly, repetitive positioning accuracy of a cutting machine for the cutting process is insufficient. When the repetitive positioning accuracy is insufficient, it becomes difficult to form the fine shape in a desired position. Secondly, a servo mechanism, which controls positioning of the machining device, is easily influenced by various disturbances such as temperature, atmospheric pressure, and vibration. The third reason is that it is difficult to adjust a positional relation between a cutting tool of the machining device and a workpiece with sub-micron precision, while the relative position inside the machining device itself is controlled in a nano-scale to allow machining processes with high precision.

For example, FIG. 39 is a cross-section of a workpiece with a flat plate on which fine V-shaped grooves are formed by a conventional technology. The machining process is started at position A of the flat plate 1300, and finished at position B. In this case, when the servo mechanism of the machining device is affected by any disturbance such as temperature, atmospheric pressure, or vibration, the surface of the machining side is formed into a curved surface as shown by a dot line 1301. Therefore, when the servo mechanism is affected by an external environment (disturbance), it becomes difficult to form a desired shape with sufficient precision. This kind of problem becomes more conspicuous when a fine-shape element has not a simple shape, but an irregular shape. Moreover, when manufacturing the fine-shape element, it is also difficult to carry out multiple machining processes at the same portion of the workpiece.

The present invention is to solve the above problems. The object of the present invention is to provide a space light modulating apparatus and a projector that provide smooth image quality without the light-shielding area, such as the black matrix, being recognized.

In addition, another object of the present invention is to provide a process for manufacturing a microstructure element with a desired fine-shape accurately independent of the external environment, a microstructure element manufactured by the process, a space light modulating apparatus employing the microstructure, and a projector employing the space light modulating apparatus.

SUMMARY

According to one aspect of the present invention, a space light modulating apparatus includes a modulating unit that modulates incident light based on an image signal, and outputs modulated light, and a refracting unit that is disposed on an output-side of the modulating unit, and refracts the light from the modulating unit. The modulating unit includes a plurality of pixels arranged in a matrix format, and a light-shielding part placed between the pixels. The refracting unit includes a group of prisms formed with a prism element that has at least a refracting surface. Light from one of the pixels is incident on at least a part of the group of prisms. A direction of the refracting surface is such that a projection image of the pixels is guided onto a projection image of the light-shielding part on a projection surface at a predetermined distance from the refracting unit. The refracting surface and a reference surface that is formed in a direction perpendicular to an optical axis make a predetermined angle.

With this arrangement, light released from a pixel is made incident on a group of prisms. The light incident on the group of prisms is refracted in the refracting surface of a prism element so that its light path is bent to a predetermined direction. At this time, the direction in which the light path is bent and the size thereof (refraction angle) can be controlled based upon the direction of the refracting surface and the angle made by the refracting surface and the reference face. In the present invention, a projection image of a pixel, formed by refracted light on a projection surface placed apart from the refracting unit by a predetermined distance, is directed onto a projection image of a light-shielding part. Consequently, on the projection surface located apart from the refracting unit by the predetermined distance, a projection image of the pixel is formed in a superposed manner in the region of projection image of the light-shielding part. Therefore, on the projection surface, the viewer is allowed to view an image that is smooth and free from roughened texture, without recognizing the light-shielding part.

Furthermore, according to an exemplary embodiment of the present invention, when an area of one prism element of the group of prisms is defined as a unit area, a ratio between an area of the refracting surface and the unit area corresponds to light intensity of the projection image of the pixels. Light released from a pixel is formed into divergence lights having a cone shape, and made incident on a group of prisms consisting of multiple prism elements. Here, among the divergence lights having a cone shape, the light that is made incident on one prism element is explained. The region area of one prism element is made to be a unit area that forms a standard. A value obtained by dividing the area of a specific refracting surface by the unit area, that is, an area ratio, corresponds to a ratio between quantity of incident light per unit area and quantity of light refracted by the specific refracting surface. Thus, the quantity of light to be refracted by a refracting surface can be controlled by properly setting the area of the refracting surface.

Moreover, according to an exemplary embodiment of the present invention, the pixels are in a substantially rectangle shape; the light-shielding part is in a band shaped having a predetermined width arranged in a lattice form; and the group of prisms is constituted by prism elements having a polygonal cone shape. In the general-use dot-matrix image display, pixels of the rectangle shape are arranged in a crisscross matrix form. Further, a light-shielding part such as a black matrix is placed in an area between the adjacent pixels. Here, when the prism element is made to be a polygonal cone shape, it becomes possible to set the direction of the refracting surface to various directions. Thus, the projection image of the pixel can be formed in various directions. Moreover, the angle and area of the refracting surface are also desirably set. Consequently, the position and the quantity of light of the projection image of the pixel can be controlled. Here, in addition to a cone shape With a polygonal bottom shape, "the polygonal cone shape" also includes a cone shape having a flat face portion near the apex of the cone shape.

Furthermore, according to an exemplary embodiment of the present invention, the group of prisms is constituted by prism elements having a virtually pyramid shape. By allowing the prism element to have a pyramid shape, it is possible to form the projection image of the pixel in the direction orthogonal to bottom sides of the prism element. Thus, when the pixel has the rectangle shape, it becomes possible to more efficiently form the projection image of the pixel in a superposed manner with respect to the projection image of the light-shielding part.

Moreover, according to an exemplary embodiment of the present invention, the pixels are in a substantially rectangle shape; the light-shielding part is in a band shaped having a predetermined width arranged in a lattice form; the group of prisms is constituted by two sets of prism elements that have a cross-section of a virtually trapezoidal shape in a first direction with a longitudinal direction in a second direction that is virtually perpendicular to the first direction; the two sets of prism elements are arranged in such a manner that the longitudinal directions are virtually at right angles to each other; and a slope of the trapezoidal shape corresponds to the refracting surface. The cross-sectional shape in the first direction of the prism element is set to a virtually trapezoidal shape. The slope of the trapezoidal shape serves as a refracting surface. For this reason, the projection image of the pixel derived from light refracted by the slope can be formed in a direction orthogonal to the length direction of the prism element. Moreover, in the present aspect, the length directions of two sets of prism elements are made virtually orthogonal to each other. With this arrangement, when the pixel has the rectangle shape, it becomes possible to more efficiently form the projection image of the pixel in a superposed manner with respect to the projection image of the light-shielding part on the periphery of the pixel.

Furthermore, according to an exemplary embodiment of the present invention, the refracting unit further includes a flat portion virtually parallel to a surface on which the pixels are formed; and light transmitted through or reflected on the flat portion from among the light from the pixels propagates substantially straight to form the projection image. Among lights from the pixel, a light, which is made incident on the refracting surface of the prism element, is refracted in accordance with the direction, angle and area of the refracting surface. Here, when one portion of the refracting surface forms a flat portion virtually in parallel with the face on which the pixel is formed, the light that is made incident on the flat portion is allowed to proceed straight and transmitted without being refracted. Hereinafter, in the present specification, the projection image of the pixel, formed by light that is allowed to proceed straight and transmitted through the flat portion is referred to as "direct transmission image," and the projection image of the pixel, formed by light that is transmitted and refracted by the prism is referred to as "refracted transmission image." By forming the direct transmission image of the pixel, a projection image of the pixel the light path of which is refracted can be formed in addition to the original projection image of the pixel.

With respect to the size of the prism element, prism elements that are assigned based upon not less than one area ratio are placed within a swallowing angle that is defined by illumination light or the F number of the projection lens, at a front position in the light advancing direction from a point at which the light-shielding part is located on the space modulating element so that it becomes possible to obtain a pixel that is formed with a light-quantity ratio that is assigned based upon areas between the direct transmission image and refracted transmission image.

Moreover, according to an exemplary embodiment of the present invention, the prism element has the direction of the refracting surface and the predetermined angle in such a manner that an intersection point of center lines of the projection image of the light-shielding part arranged in the lattice form is substantially coincident with one of corners of the projection image of the pixels. With this arrangement, the projection image of the pixel can be formed in all the area of the projection image of the light-shielding part in a superposed manner. Consequently, it becomes possible to obtain an image with smooth image quality.

Furthermore, according to an exemplary embodiment of the present invention, the prism element has the direction of the refracting surface and the predetermined angle in such a manner that at least parts of the projection images of adjacent pixels are overlapped on the projection image of the light-shielding part. With this arrangement, in an area in which projection images of adjacent pixels, for example, projection images of the first pixel and the second pixel adjacent to the first pixel are formed in a superposed manner, a new projection image of a third pixel is formed based upon image information from the first pixel and the second pixel. Consequently, it becomes possible to improve the density of the number of pixels to be projected.

Moreover, according to an exemplary embodiment of the present invention, the prism element has the direction of the refracting surface and the predetermined angle in such a manner that substantially entire areas of the projection images of adjacent pixels are overlapped on the projection image of the light-shielding part. With this arrangement, the projection images between the mutually adjacent pixels, that is, for example, the first pixel and the second pixel adjacent to the first pixel, are made virtually coincident with each other, and formed in a superposed manner. Consequently, a new projection image of a third pixel is formed more effectively based upon image information from the first pixel and the second pixel. Thus, it becomes possible to improve the density of the number of pixels to be projected.

Furthermore, according to an exemplary embodiment of the present invention, a sum of intensities of light from the flat portion on the projection surface PW0 and a sum of intensities of light through the refracting surface on the projection surface PW1 satisfy an inequality PW0≧PW1. The sum of the light intensities of a direct transmission image corresponds to the area of the flat portion. Moreover, the sum of the light intensities of a refracted transmission image corresponds to the area of the refracting surface. On the projection surface, the refracted transmission image is formed on the periphery of the direct transmission image. Here, when, with respect to one of the pixels, the sum of the light intensities of a refracted transmission image is greater than the sum of the light intensities of a direct transmission image, the viewer tends to recognize the resulting image as a double image such as a ghost image. For this reason, the image quality of the projected image deteriorates. In contrast, in the present aspect, the arrangement is made so as to satisfy PW0≧PW1. For this reason, the viewer is allowed to view an image that is seamless, smooth and less susceptible to roughened texture without recognizing a light-shielding part on the periphery of a direct transmission image that is the original projection image of the pixel. Moreover, in the present aspect, an inequality, PW0>PW1, is preferably satisfied. More preferably, an inequality, PW0>0.9×PW1, is satisfied. Thus, it becomes possible to more effectively prepare an image that, is seamless and less susceptible to roughened texture.

Moreover, according to an exemplary embodiment of the present invention, a first peak of intensity distribution of the projection images of the pixels formed by light from the flat portion is bigger than a second peak of intensity distribution of the projection images of the pixels formed by light through the refracting surface; and light intensity of an area between the first peak and the second peak corresponds to a predetermined intensity distribution curve. With this arrangement, the viewer is allowed to recognize an appropriate light-intensity distribution in an area between a direct transmission image and the adjacent direct transmission image. Consequently, the viewer is allowed to view an image that is smooth and less susceptible to roughened texture, and has a high resolution on appearance, without recognizing the light-shielding part.

According to another aspect of the present invention, a projector includes a light source that supplies a first-color light, a second-color light, and a third-color light, a first-color space light modulating apparatus that modulates the first-color light based on an image signal, a second-color space light modulating apparatus that modulates the second-color light based on the image signal, a third-color space light modulating apparatus that modulates the third-color light based on the image signal, a color-synthesizing optical system that synthesizes the first-color light, the second-color light, and the third-color light, modulated by the first-color space light modulating apparatus, the second-color space light modulating apparatus, and the third-color space light modulating apparatus, respectively, and a projection lens that projects light synthesized by the color-synthesizing optical system. The first-color space light modulating apparatus, the second-color space light modulating apparatus, and the third-color space light modulating apparatus are the space light modulating apparatus according to the one aspect of the present invention. In the case when a color separation optical system, which will be described later, is not installed, solid-state light-emitting elements, such as light-emitting diodes and semiconductor lasers, that respectively supply the first color light, second color light and third color light may be used as a light source.

With this arrangement, with respect to an image projected on a screen, a projection image of the pixel is formed on an area of a projection image of the light-shielding part in a superposed manner. Therefore, in the screen, the viewer is allowed to view an image that is smooth, and less susceptible to roughened texture, without recognizing an image of the light-shielding part.

Furthermore, according to an exemplary embodiment of the present invention, each of the first-color space light modulating apparatus, the second-color space light modulating apparatus, and the third-color space light modulating apparatus includes the refracting unit. The angle at which light is refracted by the refracting surface is dependent on the light wavelength. For example, when a plurality of lights having different wave-length ranges are made incident on the same refracting surface, refracted angles are different depending on the respective wave-length ranges. In the present aspect, the first-light-color-use space light modulating apparatus, the second-light-color-use space light modulating apparatus and the third-light-color-use space light modulating apparatus are respectively provided with the refracting units. Thus, the angle of the refracting surface that is suitable for each of wavelengths of the respective colors can be properly determined. Consequently, the projection image of the pixel can be accurately formed at a predetermined position.

Moreover, according to an exemplary embodiment of the present invention, the refracting unit is disposed on incident side or output-side of the color-synthesizing optical system. Instead of installing the refracting units for the respective light-color-use space light modulating apparatuses, one refracting unit may be installed on the incident side or the output-side of a color synthesizing optical system such as a cross dichroic prism. With this arrangement, since only one refracting unit is required, a simpler structure is achieved with reduced manufacturing costs. Although two examples have been given with respect to the layout position of the prism element, it has been confirmed that by placing it between the position of the black matrix layer and the image-forming screen or between the position of the black matrix layer and the visual image-forming point of the direct viewer, the same effects can be obtained.

Furthermore, according to an exemplary embodiment of the present invention, the projector further includes a color-separation optical system that separates light supplied from the light source into the first-color light, the second-color light and the third-color light. In some cases, for example, like an extra-high pressure mercury lamp, etc., the light source supplies light within all the wavelength ranges including the first, second and third color lights. In the present aspect, in these cases, light from the light source is separated by the color separation optical system into the first color light, the second color light and the third color light so that the respective lights can be modulated in accordance with image signals.

According to still another aspect of the present invention, a method of manufacturing a microstructure element includes dividing a machining area into five or more sub-areas, forming a first shape in any one of the sub-areas, forming a second shape at another sub-area that is located farther from the any one of the sub-areas than an adjacent area to the any one of the sub-areas, taking the any one of the sub-areas as a new reference, and repeating the forming a second shape, taking the another sub-area on which the second shape is formed as the new reference.

In the manufacturing method of a conventional technique, in a machining area, the machining position is continuously shifted from the position at which the machining process is started so that the machining process such as cutting is successively carried out. In such a manufacturing method, the adverse effects from external disturbance, as they are, tend to be reflected to the results of the machining process. In contrast, in accordance with the first invention, the machining area is first divided into a plurality of sub-machining areas, that is, for example, five or more machining areas. Next, a first shape is formed in a desired one of the sub-areas. After the formation of the first shape, a second shape is formed at another sub-area that is not adjacent to the sub-area on which the first shape is formed, and located at a position apart from the sub-area by a distance corresponding to at least one sub-area. After the formation of the second shape, the second shape is formed at still another sub-area that is not adjacent to the sub-area on which the second shape is formed, and located at a position apart from the sub-area by a distance corresponding to at least one sub-area. This process is repeated until shape-machining processes have been carried out on all the sub-areas. Thus, variations in the machining position caused by the influences from the external environment (disturbance) can be dispersed. Consequently, a desired fine-shape element can be manufactured accurately independent of the external environment.

Furthermore, according to an exemplary embodiment of the present invention, the first shape and the second shape are substantially same shape. Thus, it becomes possible to form a desired single shape with sufficient precision.

Moreover, according to an exemplary embodiment of the present invention, the first shape and the second shape are different from each other. Thus, it becomes possible to form a desired fine-shape with sufficient precision, even when it has an irregular shape.

Furthermore, according to an exemplary embodiment of the present invention, the method further includes forming the first shape, based on machining data, on a trial machining area that is different from the machining area, measuring the first shape formed on the trial machining area, compensating the machining data by performing a feedback of a difference between measured data and the machining data to the machining data, and repeating the forming the first-shape based on the machining data compensated. The fine-shape element is formed based upon machining data. Then, since the shape is not formed as defined by the machining data because of influences from disturbance and defective setting of the relative position between the machining cutting tool and the workpiece, a failure occurs in obtaining a desired machining precision. In the present aspect, in a trial machining area, the machined first shape is preliminarily measured actually. With respect to the measurements of the fine-shape, an atomic force microscope and a laser microscope are preferably used. Further, the measurement data of the measured fine-shape element are compared with the original machining data so that a finite difference between the two kinds of data is calculated. The finite difference, thus calculated, is fed back to the machining data. Next, based upon the machining data corrected by the amount of the finite difference, the first-shape forming process and the repeating process are carried out. Consequently, it becomes possible to carry out a shape-machining process that is less susceptible to influences from disturbance and the like.

Furthermore, according to an exemplary embodiment of the present invention, the forming the first shape on a trial machining area, forming a first shape in any one of the sub-areas, and the repeating the forming the first-shape are performed at same position at least two times. Thus, for example, even in the case when a fine shape is machined by changing the angle of a cutting tool at the same position, it is possible to obtain a desired fine shape.

Moreover, according to an exemplary embodiment of the present invention, the measuring includes measuring at least one of factors including pitch, angle, depth and, flat surface roughness of the first shape. Thus, it becomes possible to accurately form the pitch, angle, depth and flat face roughness of a microstructure element.

According to still another aspect of the present invention, a microstructure element is manufactured by using the method according to the above aspect. With this arrangement, it becomes possible to manufacture a microstructure element having a single shape or an irregular shape, such as a group of prisms constituted by multiple micro-prism elements.

According to still another aspect of the present invention, a space light modulating apparatus includes the microstructure element according to the above aspect. For example, a transmission-type liquid-crystal-type space light modulating apparatus has a group of prisms constituted by micro-lens elements. By allowing light to pass through a group of prisms having a desired shape, the direction of outgoing light is accurately refracted in a predetermined direction to be deflected. Thus, light released from pixels can be refracted and directed to a projection image of the black matrix located between pixels of the space light modulating apparatus. Consequently, it becomes possible to obtain an image with high quality, without allowing the viewer to recognize the black matrix.

According to still another aspect of the present invention, a projector includes a light source that supplies illuminating light, the space light modulating apparatus according to the above aspect that modulates the illuminating light based on an image signal, and a projection lens that projects modulated light. In the present invention, since the space light modulating device is installed, it is possible to provide a projection image with high quality.

BRIEF DESCRIPTION OF THE DRAWINGS

FIG. 17C is a schematic for illustrating a shape of a prism according to the fifth embodiment;

FIG. 35 is a flowchart of a process procedure for manufacturing a group of prisms according to a thirteenth embodiment of the present invention;

DETAILED DESCRIPTION OF EMBODIMENTS

Exemplary embodiments of a space light modulating apparatus, a projector including the space light modulating apparatus, a process for manufacturing a microstructure element used in the space light modulating apparatus, and a microstructure manufactured by the process according to the present invention are explained in detail with reference to the accompanying drawings.

First Embodiment (Explanation of an Entire Projector)

Figure 1:
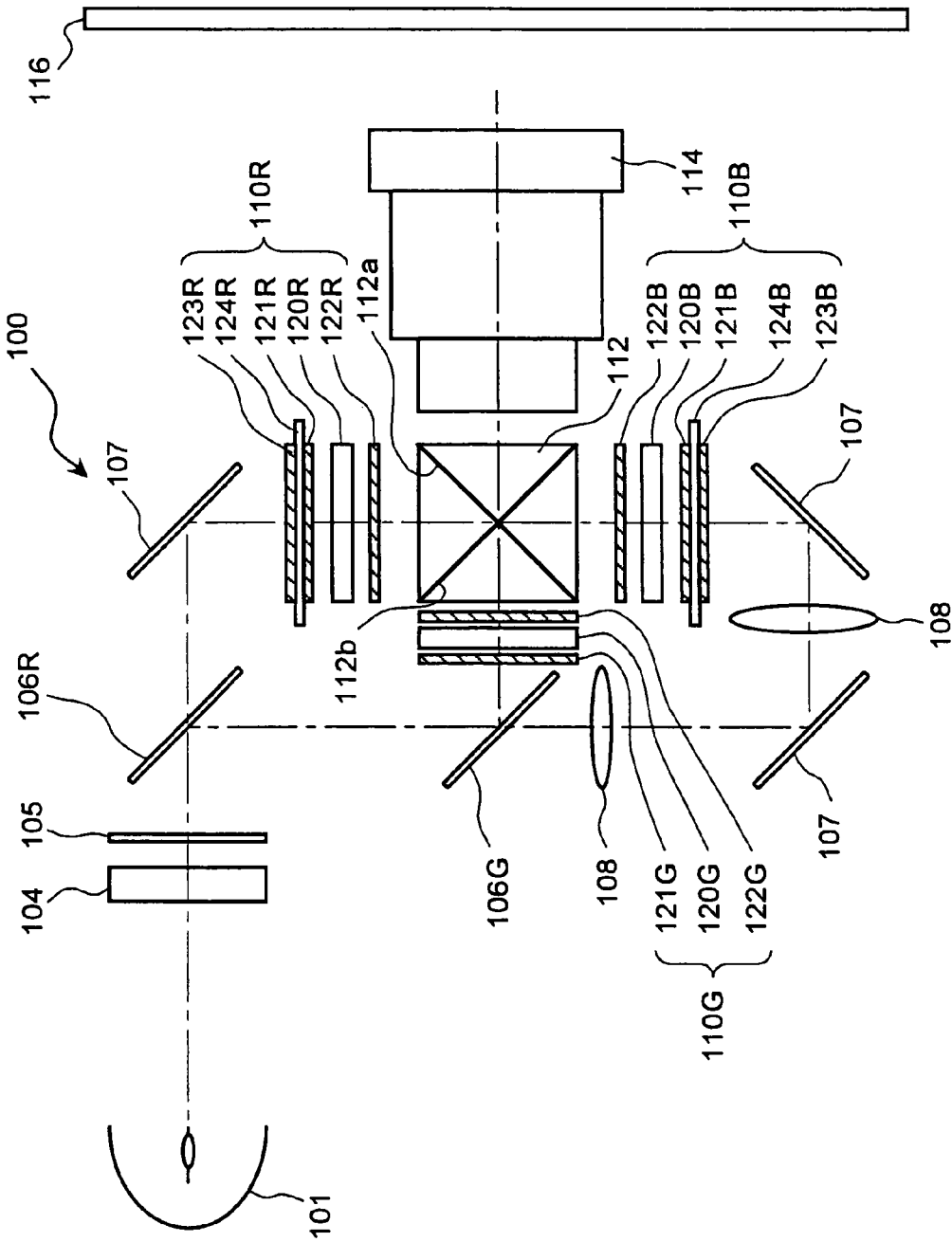
FIG. 1 is a schematic of a projector according to a first embodiment of the present invention.

First, referring to FIG. 1, the structure of a projector according to the first embodiment of the present invention is explained schematically. Next, referring to FIG. 2 and thereafter, the characteristic structure according to the present embodiment is explained. First, in FIG. 1, an extra-high pressure mercury lamp 101, which serves as a light source, supplies light containing red light (hereinafter, referred to as "R-light") that is the first color light, green light (hereinafter, referred to as "G-light") that is the second color light and blue light (hereinafter, referred to as "B-light") that is the third color light. An integrator 104 equalizes the illuminance distribution of light from the extra-high pressure mercury lamp 101. The light, equalized in its illuminance distribution, is converted by a polarized light conversion device 105 into polarized light with a specific vibration direction, that is, for example, s-polarized light. The light, converted to s-polarized light, is made incident on an R-light transmission dichroic mirror 106R that forms a color separation optical system. The following description will discuss the R-light. The R-light transmission dichroic mirror 106R transmits the R-light, and reflects the G-light and B-light. The R-light, transmitted through the R-light transmission dichroic mirror 106R, is made incident on a reflection mirror 107. The reflection mirror 107 bends the light path of the R-light by 90 degrees. The R-light with its light path bent is made incident on a first-color space light modulating apparatus 110R that modulates the R-light that is the first-color light in accordance with an image signal. The first-color space light modulating apparatus 110R is a transmission-type liquid crystal display that modulates the R-light in accordance with an image signal. Here, since the polarizing direction of the light is not changed even after the transmission through the dichroic mirror, the R-light to be made incident on the first-color space light modulating apparatus 110R is still maintained as the s-polarized light.

The first-color space light modulating apparatus 110R is provided with λ/2 phase difference plate 123R, a glass plate 124R, a first polarizing plate 121R, a liquid crystal panel 120R and a second polarizing plate 122R. The structure of the liquid crystal panel 120R will be described later in detail. The λ/2 phase difference plate 123R and the first polarizing plate 121R are placed so as to be made contact with a light-transmitting glass plate 124R that does not change the polarizing direction. Thus, it is possible to avoid the problem that the first polarizing plate 121R and the λ/2 phase difference plate 123R are distorted due to heat generation. Here, in FIG. 1, the second polarizing plate 122R is placed in an independent manner; however, this may be placed so as to be made in contact with the outgoing face of the liquid crystal panel 120R and the incident face of the cross dichroic prism 112.

The s-polarized light, made incident on the first-color space light modulating apparatus 110R, is converted into p-polarized light by the λ/2 phase difference plate 123R. The R-light converted into the p-polarized light is allowed to pass through the glass plate 124R and the first polarizing plate 121R as it is, and made incident on the liquid crystal panel 120R. The p-polarized light, made incident on the liquid crystal panel 120R, is subjected to a modulating process in accordance with an image signal so that the R-light is converted to s-polarized light. The R-light that has been converted to the s-polarized light through the modulating process of the liquid crystal panel 120R is released from the second polarizing plate 122R. In this manner, the R-light that has been modulated by the first-color space light modulating apparatus 110R is made incident on the cross dichroic prism 112 that is a color-synthesizing optical system.

The following description will discuss the G-light. The G-light and B-light, reflected by the R-light transmission dichroic mirror 106R, have their light paths bent by 90 degrees. The G-light and B-light with their light paths bent are made incident on a B-light transmission dichroic mirror 106G. The B-light transmission dichroic mirror 106G reflects the G-light, and transmits the B-light. The G-light that has been reflected by the B-light transmission dichroic mirror 106G is made incident on a second-color space light modulating apparatus 110G that modulates the G-light that is the second-color light in accordance with an image signal. The second-color space light modulating apparatus 110G is a transmission-type liquid crystal display that modulates the G-light in accordance with an image signal. The second-color space light modulating apparatus 110G is provided with a liquid crystal panel 120G, a first polarizing plate 121G and a second polarizing plate 122G. The structure of the liquid crystal panel 120G will be described later in detail.

The G-light to be made incident on the second-color space light modulating apparatus 110G is converted into s-polarized light. The s-polarized light, made incident on the second-color space light modulating apparatus 110G is allowed to pass through the first polarizing plate 121G as it is, and made incident on the liquid crystal panel 120G. The s-polarized light, made incident on the liquid crystal panel 120G, is subjected to a modulating process in accordance with an image signal so that the G-light is converted to p-polarized light. The G-light that has been converted to the p-polarized light through the modulating process of the liquid crystal panel 120G is released from the second polarizing plate 122G. In this manner, the G-light that has been modulated by the second-color space light modulating apparatus 110G is made incident on the cross dichroic prism 112 that is a color-synthesizing optical system.

The following description will discuss the B-light. The B-light that has passed through the B-light transmission dichroic mirror 106G is made incident on a third-color space light modulating apparatus 110B that modulates the B-light that is the third-color light in accordance with an image signal, after passing through two relay lenses 108 and two reflection mirrors 107. The third-color space light modulating apparatus 110B is a transmission-type liquid crystal display that modulates the B-light in accordance with an image signal.

Here, the reason that the B-light is allowed to pass through the relay lenses 108 is because the light path of the B-light is longer than the light paths of the R-light and G-light. By using the relay lenses 108, the B-light that has passed through the B-light transmission dichroic mirror 106G, as it is, is directed to the third-color space light modulating apparatus 110B. The third-color space light modulating apparatus 110B is provided with a λ/2 phase difference plate 123B, a glass plate 124B, a first polarizing plate 121B, a liquid crystal panel 120B and a second polarizing plate 122B. Here, the structure of the third-color space light modulating apparatus 110B is the same as that of the first-color space light modulating apparatus 110R; therefore, the detailed description thereof is omitted.

The B-light to be made incident on the third-color space light modulating apparatus 110B is converted into s-polarized light. The s-polarized light, made incident on the third-color space light modulating apparatus 110B, is converted into p-polarized light by the λ/2 phase difference plate 123B. The B-light converted into the p-polarized light is allowed to pass through the glass plate 124B and the first polarizing plate 121B as it is, and made incident on the liquid crystal panel 120B. The p-polarized light, made incident on the liquid crystal panel 120B, is subjected to a modulating process in accordance with an image signal so that the B-light is converted to s-polarized light. The B-light that has been converted to the s-polarized light through the modulating process of the liquid crystal panel 120B is released from the second polarizing plate 122B. The B-light that has been modulated by the third-color space light modulating apparatus 110B is made incident on the cross dichroic prism 112 that is a color-synthesizing optical system. In this manner, the R-light transmission dichroic mirror 106R and the B-light transmission dichroic mirror 106G, which constitute a color-separation optical system, separate light supplied from the extra-high pressure mercury lamp 101 into the R-light serving as the first-color light, the G-light serving as the second-color light and the B-light serving as the third-color light.

The cross dichroic prism 112 serving as a color-synthesizing optical system is constituted by two dichroic films 112a and 112b that are orthogonally placed in an X-letter form. The dichroic film 112a reflects the B-light, and transmits the R-light and G-light. The dichroic film 112b reflects the R-light, and transmits the B-light and G-light. In this manner, the cross dichroic prism 112 synthesizes the R-light, G-light and B-light that have been respectively modulated by the first-color space light modulating apparatus 110R, the second-color space light modulating apparatus 110G and the third-color space light modulating apparatus 110B. A projection lens 114 projects the light synthesized by the cross dichroic prism 112 onto a screen 116. Thus, a full-color image is obtained on the screen 116.

As described above, the lights to be made incident on the cross dichroic prism 112 from the first-color space light modulating apparatus 110R and the third-color space light modulating apparatus 110B are formed into s-polarized light. The light to be made incident on the cross dichroic prism 112 from the second-color space light modulating apparatus 110G is formed into p-polarized light. In this manner, by making the polarizing directions of lights to be made incident on the cross dichroic prism 112 different from each other, lights released from the respective color-light-use space light modulating apparatuses can be effectively synthesized by the cross dichroic prism 112. Normally, the dichroic films 112a and 112b are superior in the reflective property for the s-polarized light. For this reason, the R-light and B-light to be reflected by the dichroic films 112a and 112b are formed into the s-polarized light, and the G-light that is allowed to pass through the dichroic films 112a and 112b is formed into the p-polarized light.

(Structure of Liquid Crystal Panel)

Figure 2:
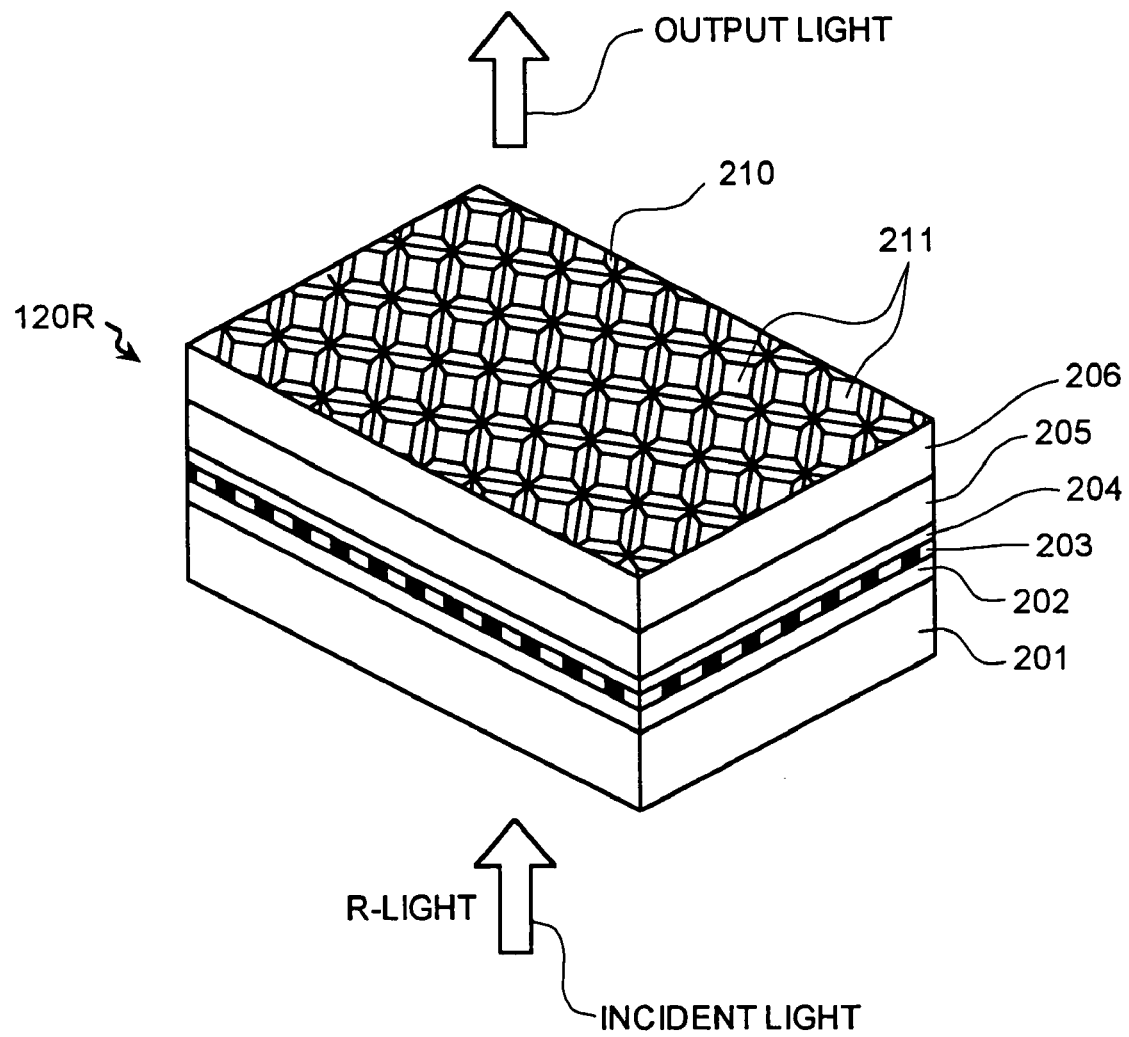
FIG. 2 is a schematic of a liquid crystal panel according to the first embodiment.

Next, referring to FIG. 2, the liquid crystal panel is explained in detail. The projector 100, explained in FIG. 1, is provided with three liquid crystal panels 120R, 120G and 120B. These three liquid crystal panels 120R, 120G and 120B have the same basic structure except that they have different light wavelength ranges to be modulated. Therefore, the following description will discuss the liquid crystal panel 120R as the typical example thereof.

FIG. 2 is a schematic of the liquid crystal panel 120R. R-light, released from the extra-high pressure mercury lamp 101, is made incident on the liquid crystal panel 120R from the lower side of FIG. 2, and released toward the screen 116 from the upper side thereof. An opposing substrate 202 having transparent electrodes and the like is formed inside an incident-side dust-preventive transparent plate 201. Moreover, a thin film transistor (TFT) substrate 205 having TFTs, transparent electrodes and the like is formed inside an output-side dust-preventive transparent plate 206. Here, the opposing substrate 202 and the TFT substrate 205 are aligned face to face with each other, and the incident-side dust-preventive transparent plate 201 and the output-side dust-preventive transparent plate 206 are bonded to each other. A liquid crystal layer 204, which is used for displaying images, is sealed between the opposing substrate 202 and the TFT substrate 205. Moreover, a black matrix layer 203 to be used for shielding light is installed on the incident-light side of the liquid crystal layer 204.

A group of prisms 210, constituted by a plurality of prism elements 211, is formed on the output-side surface of the output-side dust-preventive transparent plate 206. The structure and functions of the group of prisms 210 will be described later. In the structure of FIG. 1, the first polarizing plate 121R and the second polarizing plate 122R are installed on the liquid crystal panel 120R as separated members. However, in place of this structure, a polarizing plate may be formed between the incident-side dust-preventive transparent plate 201 and the opposing substrate 202 as well as between the output-side dust-preventive transparent plate 206 and the TFT substrate 205. Moreover, the group of prisms 210 may be formed either on the second polarizing plate 122R, or on the R-light incident face of the cross dichroic prism 112.

(Structure of an Opening Section Corresponding to a Pixel)

Figure 3:
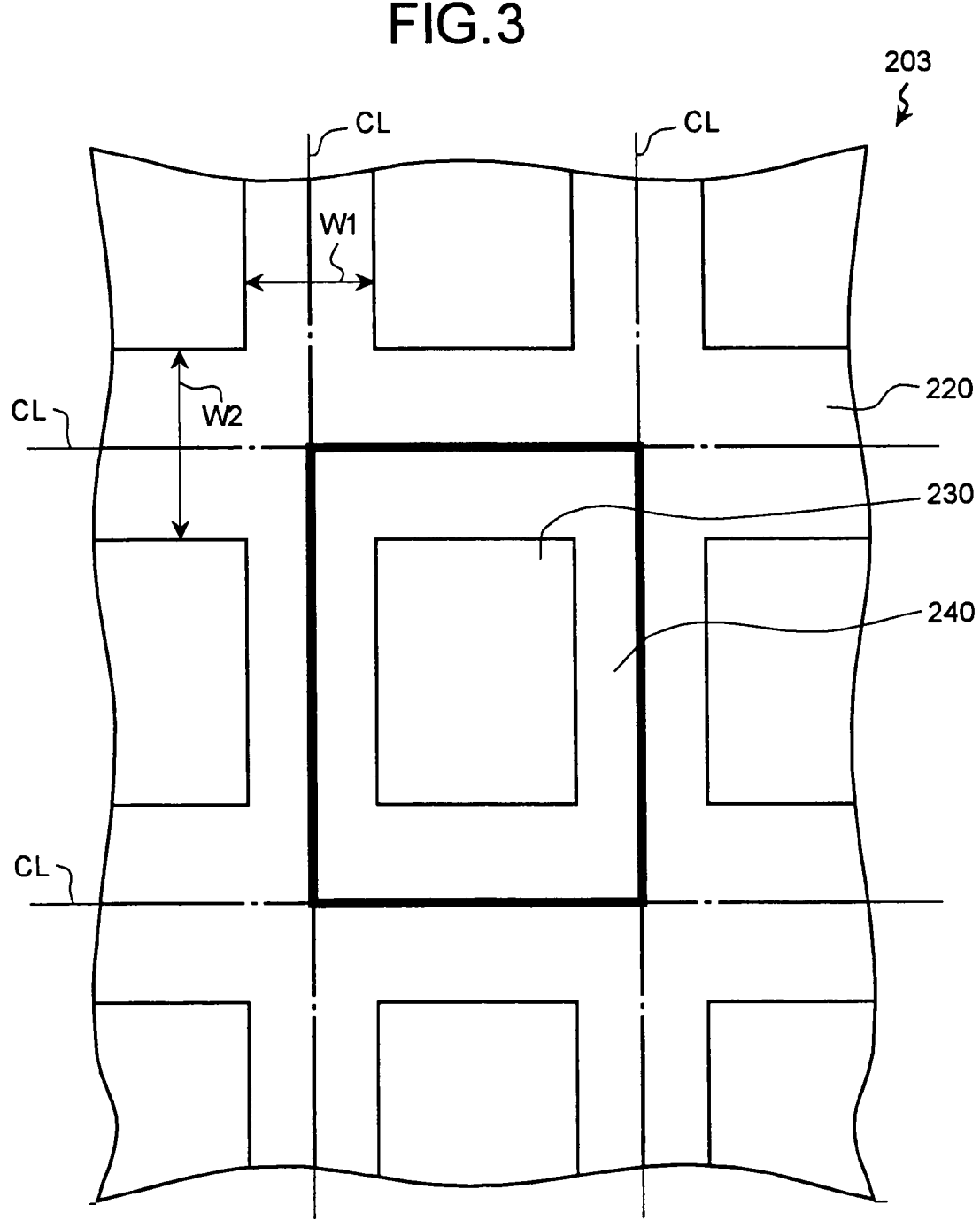
FIG. 3 is a schematic of a black matrix according to the first embodiment.

FIG. 3 is a schematic of the black matrix layer 203. A black matrix 220, which forms a light-shielding part, shields the R-light that has been made incident thereon from the extra-high pressure mercury lamp 101 so that no light is released toward the screen 116 side. The black matrix 220 is formed in a lattice shape in the-orthogonal directions with predetermined widths W1 and W2. Moreover, a rectangular area surrounded by the black matrix 220 forms an opening section 230. The opening section 230 transmits the R-light from the extra-high pressure mercury lamp 101. The R-light that has been transmitted through the opening section 230 is allowed to pass through the opposing substrate 202, the liquid crystal layer 204 and the TFT substrate 205, as shown in FIG. 2. Further, the polarized light components of the R-light are modified by the liquid crystal layer 204 in accordance with an image signal. Thus, the lights, which have been transmitted through the opening section 230, the liquid crystal layer 204 and the TFT substrate 205 and modulated, are allowed to form a pixel in a projected image. Since the lights have been transmitted through the opening section 230, the position and size of the opening section 230 respectively correspond to the position and size of the pixel. Here, the center line CL of the band-shaped black matrix 220 is indicated by a dashed line. Hereinafter, for convenience of explanation, an area, surrounded by the center line CL and indicated by a bold line in the figure, is referred to as periodic area 240. As clearly shown by the figure, the adjacent periodic areas 240 are arranged periodically without clearance in a repeated manner.

(Projection Image of the Opening Section)

Figure 4:
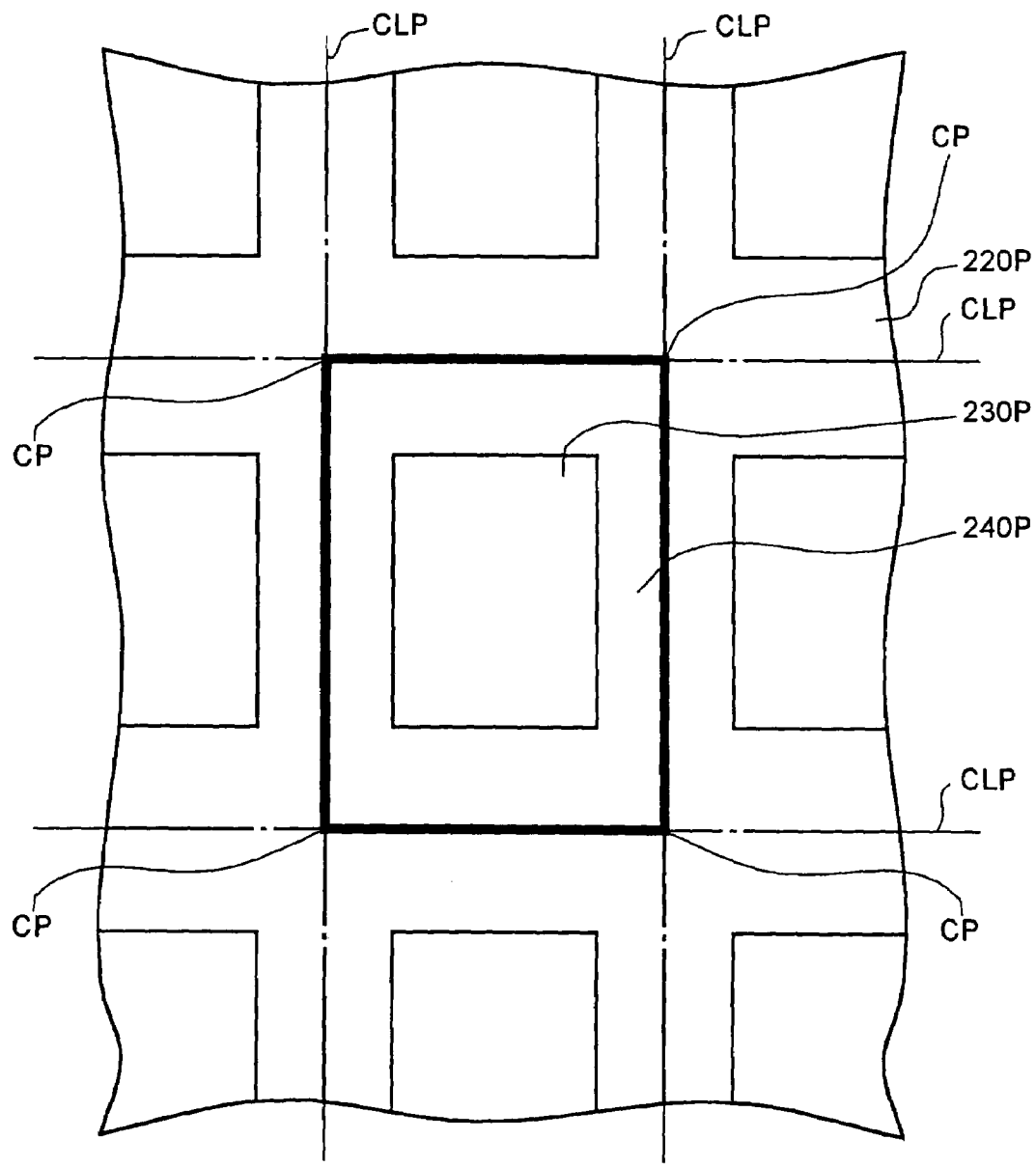
FIG. 4 is a schematic of an image of the black matrix according to the first embodiment.

FIG. 4 is a schematic of an image projected onto the screen 116 by a conventional projector in an enlarged manner. An image of an opening section 230P is projected in such a manner that it is surrounded by a band-shaped black matrix image 220. Moreover, in response to the periodic area 240, a periodic area image 240P, shown as an area surrounded by the bold line in FIG. 4, is projected. Here, the position where center line images CLP intersect with each other is defined as an intersection point CP. In all the embodiments including the present embodiment, explanations are given by using images projected on the screen 116 by the projection lens 114. In the case when only the first-light-use space light modulating apparatus 110R is taken out to be considered, no projection lens 114 is present. In this case, the projection images are dealt as images that are projected on an imaginary projection plane that is apart from the group of prisms 210 serving as a refracting unit by a predetermined distance. The projection image formed by the projector 100 and the projection image formed by the single first-color space light modulating apparatus 110R are virtually the same image except that the image magnification is different from each other. For this reason, the following explanation will be given by reference to projected images on the screen 116.

(Positional Relationship between the Group of Prisms and the Opening Section)

Figure 5:
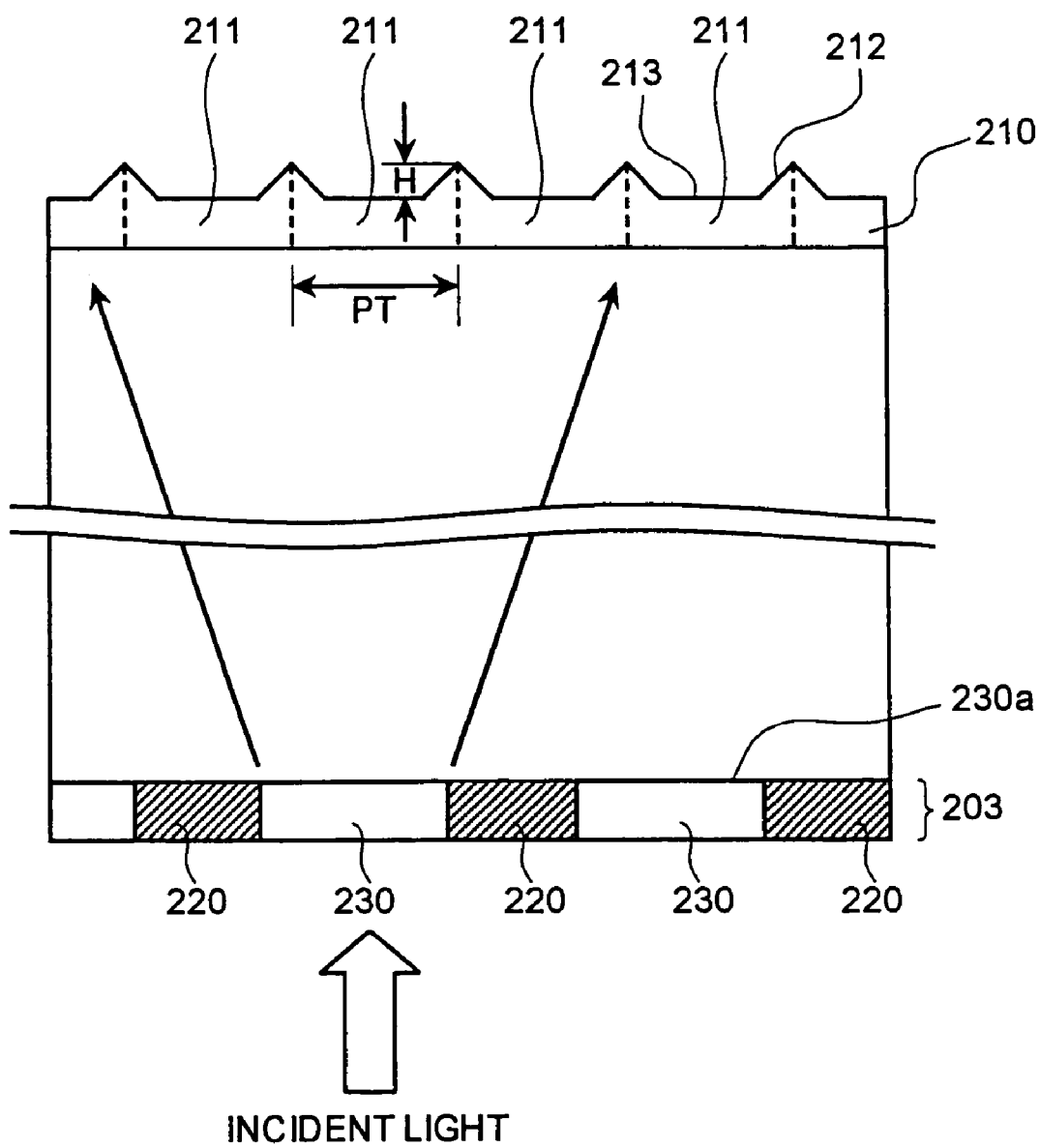
FIG. 5 is a cross-section of the liquid crystal panel according to the first embodiment.

FIG. 5 is a cross-section of the liquid crystal panel for illustrating a relation between the black matrix layer 203 and the group of prisms 210 serving as a refracting unit. Here, in order to facilitate the understanding, the illustration of components other than the black matrix layer 203 and the group of prisms 210 is omitted. The R-light that has passed through the opening section 230 corresponding to a pixel is formed into divergence lights having a cone shape, and allowed to progress. Further, the R-light is made incident on at least one portion of the group of prisms 210. The group of prisms 210 is constituted by prism elements 211 each of which is provided with at least a refracting surface 212 and a flat portion 213. The flat portion 213 is a face that is virtually in parallel with a face 230a in which the opening section 230 corresponding to the pixel is formed. Multiple prism elements 211 are regularly arranged with a fixed cycle so that the group of prisms 210 is formed.

Figure 6A:
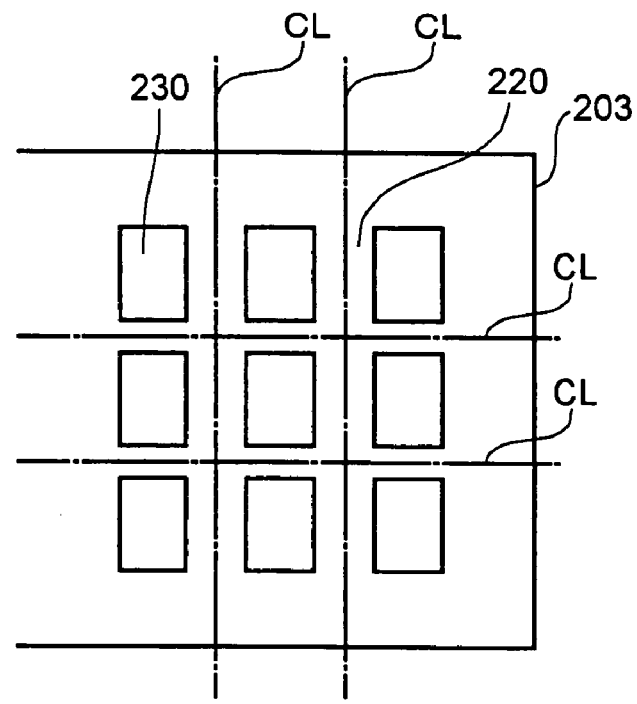
FIG. 6A is a schematic for illustrating a layout of opening sections according to the first embodiment.
Figure 6B:
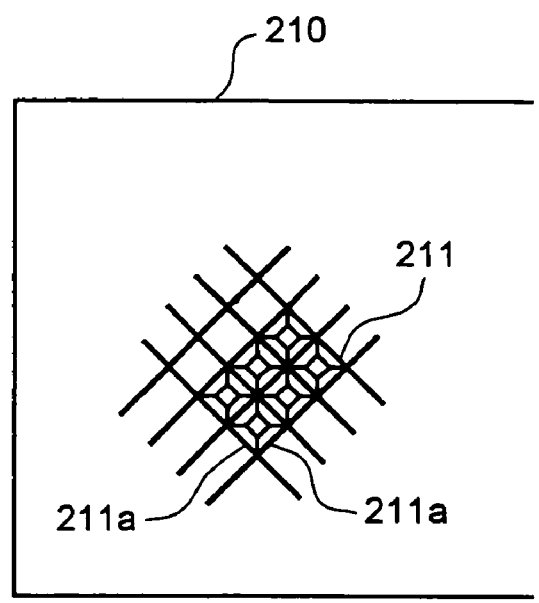
FIG. 6B is a schematic for illustrating a layout of a group of prisms according to the first embodiment.
Figure 6C:
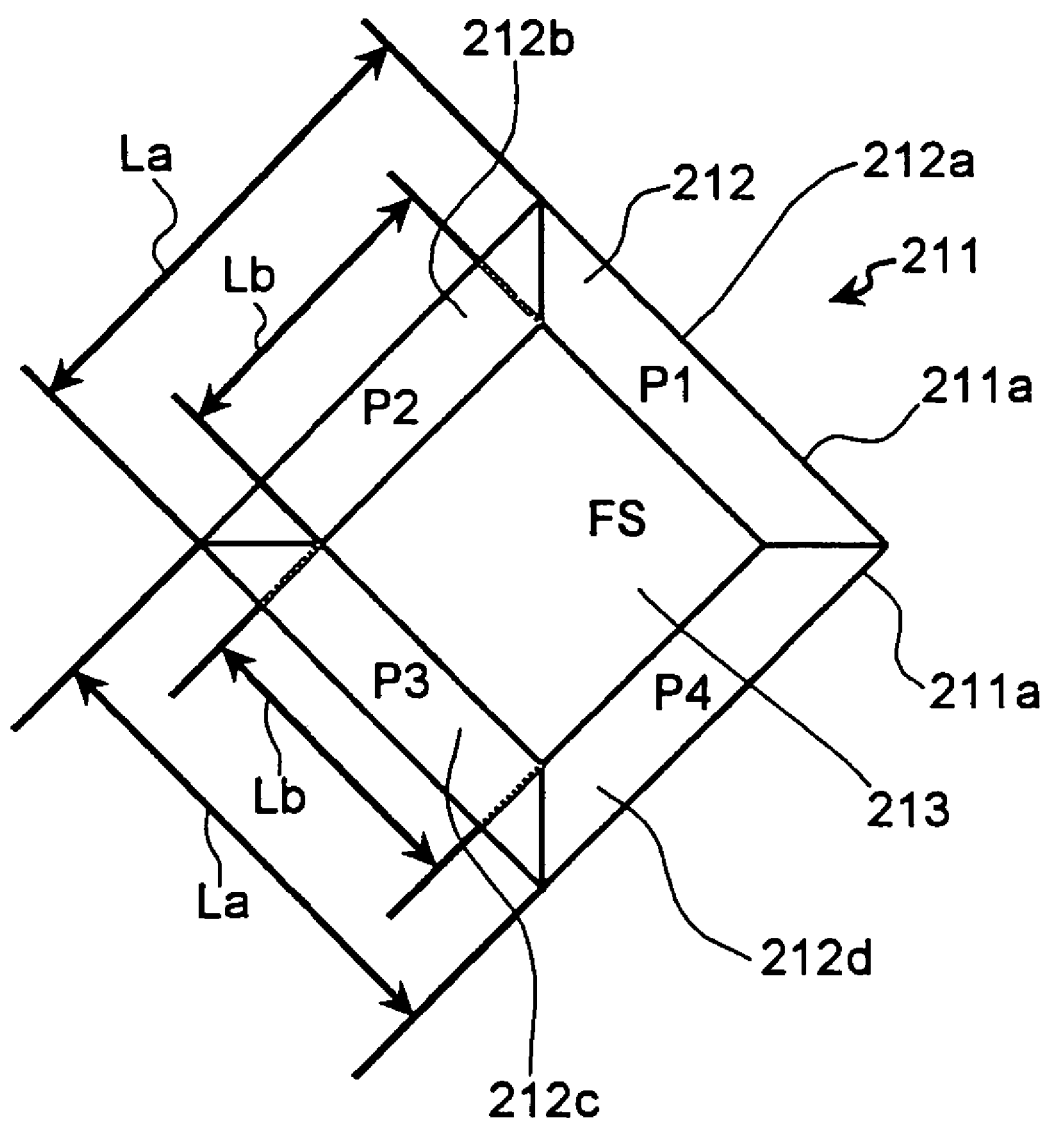
FIG. 6C is a schematic for illustrating a shape of a prism according to the first embodiment.

FIG. 6A, FIG. 6B, and FIG. 6C are plan views that show a positional relationship between the opening section 230 and the group of prisms 210. As shown in FIG. 6C, each of the prism elements 211 has a virtually square shape. Further, the direction of the center line CL of the black matrix layer 203 shown in FIG. 6A and the direction of the side 211a of each prism element 211 shown in FIG. 6B are made to form an angle of about 45°. As described earlier, the light that has passed through one opening section 230 is made incident on one portion of the group of prisms 210 constituted by multiple prism elements 211.

(Explanation of Refraction Angle and Refraction Direction)

Figure 7:
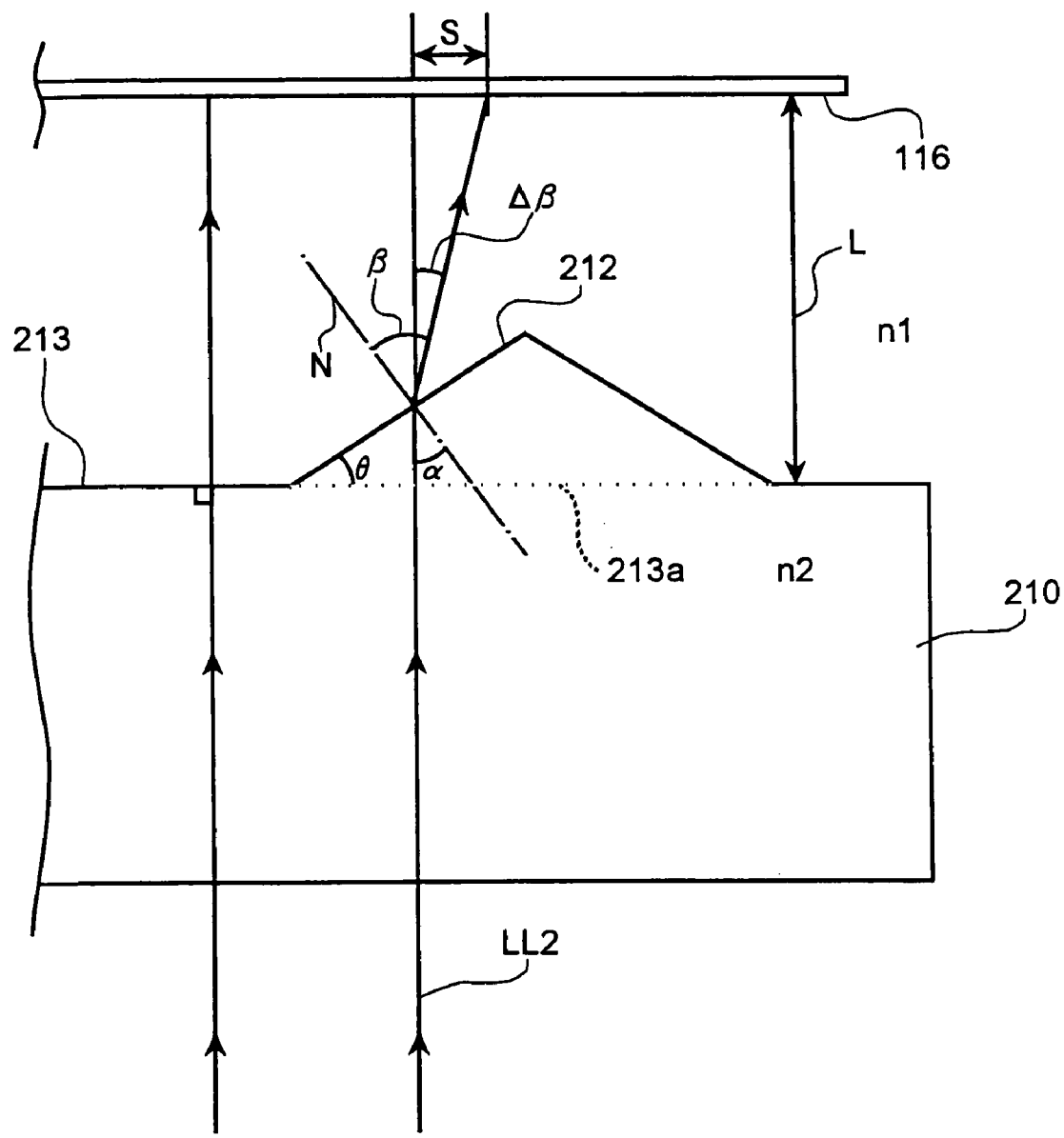
FIG. 7 is a schematic for illustrating refraction in a prism element according to the first embodiment.

Referring to FIG. 7, the following description will discuss an angle amount by which the transmitted light through the opening section 230 is refracted by the arrangement. FIG. 7 is an enlarged view of proximity of the group of prisms 210 that forms a refracting unit. Here, suppose that the medium (for example, air) located between the group of prisms 210 and the screen 116 is set to a refractive index n1 and that the constituent member of the group of prisms 210 is set to a refractive index n2. Moreover, the refracting surface 212 is formed so as to have an angle θ with respect to a reference plane 213a formed by extending the flat portion 213. Hereinafter, the angle θ is referred to as tilt angle.

For convenience of explanation, among lights from the opening section 230, parallel lights are explained. Lights to enter the flat portion 213 are made incident perpendicularly on the flat portion 213. For this reason, the lights are allowed to proceed straight as they are without being subjected to a refracting function in the flat portion 213 and to form a projection image on the screen 116. In contrast, the lights, made incident on the refracting surface 212, are refracted in a manner so as to satisfy the following condition $n1 \cdot \sin \beta = n2 \cdot \sin \alpha$ where angle α is an incidence angle, and angle β is a release angle, based upon normal line N of the refracting surface 212,.

Moreover, on the screen 116 that is apart from the group of prisms 210 by a distance L, the distance S between the position of the light that is allowed to proceed straight and the position of the light that is refracted is indicated by the following equations $S = L \times \Delta \beta$ $\Delta \beta = \beta - \alpha$ By controlling the prism tilt angle θ of the refracting surface 212 in this manner, the distance S that corresponds to the movement of the opening section image 230P on the screen 116 can be desirably set.

Moreover, as clearly shown by FIG. 7, the direction at which a light LL2 is refracted is dependent on the direction of the refracting surface 212. In other words, by controlling the direction of the refracting surface 212 with respect to the opening section 230, the direction in which the opening section image 230P is formed on the screen 116 can be desirably set.

(Area Ratio of Refracting Surface)

In the aforementioned FIG. 6C, suppose that one side of the square prism element 211 has a length La, and that one side of the flat portion 213 has a length Lb. Of the group of prisms 210, an area La×La that is occupied by one prism element 211 is set to a unit area. The flat portion 213 has an area FS=Lb×Lb. Moreover, four refracting surfaces 212a, 212b, 212c and 212d have respective areas of P1, P2, P3 and P4. The quantity of light that is transmitted through the flat portion 213 and proceeds straight corresponds to the area FS of the flat portion 213 that accounts for the unit area. In the same manner, the total quantity of lights that are refracted by the four refracting surfaces 212a, 212b, 212c and 212d corresponds to the total area P1+P2+P3+P4 of the four refracting surfaces 212a, 212b, 212c and 212d that accounts for the unit area. Here, supposing that the areas P1, P2, P3 and P4 of the four refracting surfaces 212a, 212b, 212c and 212d have virtually the same size, the total area is represented by P1+P2+P3+P4=4×P1. In other words, by controlling the area of the flat portion 213 or the refracting surface 212, the quantity of light that is allowed to pass straight through or refracted by the prism element 210 is desirably set on the screen 116.

When the quantity of light on the screen 116 is taken into consideration, the quantity of light of a projection image (direct transmission image) that is transmitted through the flat portion 213 and proceeds straight and the quantity of light of a projection image that is refracted by the refracting surface 212 are preferably made equal to each other. For example, supposing that the length La=1.0 and the length Lb=0.707, the unit area of the prism element 211 is 1.0 (=1.0×1.0) and the area FS of the flat portion 213 is 0.5 (=0.707×0.707). Moreover, the total area (4×P1), obtained by totaling four refracting surfaces 212a, 212b, 212c and 212d respectively having the same area, is 0.5 (=1.0−0.5). In this manner, the quantity of light that is transmitted through the flat portion 213 and proceeds straight and the total quantity of light that is refracted by each of the four refracting surfaces 212a, 212b, 212c and 212d are made equal to each other.

(Contents of Projection Image)

Figure 8A:
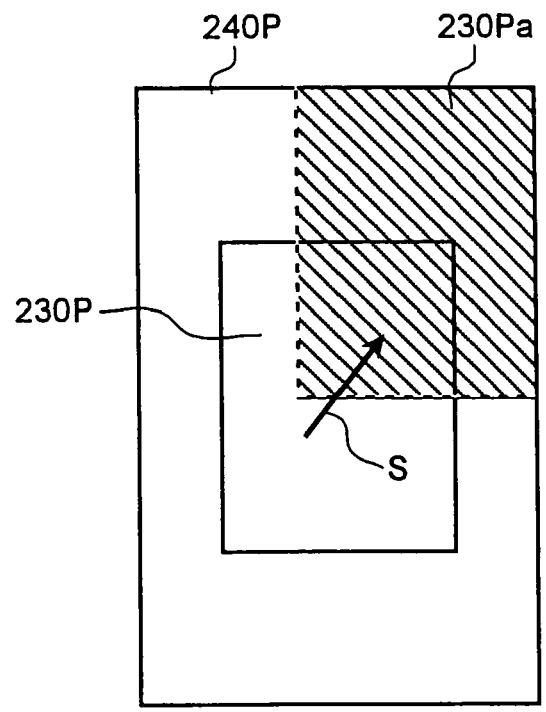
FIG. 8A is a schematic of a projection image according to the first embodiment.

Referring to FIGS. 8A to 8D, the following description discusses a projection image that is derived from the R-light when the liquid crystal panel 120R having the structure is used. FIG. 8A shows a periodic area image 240P on the screen 116. Lights that have been virtually perpendicularly made incident on the flat portion 213 of the prism element 211 are allowed to proceed straight, without being subjected to the refracting function in the flat portion 213. The straight proceeding lights form an opening section image (direct transmission image) 230P in the center of the periodic area 240P on the screen 116.

Next, the following description will discuss lights that are made incident on the refracting surface 212a of the prism element 210. The lights that have been made incident on the refracting surface 212a are subjected to refracting functions so as to have the refracting direction, the quantity of refraction and the quantity of refracted light that correspond to the direction of the refracting surface 212a, the tilt angle θ and the area P1. As described above, the direction of the side 211a of the prism element 211 and the direction of the center line CL of the black matrix layer 203 are made to form an angle of about 45°. For this reason, for example, as shown in FIG. 8A, the lights that are refracted by the refracting surface 212a are allowed to form an opening section image 230Pa at a position apart from the opening section image (direct transmission image) 230P by the distance S in the direction of arrow. Here, for convenience of explanation, in all the following descriptions, it is supposed that no lateral and longitudinal inversions occur in the image due to the image-forming function of the projection lens 114. Moreover, it is also supposed that the viewer should always observe in the viewing direction of the extra-high pressure mercury lamp 101 serving as the light source. For example, it is supposed that the image, projected on the screen 116, should be observed in the viewing direction of the extra-high pressure mercury lamp 101 (oncoming direction of light) from the rear side of the screen 116.

Figure 8B:
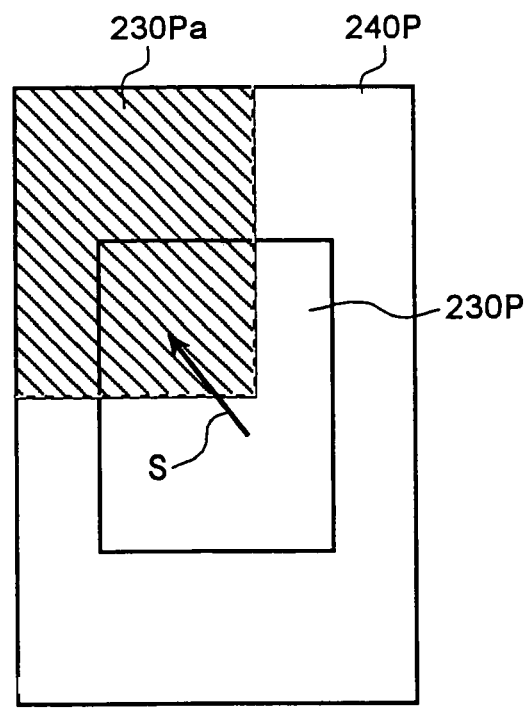
FIG. 8B is a schematic of other projection image according to the first embodiment.
Figure 8C:
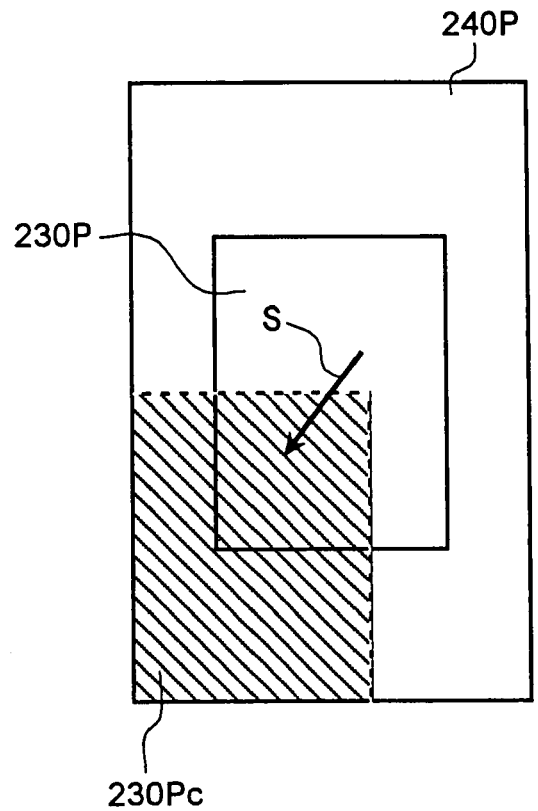
FIG. 8C is a schematic of still another projection image according to the first embodiment.
Figure 8D:
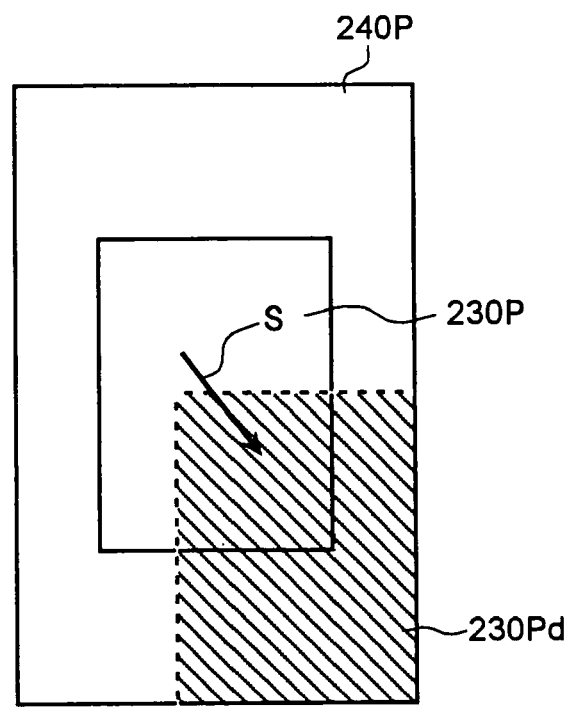
FIG. 8D is a schematic of a projection image according to the first embodiment.

In the same manner, the lights that have been refracted by the refracting surface 212b are allowed to form an opening section image 230Pb at a position shown in FIG. 8B. The lights that have been refracted by the refracting surface 212c are allowed to form an opening section image 230Pc at a position shown in FIG. 8C. The lights that have been refracted by the refracting surface 212d are allowed to form an opening section image 230Pd at a position shown in FIG. 8D. With respect to the same periodic area image 240P, FIG. 8A to FIG. 8D explain the respective opening section images 230Pa, 230Pb, 230Pc and 230Pd in a separate manner.

Figure 9:
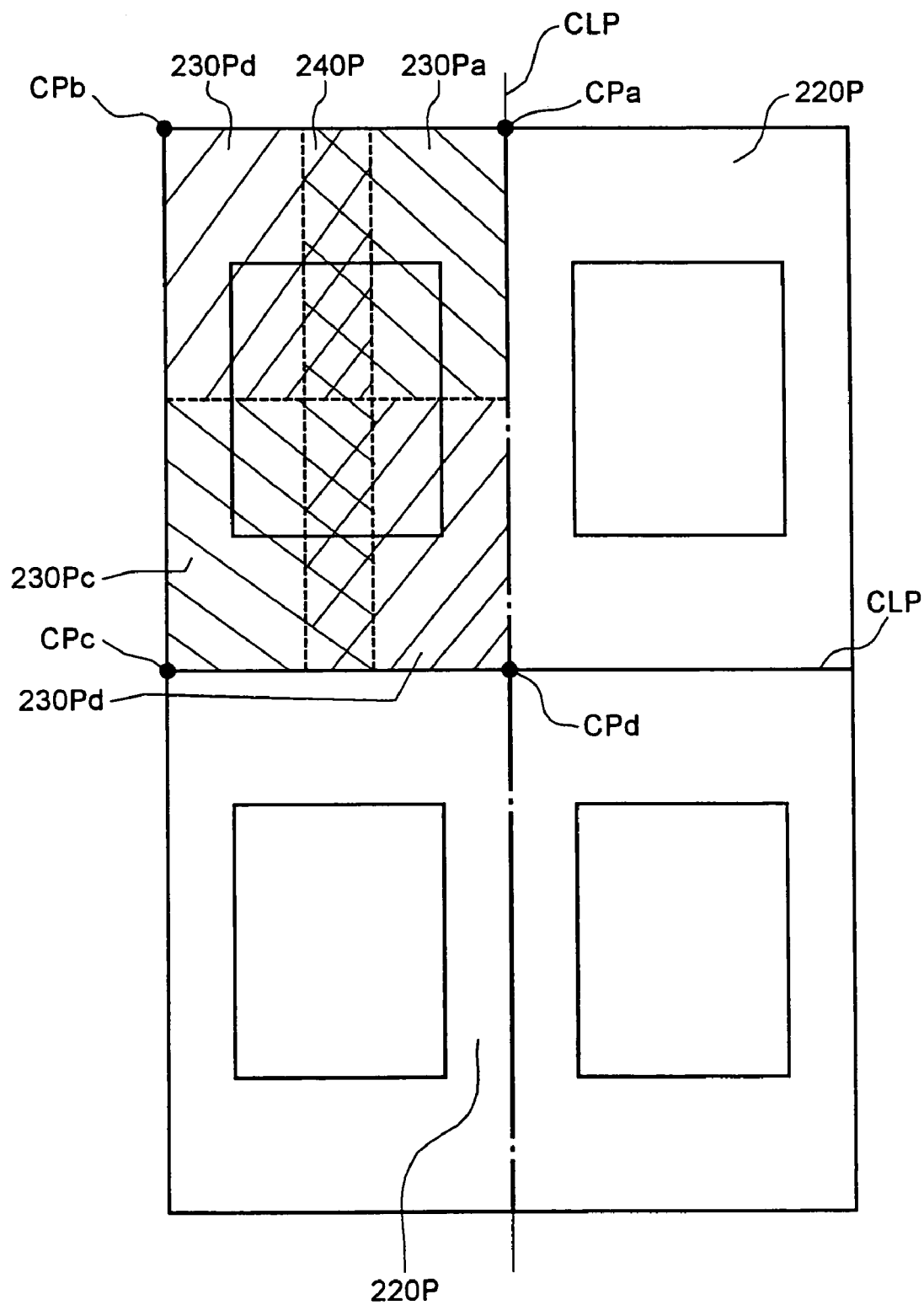
FIG. 9 is a schematic for illustrating the projection image according to the first embodiment.

In fact, these four opening section images 230Pa, 230Pb, 230Pc and 230Pd are projected in a superposed manner as shown in FIG. 9. In this manner, the refracting surface 212 has the direction of the refracting surface 212 and the tilt angle θ in such a manner that the opening section images 230Pa, 230Pb, 230Pc and 230Pd corresponding to the pixels are directed onto the black matrix image 220P that is the projection image of the black matrix 220 serving as the light-shielding part on the screen 116 that is a projection (receiving) face located apart from the group of prisms 210 by the predetermined distance L serving as the refracting unit. Consequently, the opening section images 230Pa, 230Pb, 230Pc and 230Pd are formed in the area of the black matrix image 220P in a superposed manner. Therefore, this arrangement makes it possible to prevent the viewer from recognizing the black matrix image 220P.

In particular, according to the present embodiment, the inside of the periodic area image 240P is filled with the opening section images 230Pa, 230Pb, 230Pc and 230Pd without any clearance. In this manner, each prism element 211 has such a direction of the refracting surface 212 and a tilt angle θ of the refracting surface 212 that each of the intersection points CPa, CPb, CPc and CPd of the center line image CLP of the black matrix images 220P that are light-shielding part images arranged in a lattice form is made virtually coincident with the corresponding one of the corner portions of the opening section image (direct transmission image) 230P of the opening section 230 that forms a pixel. For this reason, it is possible to obtain a so-called seamless image that is less susceptible to blurring between pixels, that is, a smooth image that is less susceptible to roughened texture.

(Process for Manufacturing the Group of Prisms)

Next, referring to the aforementioned FIG. 2, the following description discusses a process for manufacturing the group of prisms 210. The group of prisms 210 is integrally formed on the outgoing face of the output-side dust-preventive transparent plate 206. The output-side dust-preventive transparent plate 206 is constituted by transparent parallel glass flat plates. A group of prisms 210 is formed on one of the faces of the transparent parallel glass flat plates by using the photolithography technique. More specifically, a photoresist layer is patterned on the parallel flat glass plate so as to have a desired prism shape, for example, a pyramid shape, by using a gray scale method so that a mask is formed. Then, an RIE (reactive-ion-etching) method using fluorine-based gas such as $CHF_3$ is used for forming the group of prisms 210. Here, the group of prisms 210 may be formed by using a wet-etching method in which hydrofluoric acid is used. The output-side dust-preventive transparent plate 206, constituted by the parallel glass flat plates one of the faces of which has the group of prisms 210, is formed on the outermost output-side in the manufacturing processes of the liquid crystal panel 120R.

Further, another process for manufacturing the group of prisms 210 is explained. An optical epoxy resin is applied to one of the faces of the parallel flat glass plates. Next, a mold, which has a concave-convex pattern that is inverted to that of a desired prism shape, is prepared. Then, by pressing this mold onto the epoxy resin, the pattern is transferred thereon. Lastly, the optical epoxy resin is irradiated with ultraviolet rays so as to be cured; thus, the group of prisms 210 is formed.

Moreover, in the pattern-transferring process, another method may be adopted. The parallel flat glass plates are heated to such a softened state required for the mold-transferring process. Then, by pressing the mold onto one of the faces of the parallel flat glass plates that has been softened, the pattern-transferring process is carried out. With this method also, the group of prisms 210 is formed on the parallel flat glass plates.

Here, the formation of the group of prisms 210 is not limited to a structure in which the group is integrally formed with the output-side dust-preventive transparent plate 206. For example, a group of prisms 210 having a desired prism shape is preliminarily manufactured as a pattern sheet through a hot-pressing method in a separate manner. Then, the pattern sheet is properly cut into a required size. Next, the pattern sheet thus cut is affixed onto the outgoing-face side of the parallel glass flat plates by using an optically transparent bonding agent. With this method also, the group of prisms 210 can be formed on the parallel flat glass plates.

It is more preferable to prevent dusts and the like from adhering to the surface of the group of prisms 210. For this purpose, a coating layer, made from a transparent resin or the like having a low refractive index, is formed on the output-side face of the group of prisms 210. For example, the group of prisms 210 is formed by using an optical epoxy high-refractive-index resin having, a refractive index n=1.56. The coating layer is formed by using an optical epoxy low-refractive-index resin having, for example, a refractive index n=1.38. Moreover, the refractive index of a member to be used for forming the group of prisms 210 may be virtually coincident with the refractive index of the coating layer. With this arrangement, it is possible to reduce positional offsets of refracted lights on the screen 16 caused by deviations in manufacturing errors of the refracting surface 212.

Referring to FIG. 2, the following description will discuss the size of prism elements to be arranged. With respect to the size of the prism element 211a, supposing that, within a swallowing angle that is defined by illumination light or the F number of the projection lens, at a front position in the light advancing direction from a point at which the black matrix layer 203 that is the light-shielding part is placed in the space modulating element 120R, the F number is f, the swallowing angle is θ and the distance from the black matrix layer to the group of prisms 210 is L, the size of the diameter Φ of the largest prism is preferably set to a size not more than the size indicated by the following equation $$\Phi = 2 \times L(A \sin(\tfrac{1}{2} f))$$

Therefore, the size of the prism element 211a distributed based upon the area ratio is virtually included inside the diameter Φ, and by making the ratio of the flat portion area and each of the prism angle projection areas virtually coincident with a designed value inside the diameter Φ, it is possible to obtain pixels that are composed based upon the ratio of quantities of light that are assigned in association with the areas of the direct transmission image and the refracted transmission image.

Moreover, in order to improve the uniformity of the image obtained on the screen 116, it is preferable to place not less than ten prism elements 211a within the diameter Φ.

(Relation between the Wavelength and the Shape of Prism Elements)

In the above description, the R-light is explained as a typical example. With respect to the liquid crystal panel 120G of the second-color space light modulating apparatus 110G relating to the G-light and the liquid crystal panel 120B of the third-color space light modulating apparatus 110B relating to the B-light, the basic structure is also the same as the case of the R-light. More specifically, each of the first-color space light modulating apparatus 110R, the second-color space light modulating apparatus 110G and the third-color space light modulating apparatus 110B is provided with the group of prisms 210 that serves as a refracting unit.

Figure 10:
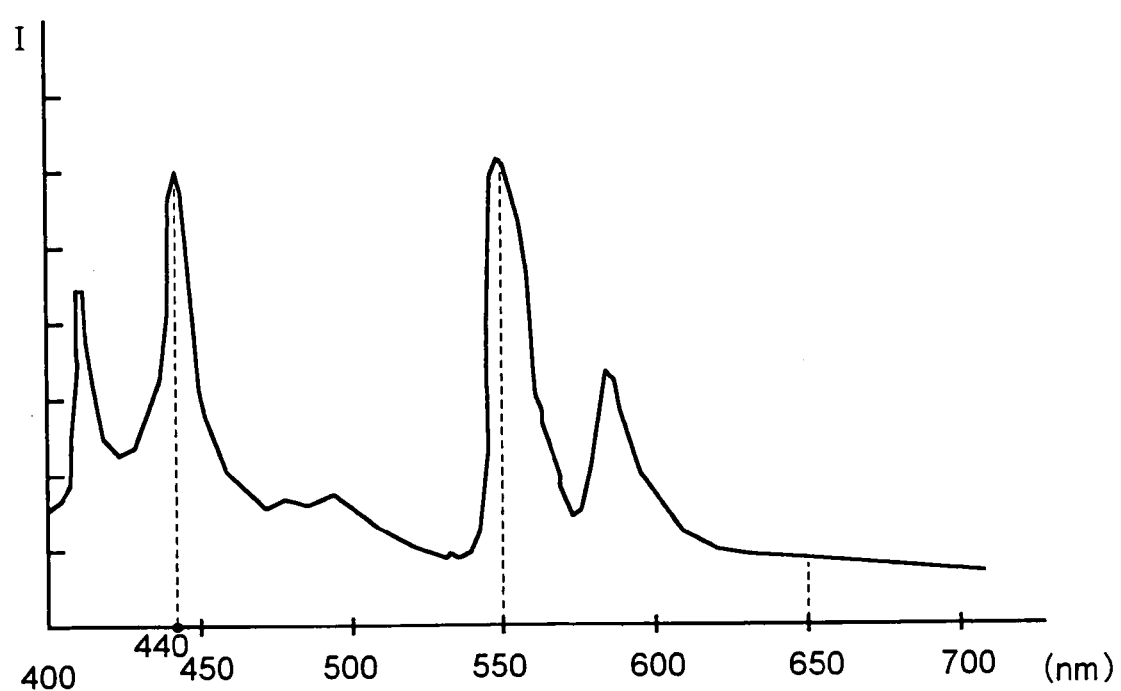
FIG. 10 is a graph of a spectrum of an extra-high pressure mercury lamp according to the first embodiment.

Here, the refracted angle derived from the refracting surface 212 is different depending on the wavelengths of light. For this reason, in an attempt to accurately control the position of the image that is diffracted and projected on the screen 116, it is preferable to take the wavelength of light to be refracted into consideration. For example, the extra-high pressure mercury lamp 101 serving as the light source has a light-emission spectrum distribution shown in FIG. 10. In FIG. 10, the axis of abscissas indicates the wavelength, and the axis of ordinates indicates the predetermined unit of strength. Here, light that has a peak wavelength in the bright line spectrum virtually in the vicinity of 440 nm is used as the B-light, and light that has a peak wavelength virtually in the vicinity of 550 nm is used as the G-light. Moreover, light that has a peak wavelength virtually in the vicinity of 650 nm that is the center wavelength of the light quantity integrated value is used as the R-light. The tilt angle θ and the like of the refracting surface 212 are controlled so that, when lights having these wavelengths are refracted by the refracting surface 212, a predetermined projection image is formed on the screen 116. With this arrangement, it is possible to obtain an image with high quality that is less susceptible color offsets on the screen 116.

NUMERICAL EXAMPLE

More specifically, supposing that the pitch PT of the prism element 211 shown in FIG. 5 is 1 mm, the optimal height (depth) H is about 45.5 μm.

When the group of prisms 210 is formed on the output-side face of each of the liquid crystal panels 120R, 120G and 120B, for example, on a quartz substrate face, numerical examples are given as follows with respect to the tilt angle θ of the prism element 211. For example, suppose that the distance S=8.5 μm, which is the movement on the screen 116. In this case, the tilt angles θ of the respective prism elements 211 for the R-light, G-light and B-light are respectively set to 0.31°, 0.31° and 0.30°. The reason that the tilt angles are different among the respective colors is because, as described earlier, the refractive indexes of the members constituting the group of prisms 210 are different depending on wavelengths. Moreover, when the group of prisms 210 for each of the colors is installed on the incident face for each of the lights having the respective colors of the cross dichroic prism 112, the tilt angles θ of the respective prism elements 211 for the R-light, G-light and B-light are set to 0.10°, 0.10° and 0.099° respectively.

In this manner, since the tilt angle θ is a small value, it is sometimes difficult to form the group of prisms 210 by using, for example, a cutting process. Therefore, a material having a refractive index close to the refractive index of the members forming the group of prisms 210 is formed on the interface of the group of prisms 210 through a molding process. Thus, by increasing the tilt angle θ, it becomes possible to easily manufacture the group of prisms 210. For example, suppose that a difference in refractive indexes between the members forming the group of prisms 210 and the material to be molded is 0.3. In the case when the respective groups of prisms 210 are formed on the output-side faces of the liquid crystal panels 120R, 12G and 120B, on the assumption that the distance S=8.5 μm, which is the movement on the screen 116, the tilt angles θ of the R-light, G-light and B-light are respectively set to 1.16°, 1.17° and 1.18°. Moreover, in these cases, when the respective-color-use groups of prisms 210 are installed on the incident faces for the lights of respective colors of the cross dichroic prisms 112, the tilt angles θ of the respective prism elements 211 for the R-light, G-light and B-light are set to 0.31°, 0.31° and 0.31°.

Second Embodiment

Figure 11:
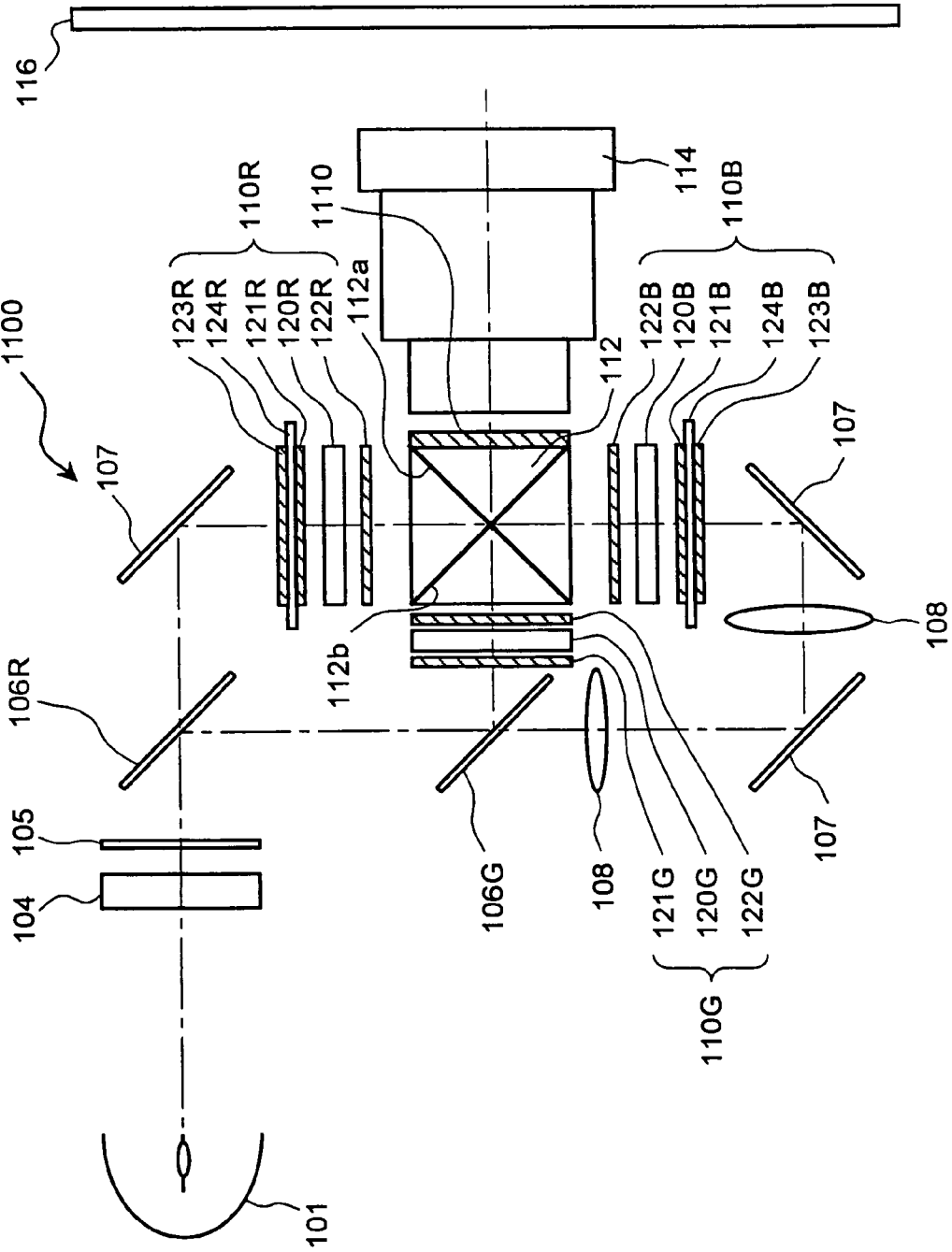
FIG. 11 is a schematic of a projector according to a second embodiment of the present invention.

FIG. 11 is a schematic of a projector 1100 according to a second embodiment of the present invention. Here, those parts that are the same as those of the first embodiment are indicated by the same reference numerals, and overlapping explanations are omitted. According to the second embodiment, with respect to the group of prisms, a group of prisms 1110 serving as a refracting unit is formed on the output-side face of a cross dichroic prism 112 that serves as a color composite optical system.

Figure 12:
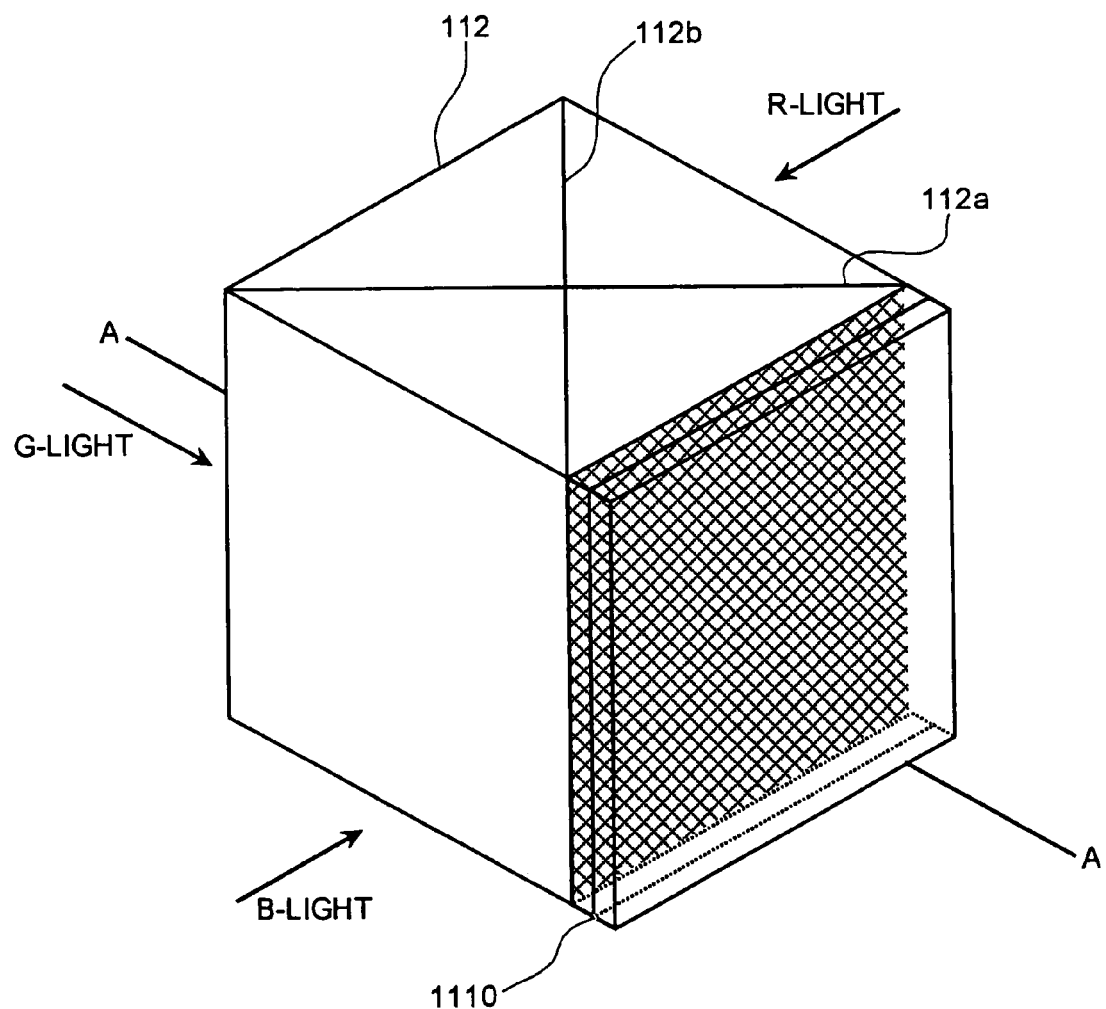
FIG. 12 is a schematic of a group of prisms according to the second embodiment.

FIG. 12 is an enlarged view of the cross dichroic prism 112. On the output-side face of the cross dichroic prism 112 toward the screen 116, a group of prisms 1110, having a structure as described below, is formed by using any one of the manufacturing methods. With this arrangement, since only one group of prisms 1110 is required, the structure is made simpler, making it possible to cut production costs. Here, the group of prisms 1110 may be installed on the incident-side face of the cross dichroic prism 112. Since this arrangement makes it possible to set the refractive angles that correspond to the respective wavelengths, and consequently to optimize the refracted image.

(Process for Manufacturing Prism Elements)

Figure 13:
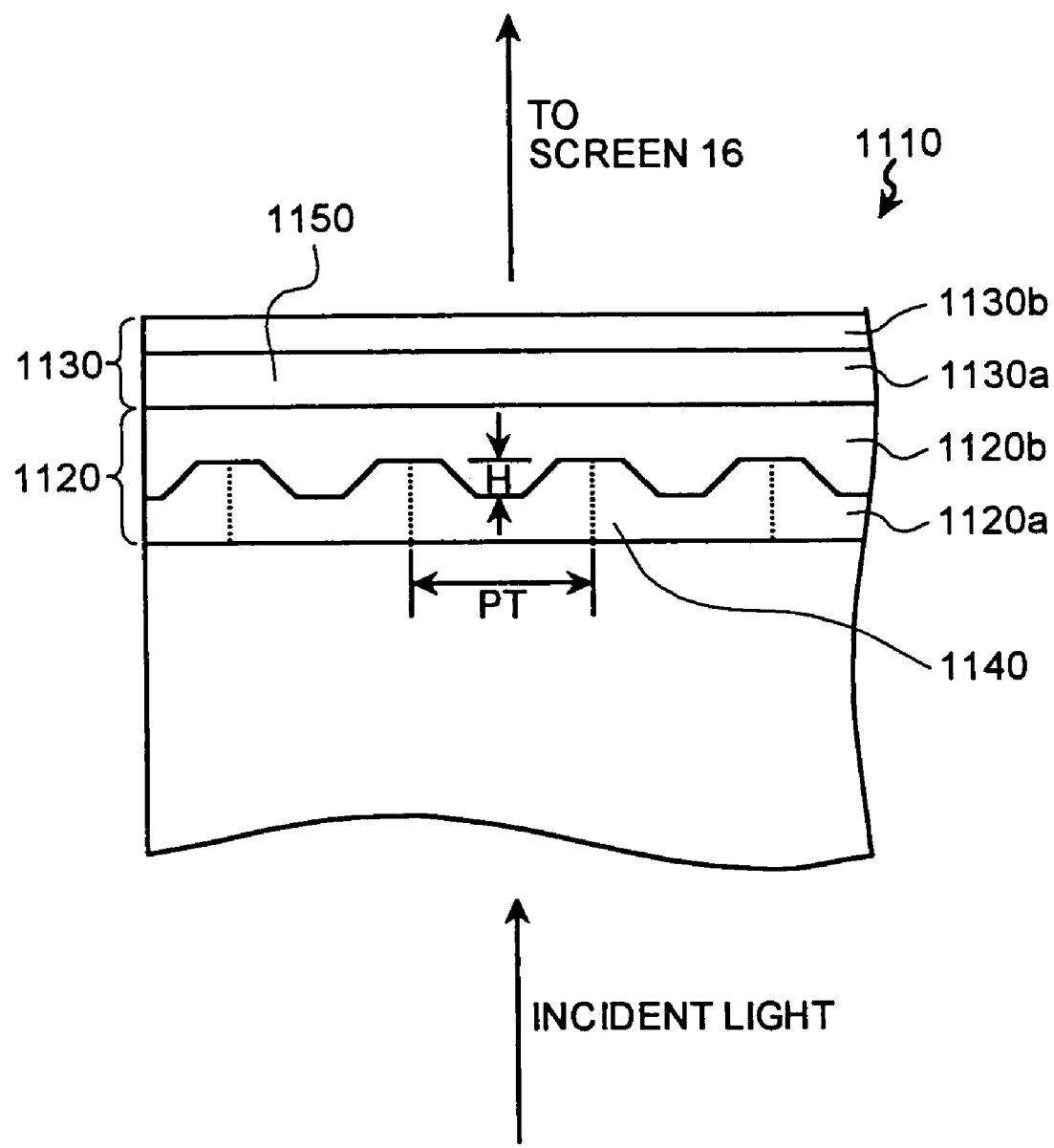
FIG. 13 is a cross-section of the group of prisms according to the second embodiment.

FIG. 13 is a cross-section of the group of prisms 1110 cut along a line A-A shown in FIG. 12. The group of prisms 1110 is constituted by a first refractive layer 1120 and a second refractive layer 1130 placed on the output-side of the first refractive layer. Prism elements 1140 and 1150 are formed on the first refractive layer 1120 and second refractive layer 1130 respectively. Here, with respect to the prism element 1150 formed on the second refractive layer 1130, since only the cross-section along the length direction is viewed, with the shape of the refracting surface being not illustrated.

The following description will discuss a process for manufacturing the prism elements 1140 and 1150. An appropriate amount of an optical epoxy resin having a refractive index n=1.56 is applied to the output-side face of the cross dichroic prism 112. Further, along the direction virtually perpendicular to the face of the drawing, concave and convex portions having a virtually sine-wave form that corresponds to the shape of the prism element 1140 are formed by using a squeegee. Next, the optical epoxy resin is irradiated with ultraviolet rays to be cured so that a lower-side high-refractive-index layer 1120a is formed. Moreover, on this lower-side high-refractive-index layer 1120a, an appropriate amount of optical epoxy resin having a refractive index n=1.38 is applied. The surface of the optical epoxy resin thus applied is flattened by using a flattening squeegee. Then, the optical epoxy resin is irradiated with ultraviolet rays to be cured so that a lower-side low-refractive-index layer 1120b is formed. Next, an appropriate amount of an optical epoxy resin having a high refractive index is applied onto the lower-side low-refractive-index layer 1120b. In the same manner, concave and convex portions having a virtually sine-wave form that corresponds to the shape of the prism element 1150 that extends in the lateral direction on the face of the drawing are formed by using a squeegee. Next, the optical epoxy resin is irradiated with ultraviolet rays to be cured so that an upper-side high-refractive-index layer 1130a is formed. Moreover, on this upper-side high-refractive-index layer 1130a, an appropriate amount of optical epoxy resin having a low refractive index is applied. The surface of the optical epoxy resin thus applied is flattened by using a flattening squeegee. Then, the optical epoxy resin is irradiated with ultraviolet rays to be cured so that an upper-side low-refractive-index layer 1130b is formed.

Here, more preferably, the optical epoxy resin having a high refractive index preferably has such a degree of viscosity that is required for maintaining the concave and convex shape of the predetermined prism element. For example, the optical epoxy resin having a high refractive index preferably has a viscosity of approximately 7 to 25 P·s (=7000 to 25000 cps). Further, the optical epoxy resin having a low refractive index preferably has a low viscosity that allows a flattening process. For example, the optical epoxy resin having a low refractive index preferably has a viscosity of approximately 0.3 to 6 P·s (=300 to 6000 cps). Additionally, the lower-side low-refractive-index layer 1120b and the upper-side low-refractive-index layer 1130b may be formed by using a spin-coating method, a spray-coating method or the like.

Moreover, the group of prisms 1110 may have the same structure as the group of prisms 210 according to the first embodiment. In the case of this structure, a pattern corresponding to a shape of the prism element is preliminarily formed on a pattern sheet by using a hot-plate method or the like. Then, the pattern sheet is cut into an appropriate size required. The pattern sheet thus cut is affixed on the outgoing-face side of the cross dichroic prism 112 by using an optically transparent bonding agent.

NUMERICAL EXAMPLE

According to the present embodiment, a projection image as shown in FIG. 9 is obtained on the screen 116. In particular, since the prism element 1140 has a virtually sine-wave shape, the quantity of light that is allowed to proceed straight without being refracted and the quantity of light that is refracted are made to have a 1 to 1 ratio, that is, to be equal to each other. With respect to a specific numerical value, the optimal height (depth) of the prism element 1140 may be set to 45.5 µm. Thus, in the same manner as the first embodiment, it is possible to obtain a so-called seamless image that is less susceptible to blurring between pixels, that is, a smooth image that is less susceptible to roughened texture.

Moreover, when the distance S=8.5 µm, which is the movement on the screen 116, the tilt angle θ=0.01 deg. In this manner, since the tilt angle θ is a small value, it is sometimes difficult to form the group of prisms 1110 by using, for example, a cutting process. Therefore, a material having a refractive index close to the refractive index of the members forming the group of prisms 1110 is formed on the interface of the group of prisms 1110 through a molding process. Thus, by increasing the tilt angle θ, it becomes possible to easily manufacture the group of prisms 110. For example, suppose that a difference in refractive indexes between the members forming the group of prisms 210 and the material to be molded is 0.3. At this time, on the assumption that the distance S=8.5 µm, which is the movement on the screen 116, the tilt angle θ is set to 0.07°.

Third Embodiment

Figure 14:
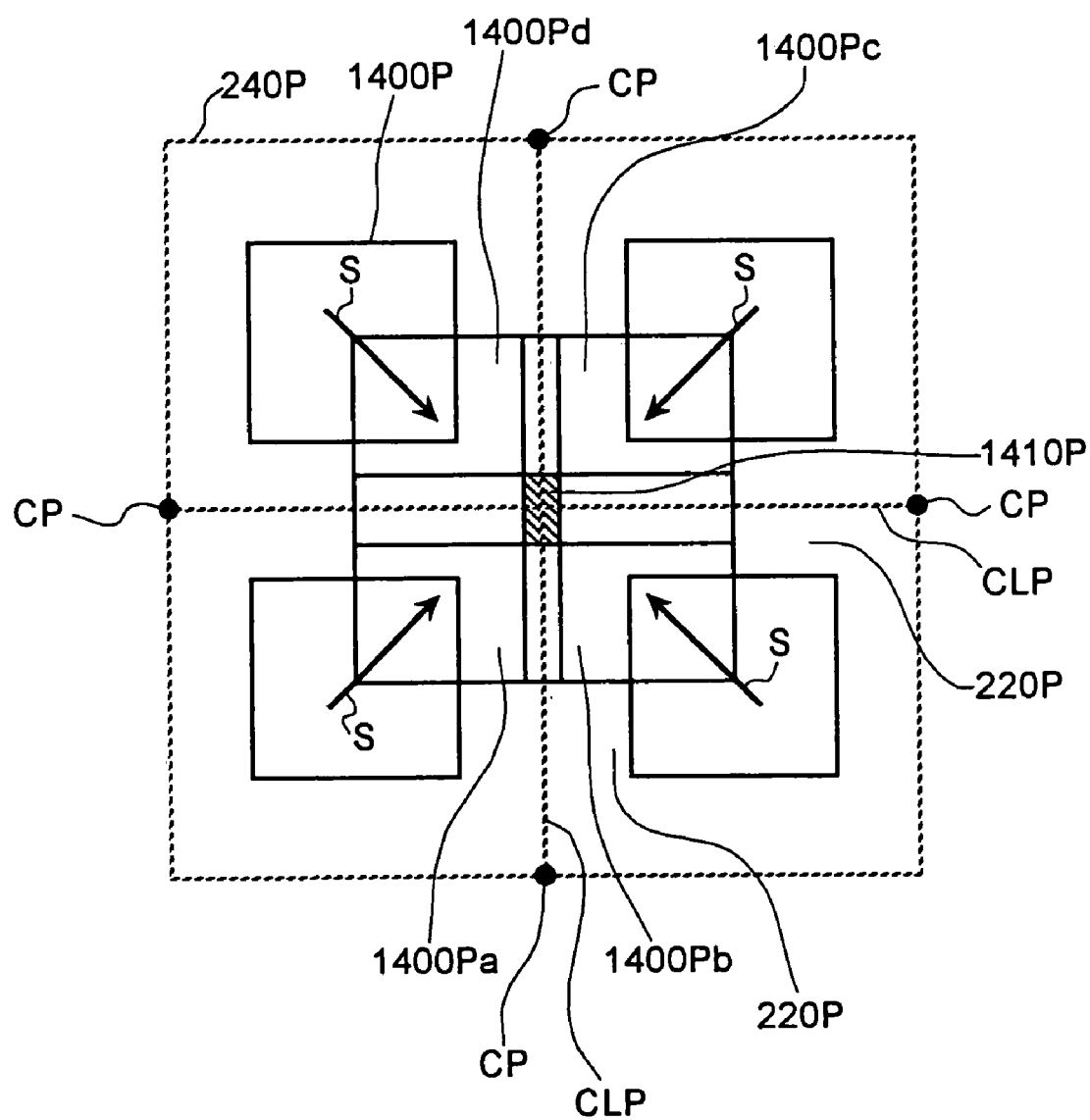
FIG. 14 is a schematic of a projection image according to a third embodiment of the present invention.

FIG. 14 is a schematic of a projection image on the screen 116, which is formed by a projector according to the third embodiment. In the explanations of the present embodiment and thereafter, since the structure of the projector is the same as the structure explained in the first and second embodiments, overlapping explanations are omitted. The present embodiment is different from the first embodiment and the second embodiment in the directions of the refracting surfaces, the tilt angles θ and the area ratios of the prism elements 211, 1140, and 1150. In the present embodiment and thereafter, various combinations among the directions of the refracting surfaces, the tilt angles θ and the area ratios will be mainly explained.

As shown in FIG. 14, projection images according to the present embodiment include an opening section image 1400P (direct transmission image) derived from light that is allowed to proceed straight without being refracted by the flat portions of the prism elements 1140, 1150, and opening section images 1400Pa, 1400Pb, 1400Pc and 1400Pd that are formed at positions that are respectively apart from the opening section image 1400P by a distance S in each of the directions with 45° indicated by arrows. With this arrangement, the inside of the periodic area image 240P is filled with the opening section images without any clearance. Moreover, the present embodiment is characterized in that at least one portion among the adjacent four opening section images 1400Pa, 1400Pb, 1400Pc and 1400Pd is overlapped on the black matrix image 220P so that a new opening section image 1410P is formed.

Thus, the new opening section image 1410P, which is an area formed by overlapped portions of the adjacent pixel images 1400P, is allowed to newly form a third opening section image based upon image information derived from at least the adjacent first opening section image 1400Pa and second opening section image 1400Pb. Consequently, it is possible to improve the density of the number of pixels to be projected.

Fourth Embodiment

Figure 15:
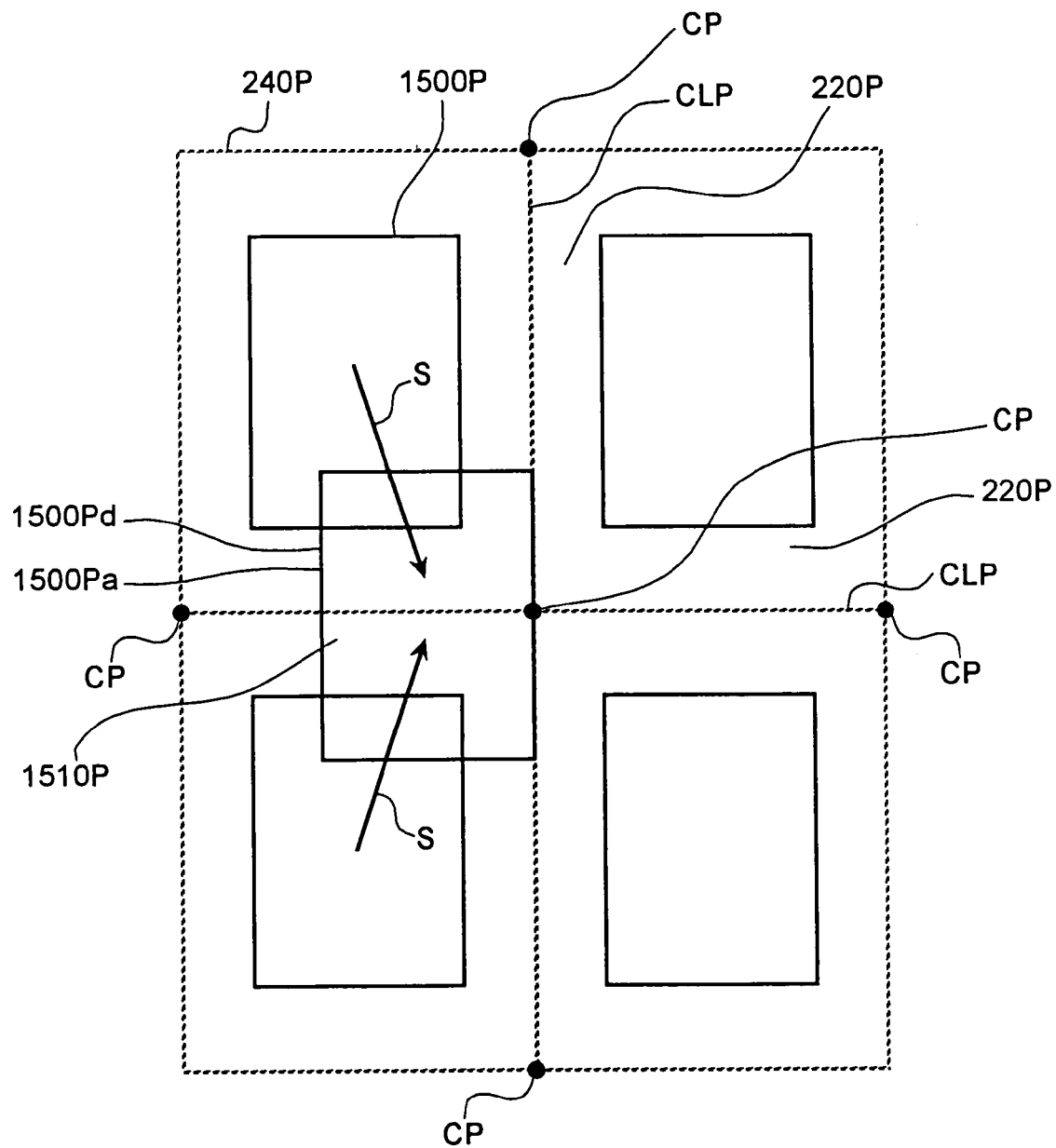
FIG. 15 is a schematic of a projection image according to a fourth embodiment of the present invention.

FIG. 15 is a schematic of a projection image on the screen 116, which is formed by a projector according to the fourth embodiment. As shown in FIG. 15, projection images according to the present embodiment include, for example, an opening section image 1500P (direct transmission image) derived from light that is allowed to proceed straight without being refracted by the flat portions of the prism elements 1140, 1150, and opening section images 1500Pa and 1500Pd that are formed at positions that are respectively apart from the opening section image 1500P by a distance S in each of the directions with 45° indicated by arrows. With this arrangement, the inside of the periodic area image 240P is filled with the opening section images without any clearance. Moreover, the present embodiment is characterized in that virtually entire areas of the adjacent two opening section images 1500Pa and 1500Pd are overlapped on the black matrix image 220P so that a new opening section image 1510P is formed. With this arrangement, a third opening section image is newly formed based upon image information derived from the adjacent first opening section image 1500Pa and second opening section image 1500Pd. Consequently, it is possible to improve the density of the number of pixels to be projected.

(Variation in Prism Shape)

Figure 16A:
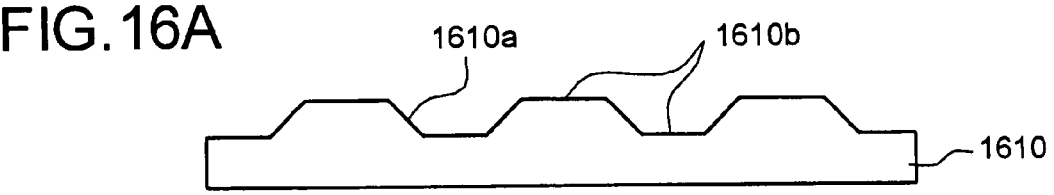
FIG. 16A is a cross-section for illustrating a variation of the group of prisms.
Figure 16B:
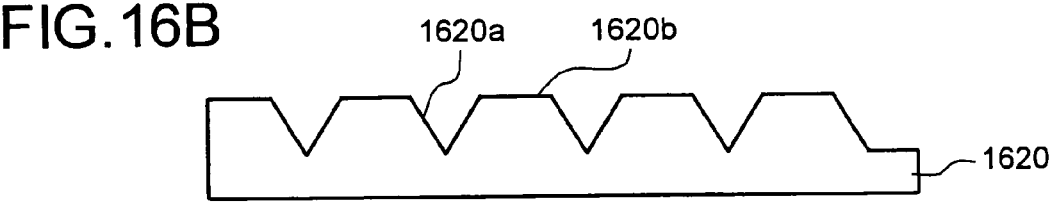
FIG. 16B is a cross-section for illustrating another variation of the group of prisms.
Figure 16C:
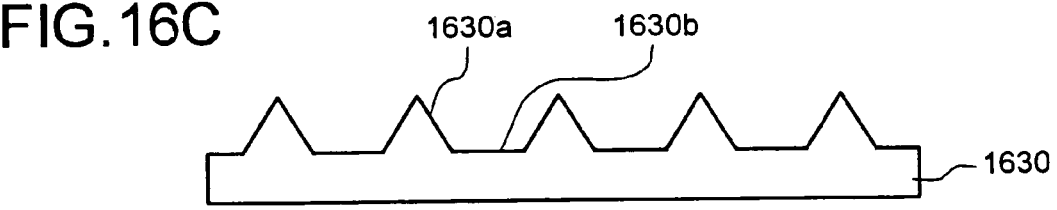
FIG. 16C is a cross-section for illustrating still another variation of the group of prisms.
Figure 16D:
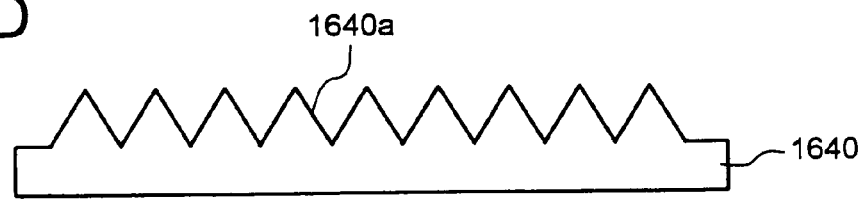
FIG. 16D is a cross-section for illustrating a variation of the group of prisms.

FIG. 16A to FIG. 16D are cross-sections for illustrating various variations of the shape of a prism element. For example, FIG. 16A shows a group of prisms 1610 having a trapezoidal shape having a refracting surface 1610a and a flat portion 1610b. FIG. 16B shows a group of prisms 1620 having a triangular shape having a refracting surface 1620a and a flat portion 1620b. FIG. 16C shows a group of prisms 1630 having a triangular shape having a refracting surface 1630a and a flat portion 1630b. FIG. 16D shows a group of prisms 1640 of a braze type that is formed by only a refracting surface 1640a. In these manners, various variations are prepared by using the direction of the refracting surface, the tilt angle and the area as parameters.

Fifth Embodiment

Figure 17A:
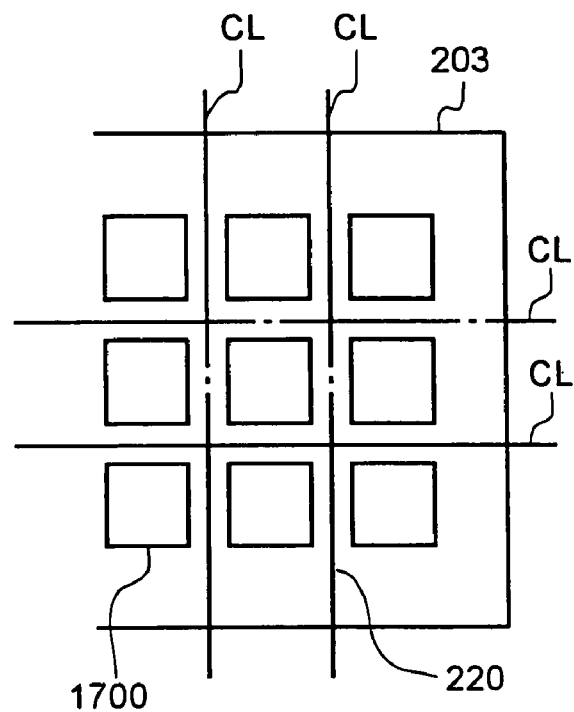
FIG. 17A is a schematic for illustrating a layout of opening sections according to a fifth embodiment of the present invention.
Figure 17B:
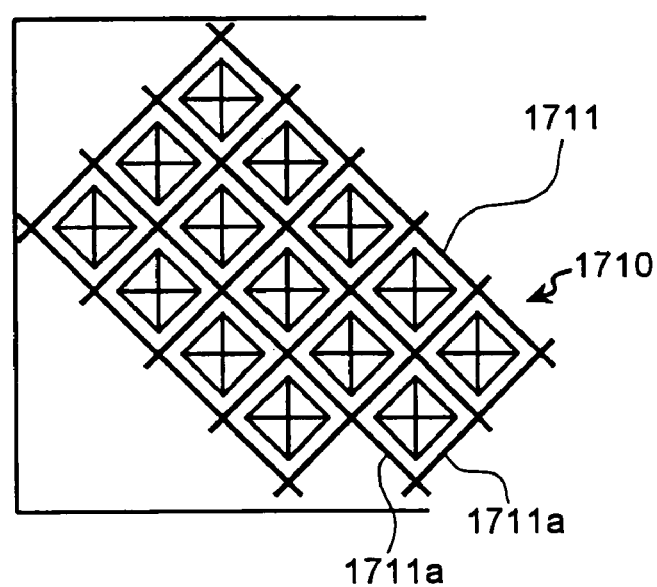
FIG. 17B is a schematic for illustrating a layout of a group of prisms according to the fifth embodiment.

FIG. 17A, FIG. 17B, and FIG. 17C are schematics for illustrating the positional relation between an opening section 1700 and a group of prisms 1710. With respect to the direction of center lines CL of a black matrix layer 203 shown in FIG. 17A, directions along the respective sides 1711a of prism elements 1711 are arranged to form virtually 45° as shown in FIG. 17B. As described above, light that has passed through one opening section 1700 is made incident on one portion of a group of prisms 1710 constituted by a plurality of prism elements 1711.

As shown in FIG. 17C, each of the prism elements 1711 has a virtually square shape. The prism element 1711 has polygonal cone shape prism elements, that is, for example, pyramid-shaped refracting surfaces 1711a, 1711b, 1711c and 1711d. Moreover, a flat portion 1713 is formed on the periphery of each of the refracting surfaces 1711a, 1711b, 1711c and 1711d.

Figure 18:
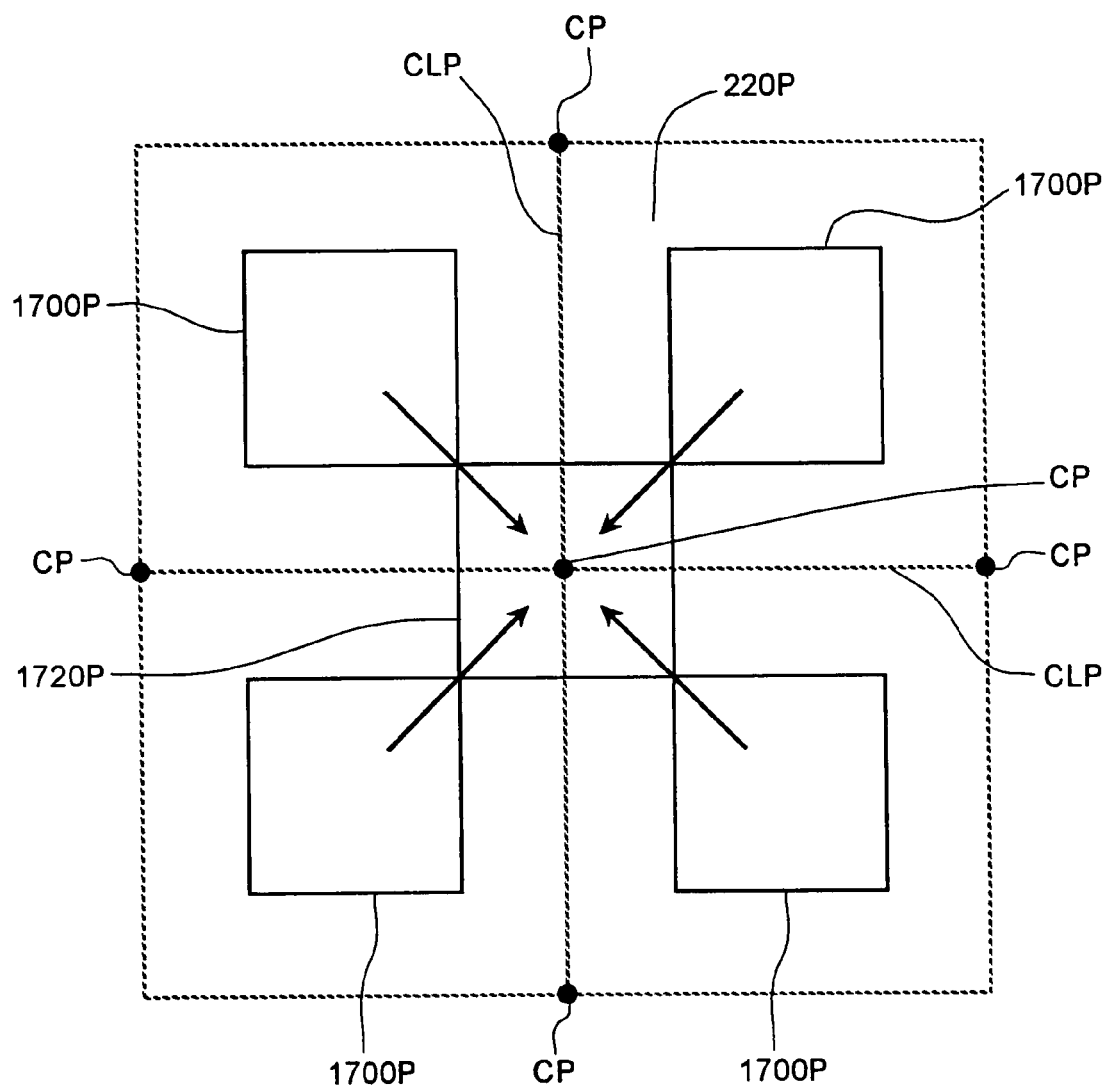
FIG. 18 is a schematic of a projection image according to the fifth embodiment.

Next, referring to FIG. 18, the following description will discuss a projection image on the screen 116 according to the present embodiment. Lights that have passed through the flat portion 1713 of the prism element 1711 are allowed to form opening section images (direct transmission image) 1700P. Further, respective refracting surfaces 1711a, 1711b, 1711c and 1711d form opening section images 1720P that are projection images in the directions with 45° to the center line image CLP. According to the present embodiment, the tilt angles of the respective refracting surfaces 1711a, 1711b, 1711c and 1711d are set in such a manner that four projection images from the four adjacent opening sections 1700 are overlapped at a position centered on the central intersection point CP of the four adjacent opening section images 1700P to form a new opening section image 1720P. In this manner, since the new opening section image 1720P is formed, the resolution on appearance can be improved to 1.25 times.

Here, the prism element 1711 has a unit area T. Further, the respective refractive interfaces 1711a, 1711b, 1711c and 1711d respectively have areas T/8, and the flat portion 1713 has an area 4T/8. In this case, on the screen 116, the quantity of light in the opening section image (direct transmission image) 1700P is proportional to 4T/8=T/2. Moreover, the quantity of light to form the new opening section image 1720P is proportional to 4×(T/8)=T/2. In this manner, by controlling the areas of the respective faces of the prism element 1711, the brightness of the respective projection images can be desirably set to, for example, virtually the same level as shown by the present embodiment. Thus, it becomes possible to obtain a smooth image.

Sixth Embodiment

Figure 19A:
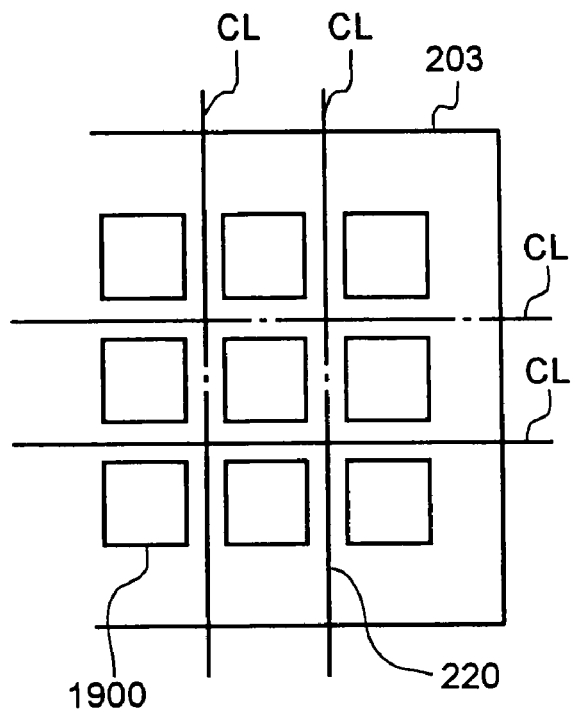
FIG. 19A is a schematic for illustrating a layout of opening sections according to a sixth embodiment of the present invention.
Figure 19B:
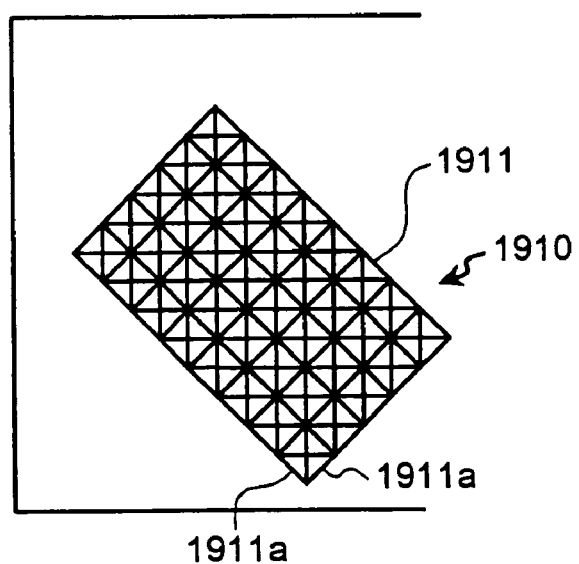
FIG. 19B is a schematic for illustrating a layout of a group of prisms according to the sixth embodiment.
Figure 19C:
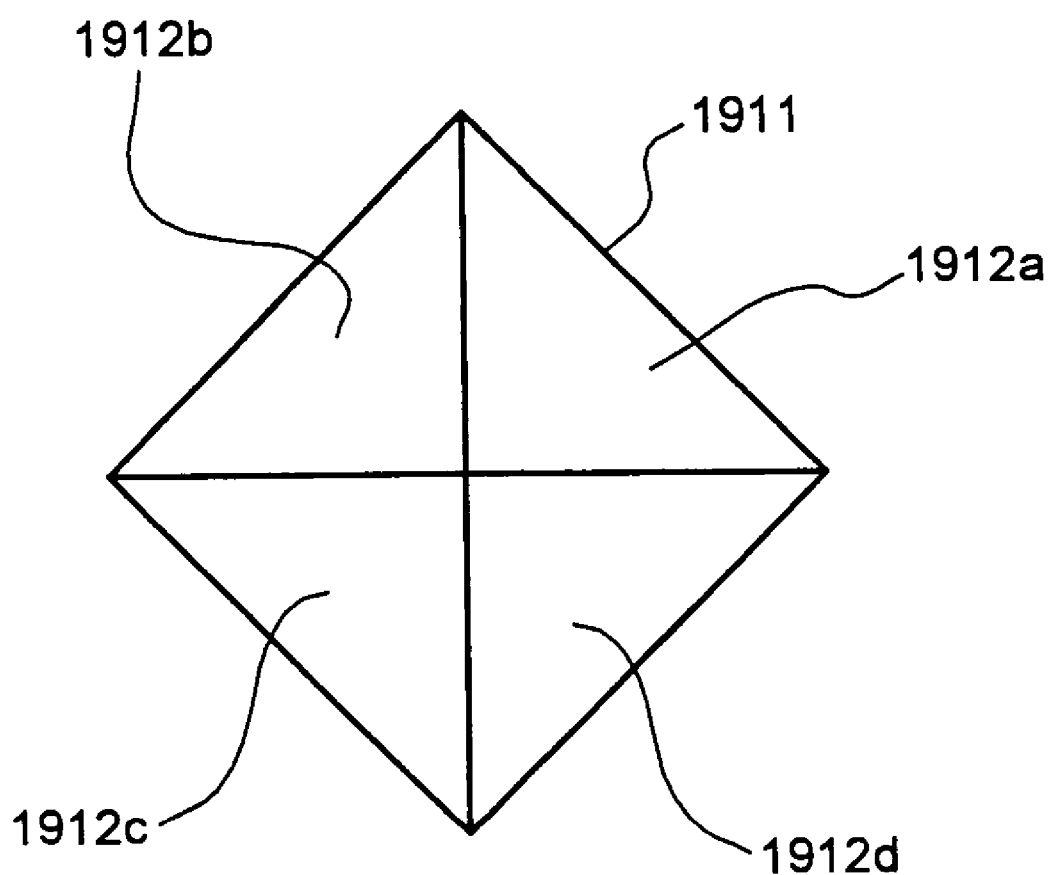
FIG. 19C is a schematic for illustrating a shape of a prism according to the sixth embodiment.

FIG. 19A, FIG. 19B, and FIG. 19C are schematics for illustrating the positional relation between an opening section 1900 and a group of prisms 1910. With respect to the direction of center lines CL of a black matrix layer 203 shown in FIG. 19A, directions along the respective sides 1911a of prism elements 1911 are arranged to form virtually 45° as shown in FIG. 19B. As described above, light that has passed through one opening section 1900 is made incident on one portion of a group of prisms 1910 constituted by a plurality of prism elements 1911.

As shown in FIG. 19C, each of the prism elements 1911 has a virtually square shape. The prism element 1911 has polygonal cone shape prism elements, that is, for example, refracting surfaces 1912a, 1912b, 1912c and 1912d having a pyramid shape. Here, no flat portion is prepared.

Figure 20:
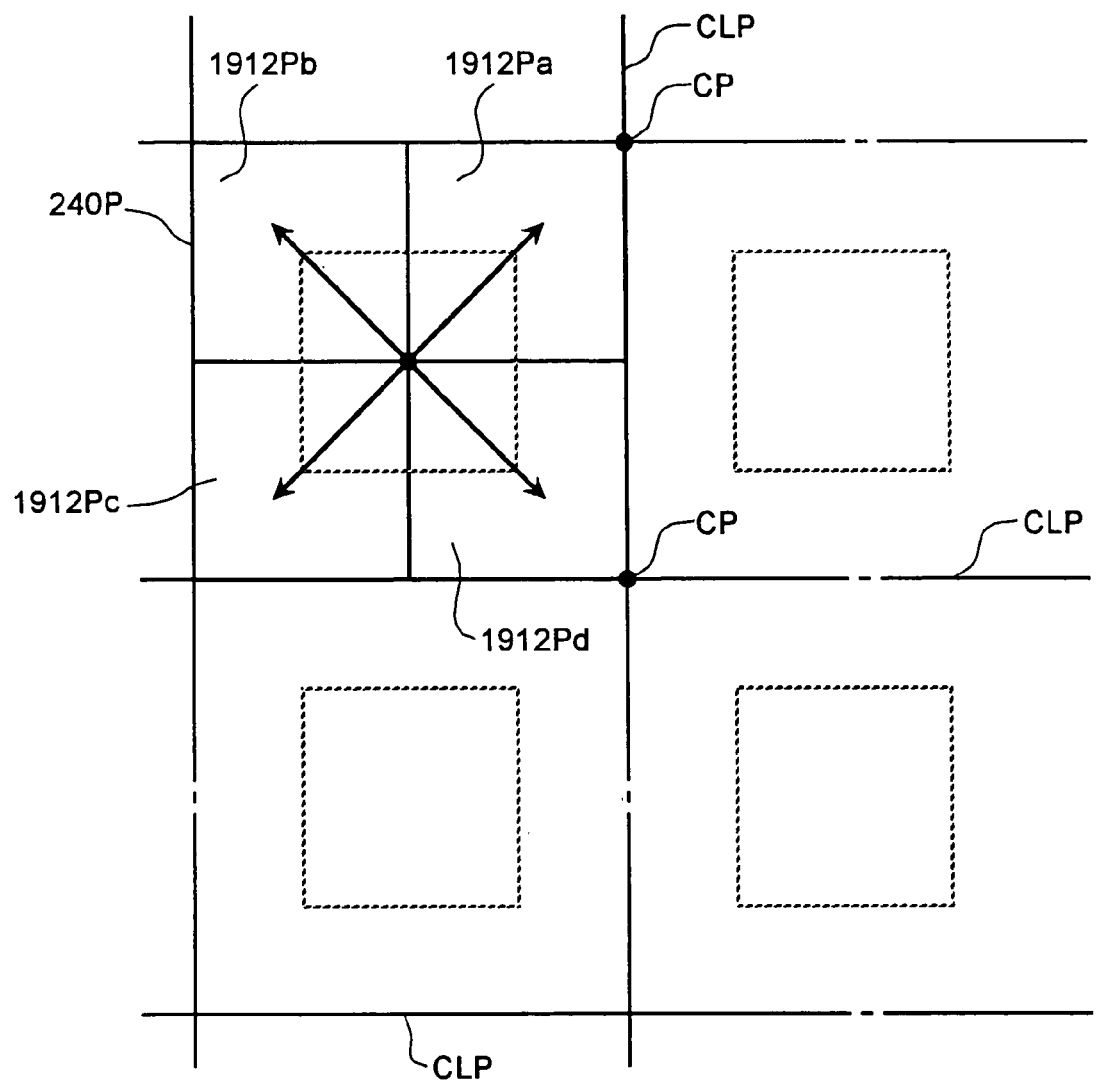
FIG. 20 is a schematic of a projection image according to the sixth embodiment.

Next, referring to FIG. 20, the following description will discuss a projection image on the screen 116 according to the present embodiment. The respective refracting surfaces 1912a, 1912b, 1912c and 1912d form projection images in the directions with 45° to the center line image CLP. According to the present embodiment, the tilt angles of the respective refracting surfaces 1712a, 1712b, 1712c and 1712d are set in such a manner that opening section images 1912Pa, 1912Pb, 1912Pc and 1912Pd, which are four projection images from the opening section 1900, are projected into the periodic area image 240P without being overlapped. Here, the prism element 1911 has no flat portion. For this reason, no projection image (indicated by a dot line in FIG. 20) derived from components directly transmitted through the prism element 1911 is formed. In this manner, since no black matrix image is present, it becomes possible to obtain a seamless, smooth image.

Here, the prism element 1911 has a unit area T. Further, the respective refractive interfaces 1912a, 1912b, 1912c and 1912d respectively have areas T/4. In this case, on the screen 116, the opening section images 1912Pa, 1912Pb, 1912Pc and 1912Pd are respectively equal to one another to have a quantity of light that is proportional to the area T/4. Thus, it becomes possible to obtain a smooth, even image.

Seventh Embodiment

Figure 21:
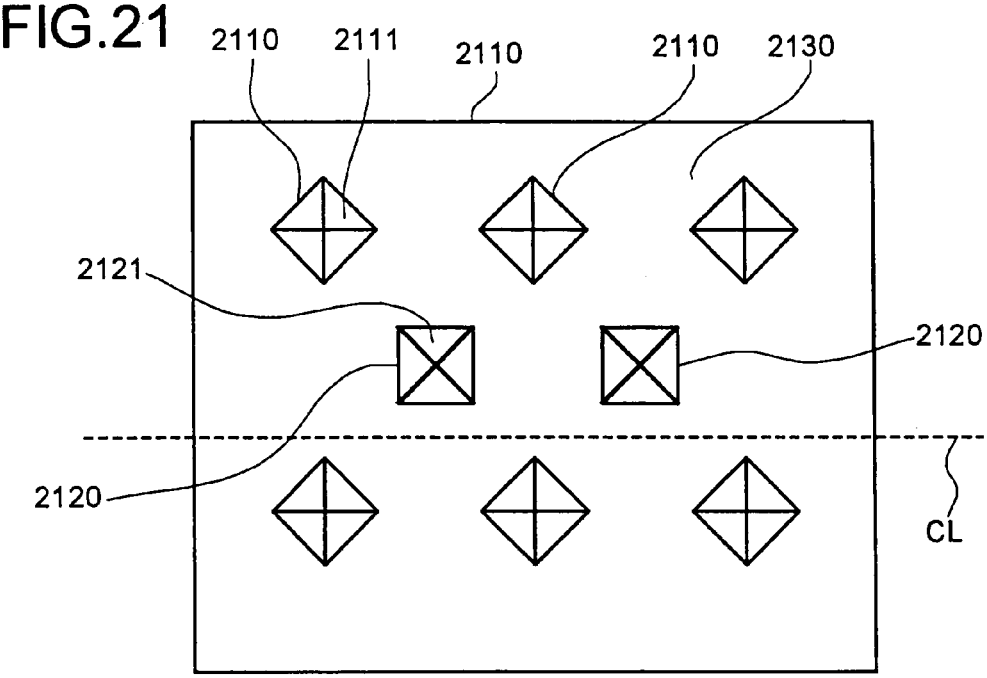
FIG. 21 is a schematic of a group of prisms according to the seventh embodiment.

FIG. 21 is an enlarged view of one portion of a group of prisms 2100 according to the seventh embodiment. This group of prisms 2100 is constituted by a first prism element 2110 having a pyramid shape and a second prism element 2120 having a pyramid shape. The first prism element 2110 is formed so that one side thereof is allowed to make virtually 45° to the center line CL. The second prism element 2120 is formed so that one side thereof is made virtually in parallel with the center line CL. Moreover, a flat portion 2130 is formed on the periphery of each of the first prism element 2110 and the second prism element 2120.

Figure 22:
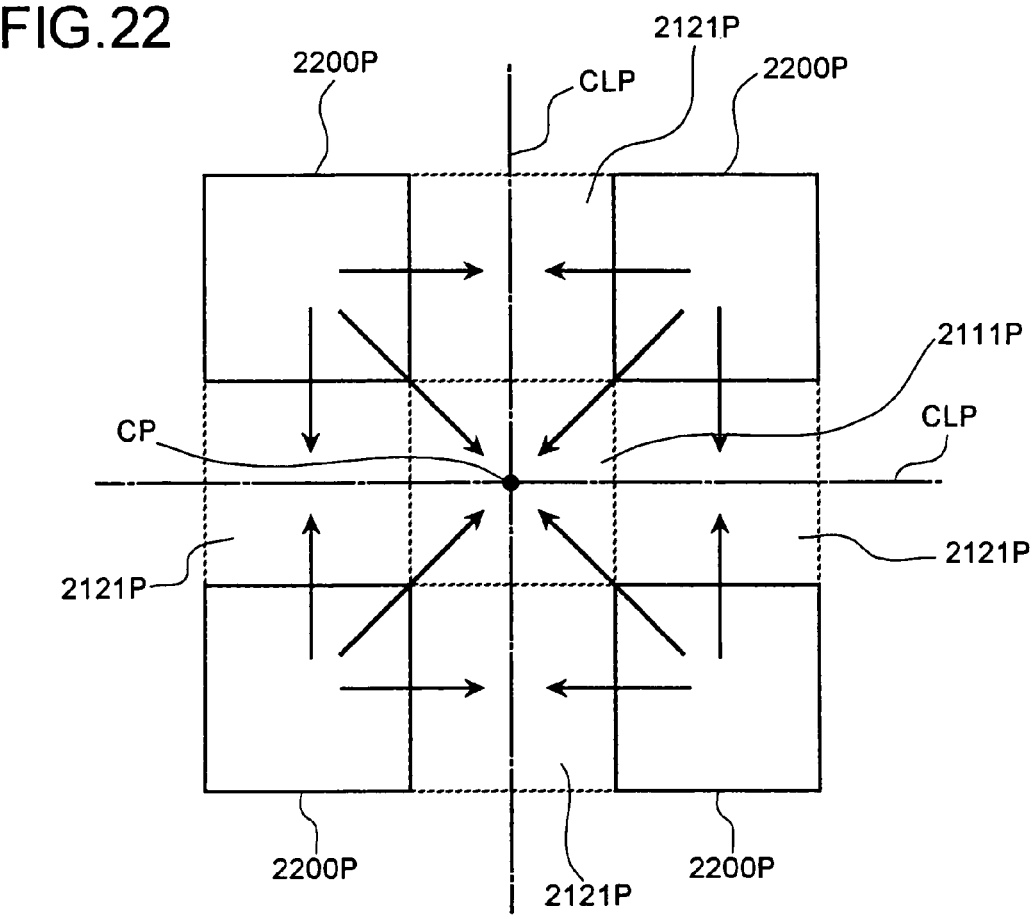
FIG. 22 is a schematic of a projection image according to a seventh embodiment of the present invention.

Next, referring to FIG. 22, the following description will discuss a projection image on the screen 116 according to the present embodiment. Lights that have passed through the flat portion 2130 are allowed to form opening section images (direct transmission image) 2200P. Further, the refracting surface 2111 of the first prism element 2110 forms an opening section image 2111P in a direction with 45° to the center line image CLP. The refracting surface 2121 of the second prism element 2120 forms an opening section image 2121P in a direction parallel to the center line image CLP. Moreover, the directions and tilt angles of the refracting surfaces are set so that the black matrix image is filled with these projection images without any clearance. Thus, it is possible to obtain a smooth image. It is also possible to provide a displaying process with double density.

Figure 23:
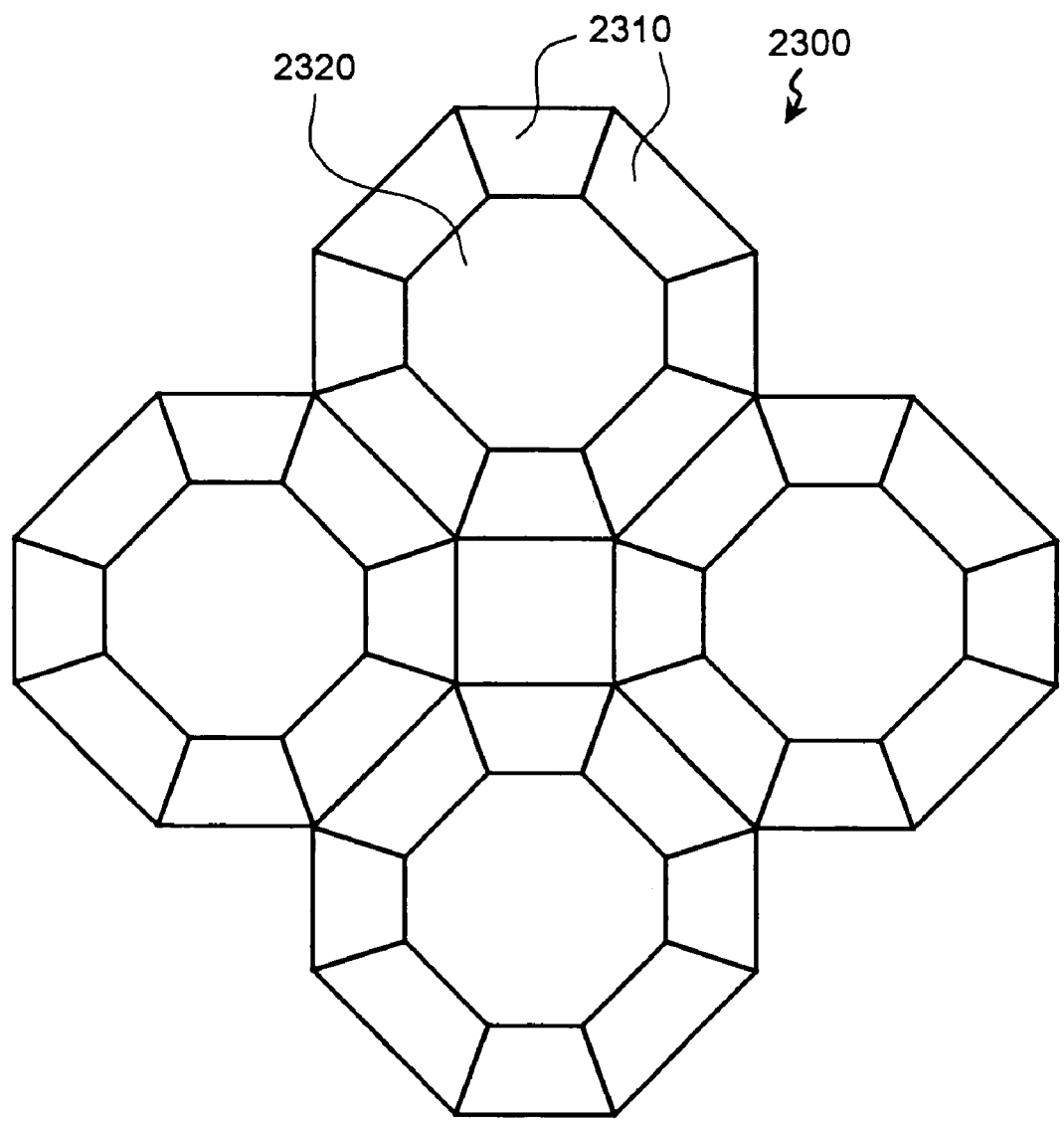
FIG. 23 is a schematic for illustrating an example of modification of the group of prisms.

With respect to the area ratios of the refracting surfaces, the area of the refracting surface 2111 is set to T/16, the area of the refracting surface 2121 is set to 2T/16, and the area of the flat portion 2130 is set to 4T/16 respectively to the unit area T. Thus, the respective quantities of light for the projection images are made virtually equal to each other. Here, the shape of the group of prisms that exert the same refracting functions as those according to the present embodiment can be modified in various manners. For example, a group of prisms 2300 that has a refracting surface 2310 and a flat portion 2320 as shown in FIG. 23 may be used.

Eighth Embodiment

Figure 24:
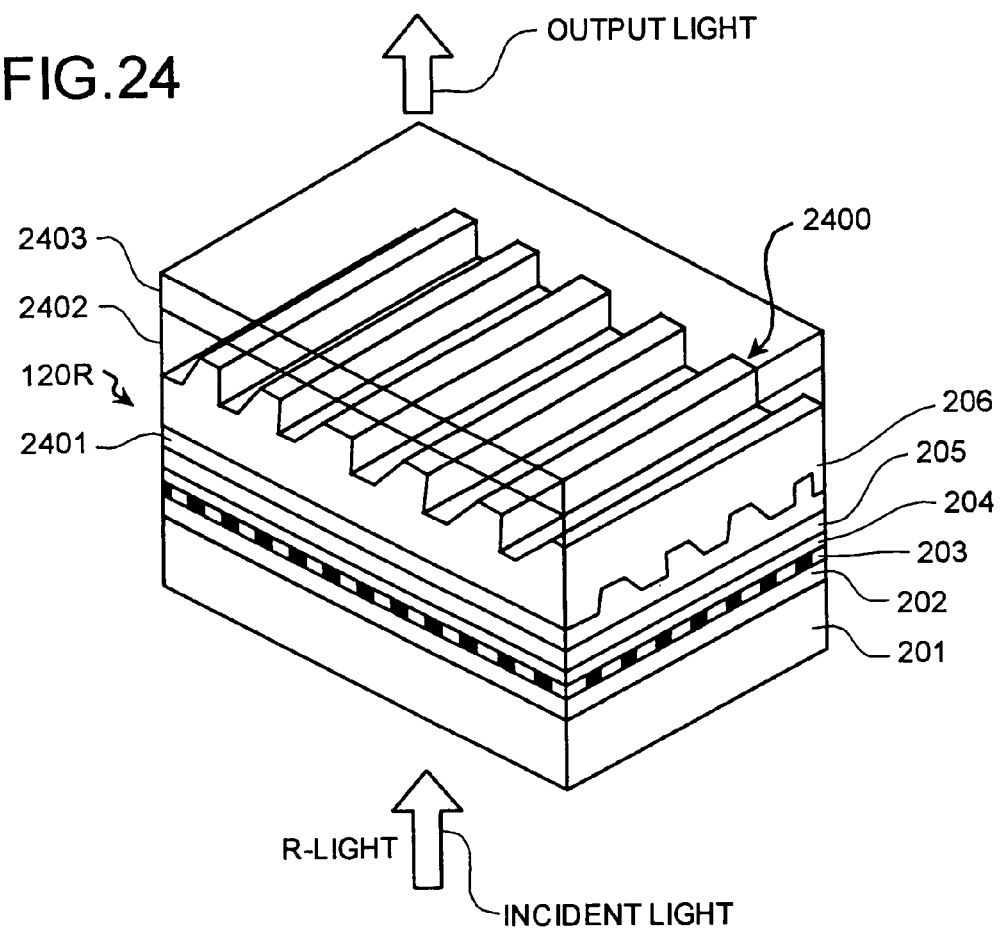
FIG. 24 is a schematic of a liquid crystal panel according to an eighth embodiment of the present invention.

FIG. 24 is a perspective cross-sectional view that shows a liquid crystal panel 120R of a space light modulating apparatus according to the eighth embodiment. The present embodiment is different from the first embodiment in the structure of a group of prisms 2400. Those parts that are the same as those according to the first embodiment are indicated by the same reference numerals and overlapping description is omitted. The group of prisms 2400 is secured to a TFT substrate 205 through a bonding layer 2401 on its incident side. Further, the group of prisms 2400 is secured to a cover glass plate 2403 through a bonding layer 2402 on its output-side.

Figure 25:
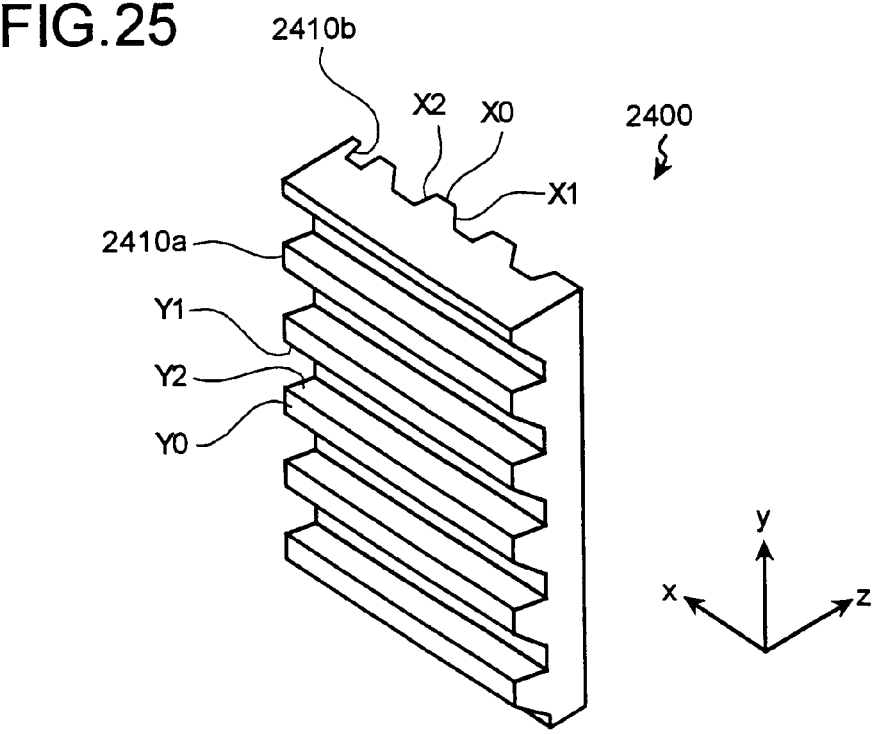
FIG. 25 is a schematic of a group of prisms according to the eighth embodiment.

FIG. 25 is a schematic of the group of prisms 2400 according to the present embodiment. The refracting unit of the group of prisms 2400 is constituted by two sets of prism elements 2410a and 2410b. The prism element 2410a has a virtually trapezoidal shape in its cross-sectional shape in the y-axis direction that is the first direction. Further, the length direction of the prism element 2410a corresponds to the x-axis direction that is the second direction virtually orthogonal to the y-axis direction that is the first direction. With respect to the trapezoidal shape in the cross-sectional shape in the y-axis direction of the prism element 2410a, two slopes Y1 and Y2 function as refracting surfaces. Moreover, with respect to the cross-sectional shape in the y-axis direction of the prism element 2410a, an upper face Y0 serves as a flat portion. Thus, lights that have been made incident on the slope Y1 or the slope Y2 are refracted in a direction that corresponds to the angle of the slope. A refracted transmission image is formed by the refracted lights. Moreover, lights that have been made incident on the upper face Y0 are transmitted as they are. The lights, transmitted as they are, are allowed to form a direct transmission image.

The prism element 2410b has the same structure as that of the prism element 2410a. With respect to the cross-sectional shape in the x-axis direction of the prism element 2410b, two slopes X1 and X2 serve as refracting surfaces. Moreover, with respect to the cross-sectional shape in the x-axis direction of the prism element 2410b, an upper face X0 serves as a flat portion. Here, the two sets of the prism elements 2410a and 2410b are arranged so that the respective length directions are virtually orthogonal to each other.

Moreover, according to the present embodiment, the flat face side of the prism element 2410a and the flat face side of the prism element 2410b are secured so as to be aligned face to face with each other. However, not limited to this structure, any one of the following structures (1) to (3) may be used.

(1) A structure in which a face on which slopes Y1, Y2, etc. are formed of the prism element 2410a and a face on which slopes X1, X2, etc. are formed of the prism element 2410b are secured so as to be aligned face to face with each other.

(2) A structure in which a face on which slopes Y1, Y2, etc. are formed of the prism element 2410a and a flat face of the prism element 2410b are secured so as to be aligned face to face with each other.

(3) A structure in which a flat face of the prism element 2410a and a face on which slopes X1, X2, etc. are formed of the prism element 2410b are secured so as to be aligned face to face with each other.

Here, FIG. 24 and FIG. 25 explain the structure in which the prism faces are made in contact with each other; however, another structure in which the prism faces are made in contact with air may be used.

Figure 26:
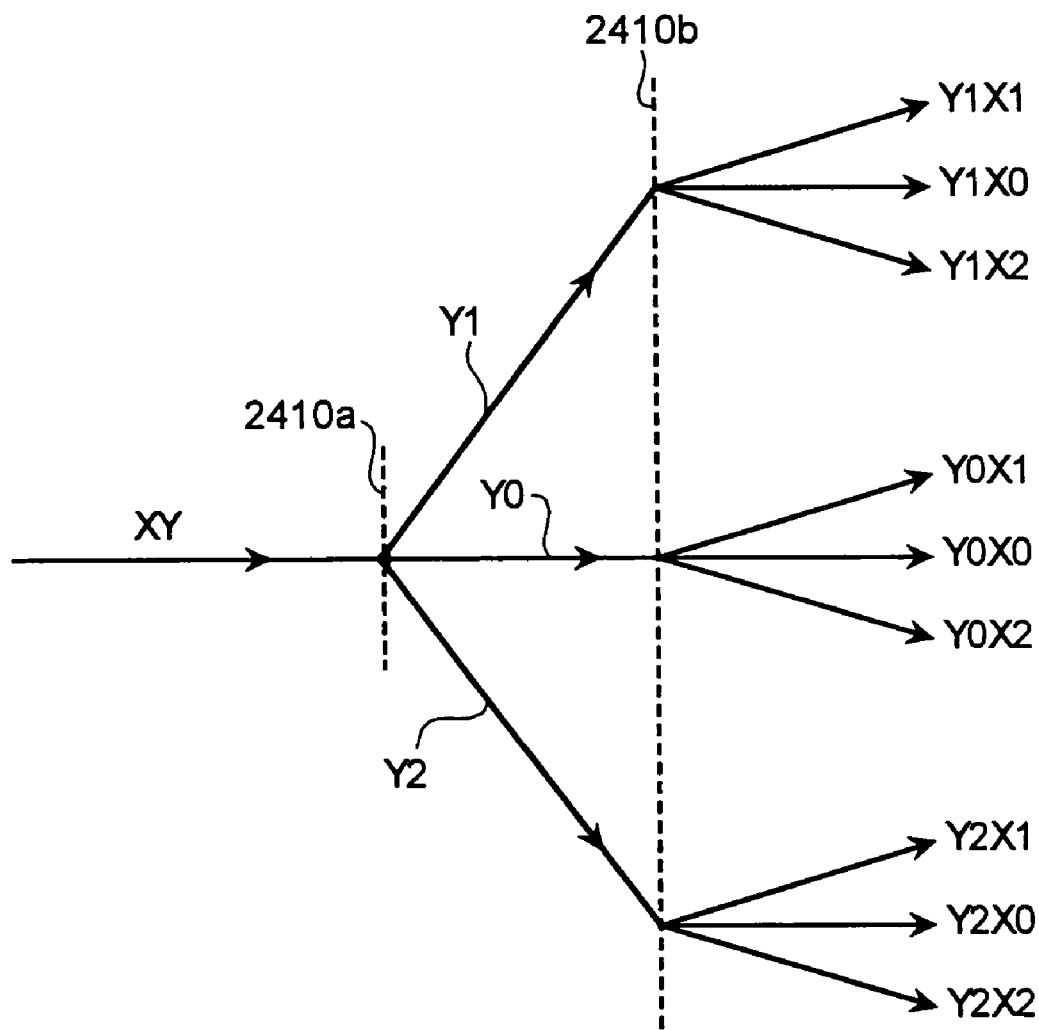
FIG. 26 is a schematic for illustrating branched lights by refraction.

FIG. 26 is a schematic for illustrating the branched state of incident light by the group of prisms 2400. The incident light XY proceeds from left to right. Here, in one portion of FIG. 26, for convenience of explanation, lights are specified by using codes of slopes Y0, Y1 and Y2. The incident light XY are branched by the prism element 2410a indicated by a dot line into three lights, that is, lights Y1 and Y2 refracted by the slope and a light Y0 that is transmitted through the upper face as it is. Each of the three lights Y0, Y1 and Y2 is further branched by the prism element 2410b into three lights. As a result, the incident light XY is branched into nine lights Y1X1, Y1X0, Y1X2, Y0X1, Y0X0, Y0X2, Y2X1, Y2X0 and Y2X2.

Figure 27:
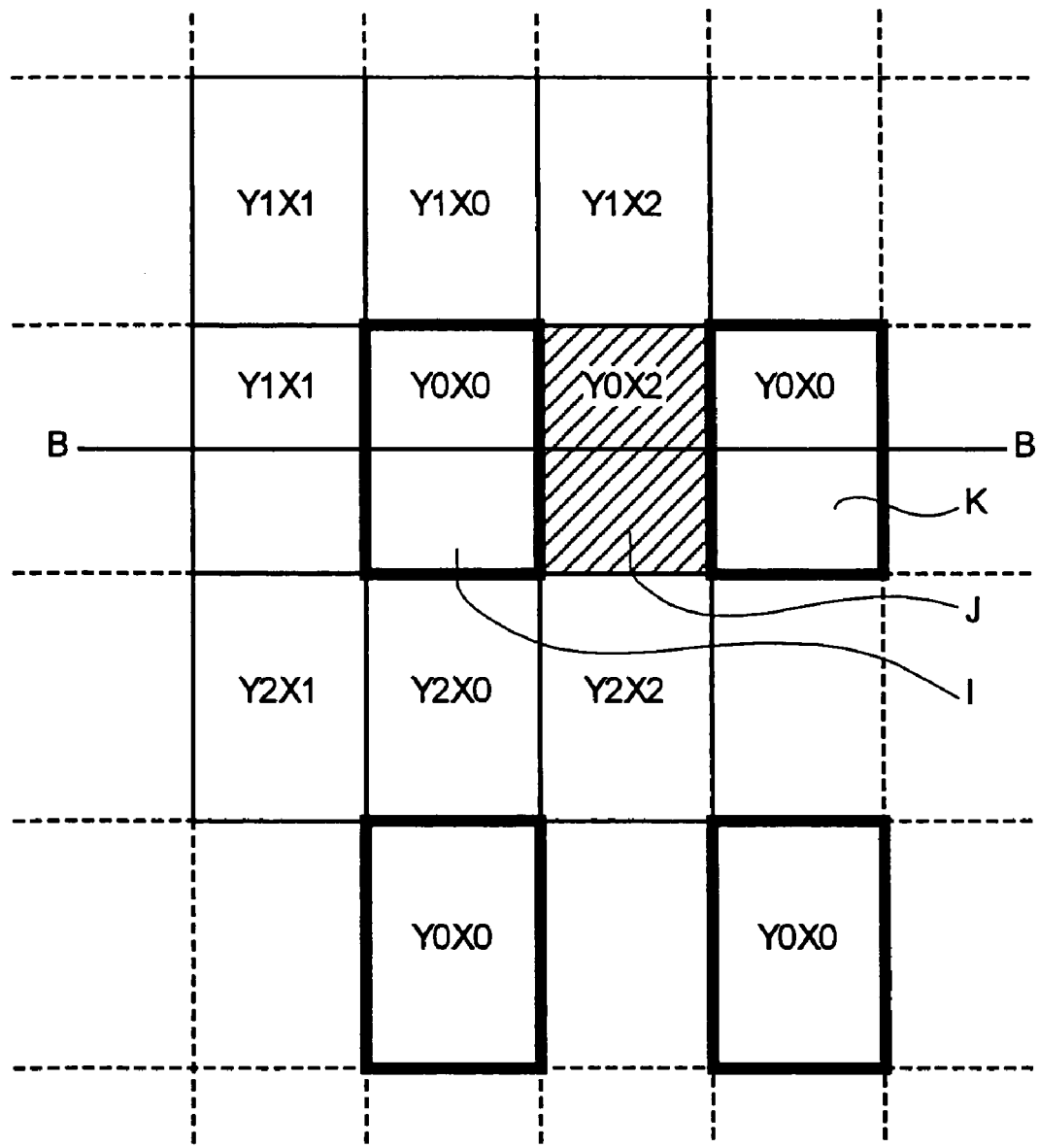
FIG. 27 is a schematic of a refracted projection image.

Next, referring to FIG. 27, positions of nine branched lights on a projection surface are explained. The area of the direct transmission image formed by the light Y0X0 is indicated by an area surrounded by a thick frame. Projection images, derived from the refracted lights, are formed in directions respectively orthogonal to the length directions of the prism elements 2410a and 2410b. According to the present embodiment, the length directions of the two sets of the prism elements 2410a and 2410b are made virtually orthogonal to each other. Thus, on the periphery of the area of the direct transmission image formed by the light Y0X0, areas of refracted transmission images are formed by eight lights, Y1X1, Y1X0, Y1X2, Y0X1, Y0X2, Y2X1, Y2X0 and Y2X2. In FIG. 27, the respective areas are indicated by the codes of the lights. Moreover, the direct transmission image, formed by the light Y0X0, is formed periodically adjacent to the position of each of the opening sections 230 as shown in FIG. 3. According to the present embodiment, a refracted transmission image is formed in an area between the direct transmission images derived from the light Y0X0, by the prism elements 2410a and 2410b. With this arrangement, it becomes possible to prevent the viewer from recognizing the black matrix image 220P (FIG. 4) that is a light-shielding part.

Moreover, according to the present embodiment, supposing that on the screen 116 (FIG. 1), the sum of intensities of lights from the upper face Y0 of the prism element 2410a and the upper face X0 of the prism element 2410b that form the flat portion is indicated by PW0 and that the sum of intensities of lights transmitted through the slopes Y1, Y2, X1 and X1 that form refracting faces is indicated by PW1, the following inequality is satisfied PW0≧PW1.

The sum of intensities of lights from the direct transmission image formed by the lights Y0X0 corresponds to the areas of the upper faces Y0 and X0 that form the flat portion. Further, the sum of intensities of lights from the refracted transmission image formed by the lights Y1X1, Y1X0, Y1X2, Y0X1, Y0X2, Y2X1, Y2X0 and Y2X2 corresponds to the areas of the slopes Y1, Y2, X1 and X2 that are the refracting surfaces. Here, when the sum PW1 of intensities of lights from the refracted transmission image formed by the lights Y1X1, Y1X0, Y1X2, Y0X1, Y0X2, Y2X1, Y2X0 and Y2X2 becomes greater than the sum PW0 of intensities of lights from the direct transmission image, the viewer recognizes the resulting image as a double image such as a ghost image. Consequently, the image quality of the projection image deteriorates.

The present embodiment has an arrangement in which PW0≧PW1 is satisfied. For this reason, the viewer is allowed to view an image that is seamless, smooth and less susceptible to roughened texture without recognizing a light-shielding part on the periphery of a direct transmission image that is the original projection image of the pixel. Moreover, it is possible to prevent the viewer from recognizing a poor image such as a double image. Moreover, an inequality, PW0>PW1, is preferably satisfied. More preferably, an inequality, PW0>0.9× PW1, is satisfied. Thus, it becomes possible to more effectively prepare an image that is seamless and less susceptible to roughened texture.

Figure 28A:
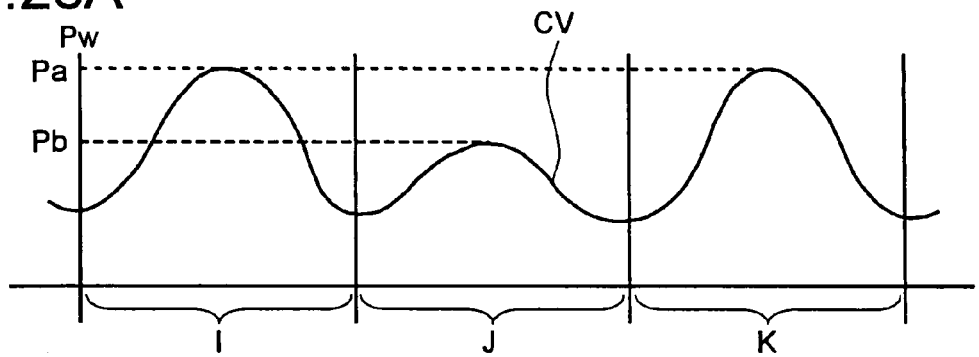
FIG. 28A is a graph of a light intensity distribution of a projection image.

The following description will discuss the light intensity distribution on a cross-section of the screen 116 (FIG. 1) that is the projection surface according to the present embodiment. FIG. 28A shows a light intensity distribution of a projection image on the screen 116. In FIG. 28A, the axis of abscissas indicates positional coordinates on the screen 116, and the axis of ordinates indicates a predetermined unit of intensity, respectively. For convenience of explanation, the following description will discuss a B-B cross-section that passes through the virtually center of three areas, that is, area I of the direct transmission image, area K of adjacent direct transmission image and area J located between these areas, shown in FIG. 27. In other words, a portion indicated by code I on the axis of abscissas in FIG. 28A corresponds to area I in FIG. 27, a portion indicated by code J corresponds to area J in FIG. 27, and a portion indicated by code K corresponds to area K in FIG. 27.

As shown in FIG. 28A, in the screen 116, a first peak value Pa of the intensity distribution of area I and area K of the projection image of the pixel formed by lights from the upper faces YO and XO that are the flat portion is greater than a second peak value Pb of the intensity distribution of area J of the projection image of the pixel formed by lights that are transmitted through the slopes Y1, Y2, X1 and X2 that are the refracting surfaces. For example, the second peak value Pb is set to a power distribution virtually half the first peak value Pa. This power distribution in the light intensity can be controlled in accordance with the area ratios between the upper faces YO, XO and the slant faces Y1, Y2, X1, and X2 of the prism elements 2410a, 2410b.

Moreover, in an area between the first peak value Pa and the second peak value Pb, the light intensity is set in accordance with a predetermined intensity distribution curve CV. With this arrangement, the viewer is allowed to sense an appropriate light intensity distribution in an area between the direct transmission image and the adjacent direct transmission image. For this reason, since an appropriate degree of light intensity is prepared between the adjacent pixel images, it becomes possible to obtain an image with high resolution on appearance. Thus, the viewer is allowed to view a sharp projection image that is smooth and less susceptible to roughened texture, without recognizing the light-shielding part.

Figure 28B:
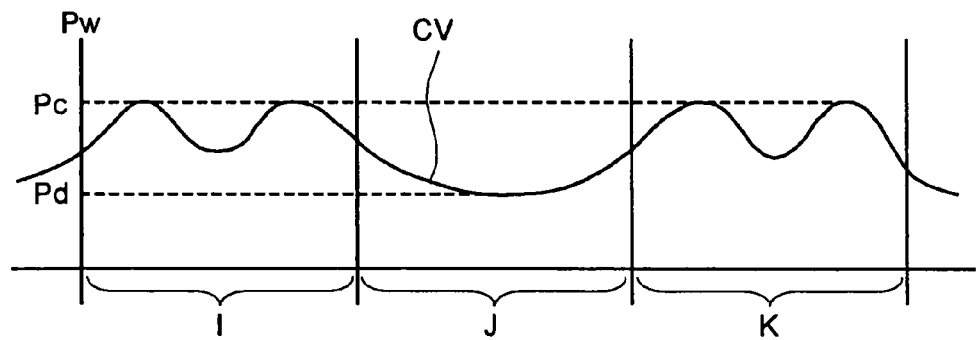
FIG. 28B is a graph of another light intensity distribution of the projection image.
Figure 28C:
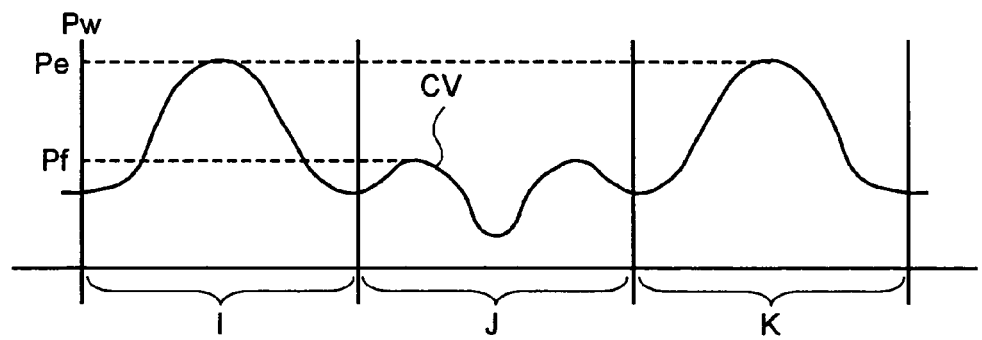
FIG. 28C is a graph of still another light intensity distribution of the projection image.
Figure 28D:
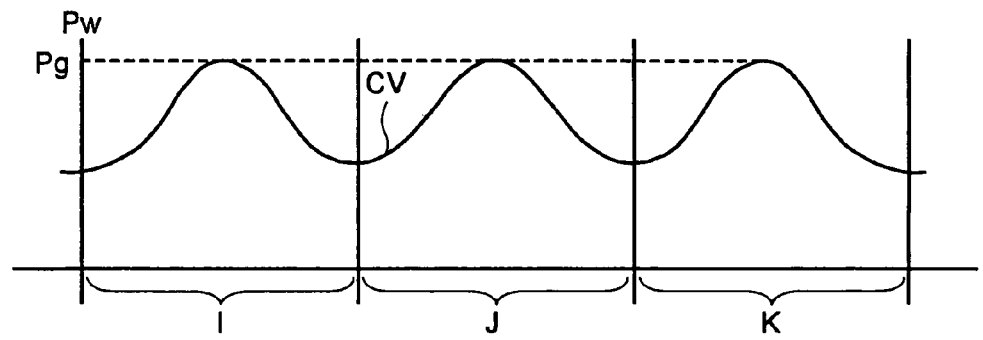
FIG. 28D is a graph of a light intensity distribution of the projection image.

FIG. 28B, FIG. 28C, and FIG. 28D graphs of examples of the light intensity distribution. In FIG. 28B, each of the two first peak values Pc in the light intensity distribution of areas I and K is greater than the second peak value Pc of area J. In FIG. 28C, the first peak value Pe in the light intensity distribution of area I and area K is greater than the two second peak values Pf of area J. In FIG. 28D, the first peak value Pg of each of the light intensity distributions of area I and area K is virtually the same value as the second peak value Pg of area J. With these power distributions, it is possible to make the black matrix image 220P (FIG. 4) less recognizable, and consequently to provide a seamless, natural projection image. Moreover, by changing the area ratios between the upper faces Y0, X0 and the slopes Y1, Y2, X1, X2 so as to form a desired distribution curve in the light intensity distribution, it is possible to obtain, for example, an image that gives tight and sharp impressions. When a projector having a liquid crystal panel 120R or the like of the present invention is used for projecting, for example, both of a photographic image and a text image such as characters and graphs, the viewer is allowed to view both of the images with high quality.

Ninth Embodiment

Figure 29:
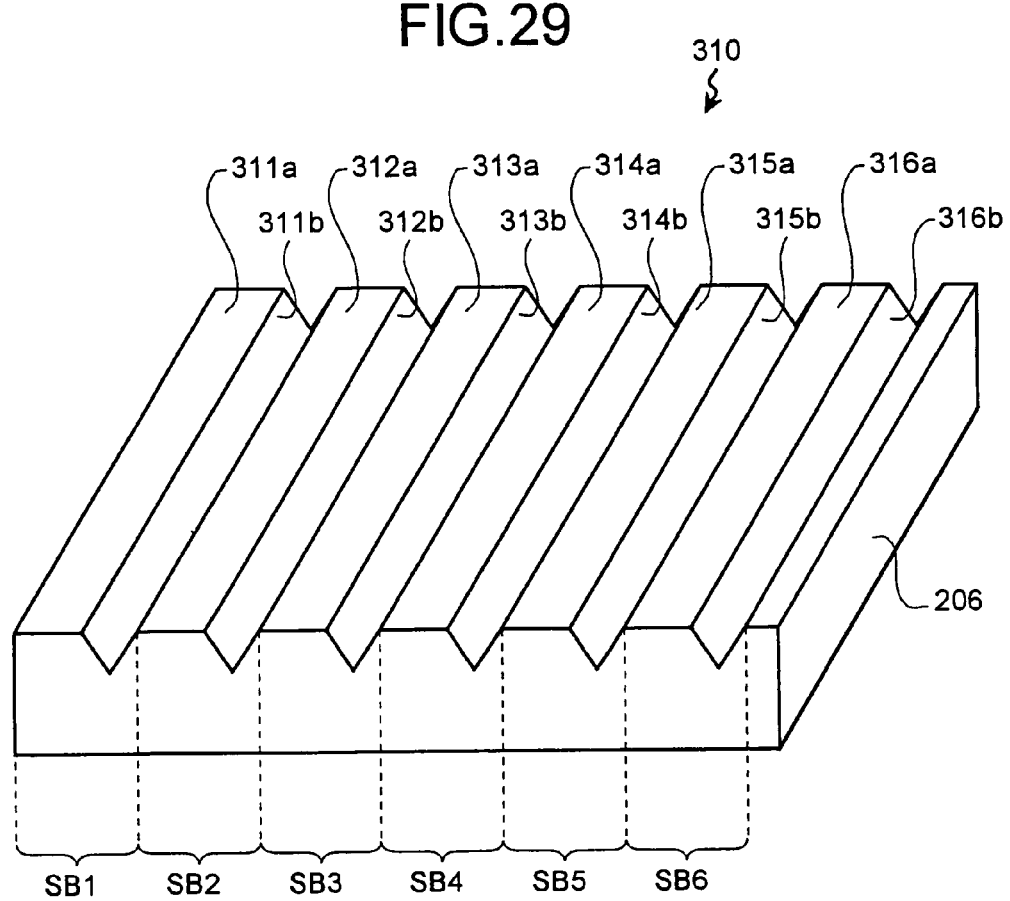
FIG. 29 is a schematic of a group of prisms according to a ninth embodiment of the present invention.

The following description will discuss a process for manufacturing a microstructure element according to the ninth embodiment. For example, the group of prisms 210 according to the first embodiment is manufactured as a microstructure element. Since the basic structure of the liquid crystal panel is the same as that according to the first embodiment, the same parts are indicated by the same reference numerals, and overlapping description is omitted. FIG. 29 is a schematic of a structure viewed in a perspective direction of a group of prisms 310 in an intermediate process during manufacturing processes of the group of prisms 210. Here, for convenience of explanation in all the descriptions, a structure having a concave-convex shape opposite to the shape of the group of prisms 210 shown in FIG. 2 is used for the explanations. Even in the case of the group of prisms having the opposite concave-convex shape, optical functions and effects thereof are basically the same as the group of prisms shown in FIG. 2.

An output-side dust-preventive transparent plate 206 is constituted by parallel flat glass plates having a rectangle shape. Further, a prism element 211 is formed on one of the faces of the parallel flat glass plates by using a method that is described later. First, a sequence of machining processes is explained. One of the faces of the output-side dust-preventive transparent plate 206, which forms a machining area, is divided into band-shaped sub-areas SB1, SB2, SB3, SB4, SB4, SB5 and SB6. Here, the number of divisions is set to at least not less than five. A flat portion 311a and a refracting surface 311b, which form a first shape, are formed on one of the sub-areas SB1. A V-shaped groove is formed by the two refracting surfaces 311b. Next, based upon the one of the sub-areas SB1, a flat portion 313a and a refracting surface 313b, which form a second shape, are formed on the sub-area SB3 located farther than the sub-area SB2 adjacent to the sub-area SB1. Successively, based upon the sub-area SB3 on which the second shape is formed, a flat portion 315a and a refracting surface 315b, which form a second shape, are formed on the sub-area SB5 located farther than the sub-area SB4 adjacent to the sub-area SB3 on which the second shape is formed. Then, the same sequence is repeated so that, in succession, the V-shaped grooves constituted by the flat portion and the refracting surface are formed on the sub-area SB2, sub-area SB4 and sub-area SB6.

Thus, it is possible to disperse variations in the machining positions caused by the external environment (disturbance). Consequently, independent of disturbances, it is possible to accurately manufacture prism elements 211 that are desired fine-shape elements. Further, machining processes having the same sequence as described above are carried out in a direction virtually orthogonal to the length direction of the V-shaped grooves. Thus, a group of prisms 210, constituted by a plurality of prism elements 211 that are aligned in a virtually orthogonal lattice form, is manufactured.

Moreover, flat portions 311a and refracting surfaces 311b are continuously formed. Here, each flat portion 311a and each refracting surface 311b are allowed to form one unit shape. In this manner, according to the present embodiment, the first shape and the second shape are identical to each other. In the processes, a plurality of unit shapes are allowed to form fine shapes at random positions in a dispersed manner so that adjacent machining portions are not continuously formed. By allowing the flat portion 311a and refracting surface 311b to form a single unit shape, the area of the refracting surface 311b corresponding to the slope of the V-shaped groove is made relatively constant.

More preferably, each of the fine shapes is always formed in a sub-area located at a position with a predetermined interval. For example, the machining area is divided into 25 sub-areas SB1 to SB25. Then, after the sub-area SB1 has been machined as the starting point, the sub-area SB6, located at a position apart from the sub-area SB1 by a distance corresponding four sub-areas, is machined. In the same manner, the sub-area SB11, the sub-area SB16 and the sub-area SB21 are machined in succession. Next, returning to the sub-area SB2, this area is machined as a starting point. The sub-area SB7, located at a position apart from the sub-area SB2 by a distance corresponding to four sub-areas, is machined. In the same manner, the sub-area SB12, the sub-area SB17 and the sub-area SB22 are machined in succession. Returning to the sub-area SB3, this area is machined. This sequence is repeated until all the 25 sub-areas have been machined. Consequently, influences from disturbance and the like can be dispersed evenly.

Tenth Embodiment

Figure 30:
FIG. 30 is a schematic of a group of prisms according to a tenth embodiment of the present invention.

FIG. 30 is a cross-section of a group of prisms 410 according to the tenth embodiment of the present invention. According to the ninth embodiment, the V-shaped groove has virtually the same pitch and virtually the same depth. In the case of such a structure, diffraction light sometimes occurs due to the periodic property of the structure of the group of the prisms. The diffraction light causes degradation in the quality of a projection image.

According to the present embodiment, the first shape and the second shape are made different from each other. With respect to the machining sequence of the fine shapes, after machining a V-shaped groove, data are set by using random numbers so that, in the same manner as the ninth embodiment, adjacent grooves are not continuously machined. Based upon the data thus set, V-shaped grooves are successively machined. After completion of the cutting processes for V-shaped grooves along parallel straight lines in a predetermined direction, V-shaped grooves are formed in the same manner in directions virtually orthogonal to the predetermined direction. After the machining processes of the V-shaped grooves in the two directions orthogonal to each other, cutting processes are carried out on the flat portion 411a. Upon completion of one flat portion 411a, another flat portion located at a predetermined position is machined. In this manner, by carrying out cutting processes in a random order, it is possible to prevent influences of disturbance from concentrating on a specific area. Thus, a group of prisms 410, constituted by microstructure elements, is formed over all the areas with uniform precision. Moreover, by forming the group of prisms 410 in fine shapes at random, it becomes possible to reduce diffracted light. Consequently, the viewer is allowed to view a projection image with high quality.

Moreover, based upon the F number of the integrator 104 shown in FIG. 1 and the F number of the projection lens 114, the unit area on the liquid crystal panel 120R to be projected on the screen 116 is effectively determined. More specifically, when the F number of the integrator 104 and the F number of the projection lens 114 are different from each other, the unit area is determined by the smaller F number. When the F number of the integrator 104 and the F number of the projection lens 114 are the same, the unit area is determined by using the same F number.

The liquid crystal panel 120R is illuminated by the integrator 104 in a multiplex manner. For this reason, the area ratio between the flat portion and the refracting surface in the unit area of the liquid crystal panel 120R corresponds to the ratio of quantities of lights between the transmitted lights from the flat face and the refracted lights from the refracting surface. According to the present embodiment, the sum of areas of the refracting surfaces that are directed in a predetermined direction and the sum of areas of the flat portions with respect to each unit area on the liquid crystal panel 120R are made equal to each other. Thus, the quantities of light of the refracted light and the direct transmission light from each unit area on the liquid crystal panel 120R are made virtually the same. With this arrangement, the viewer is allowed to view a high-quality projection image without recognizing the black matrix of the black matrix layer 203.

(Process for Manufacturing V-shaped Grooves)

Figure 31A:
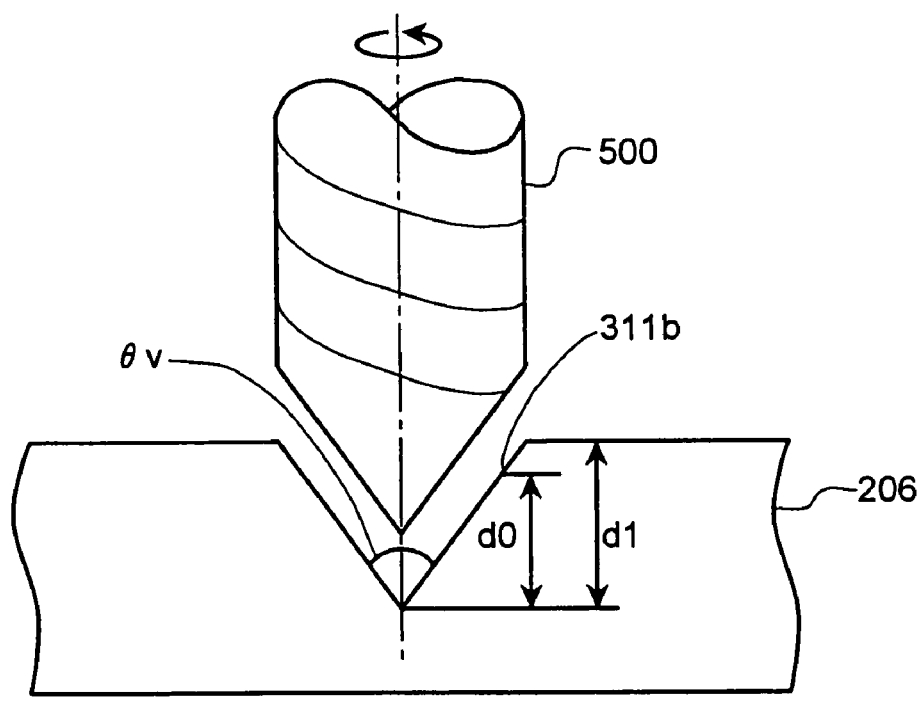
FIG. 31A is a schematic for illustrating a process for manufacturing a group of prisms.
Figure 31B:
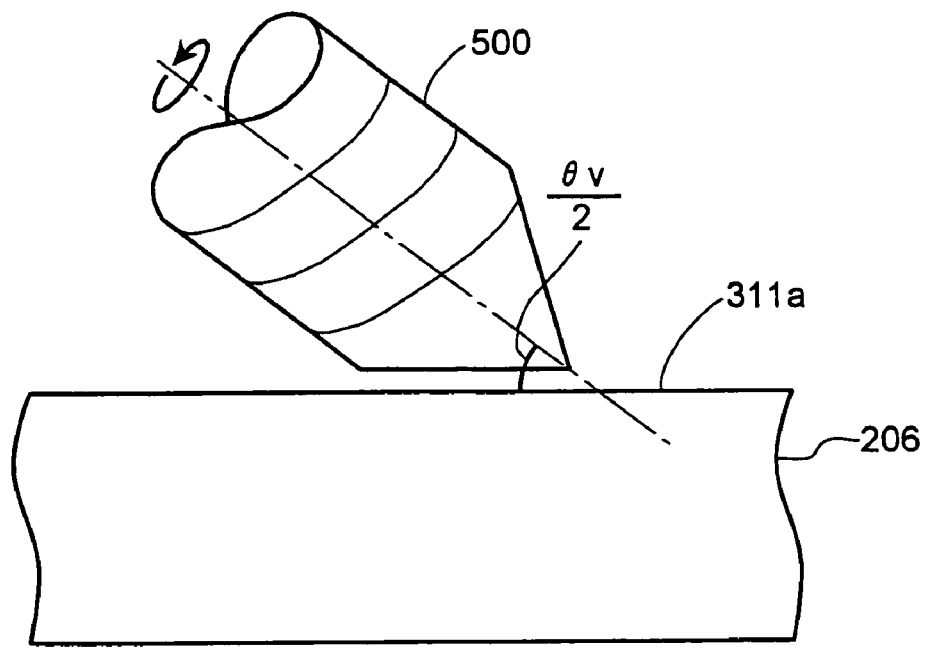
FIG. 31B is another schematic for illustrating a process for manufacturing the group of prisms.

186 Referring to FIG. 31A and FIG. 31B, the following description will discuss a process for manufacturing V-shaped grooves. The V-shaped groove is constituted by two refracting surfaces 311b. When the V-shaped groove is formed, a machining process is carried out on the output-side dust-preventive transparent plate 206 in a virtually perpendicular direction by using a cutting tool 500 having an angle of $\theta v$, as shown in FIG. 31A. In this case, the cutting depth is set to a depth d1 that is greater than a depth d0 that is originally required for the prism element 211. The cutting depth is determined by adding an amount of a machining variation caused by influences from disturbance in the cutting machine to the originally required depth d0. Thus, even when the cutting machine is subjected to influences from disturbance, it is possible to reduce the generation of un-machined areas. Moreover, upon forming the flat portion 311a, a cutting process is carried out with the cutting tool 500 being tilted by an angle $\theta v/2$ with respect to the output-side dust-preventive transparent plate 206, as shown in FIG. 31B.

Eleventh Embodiment (Flow Chart for the Manufacturing Method)

Figure 32:
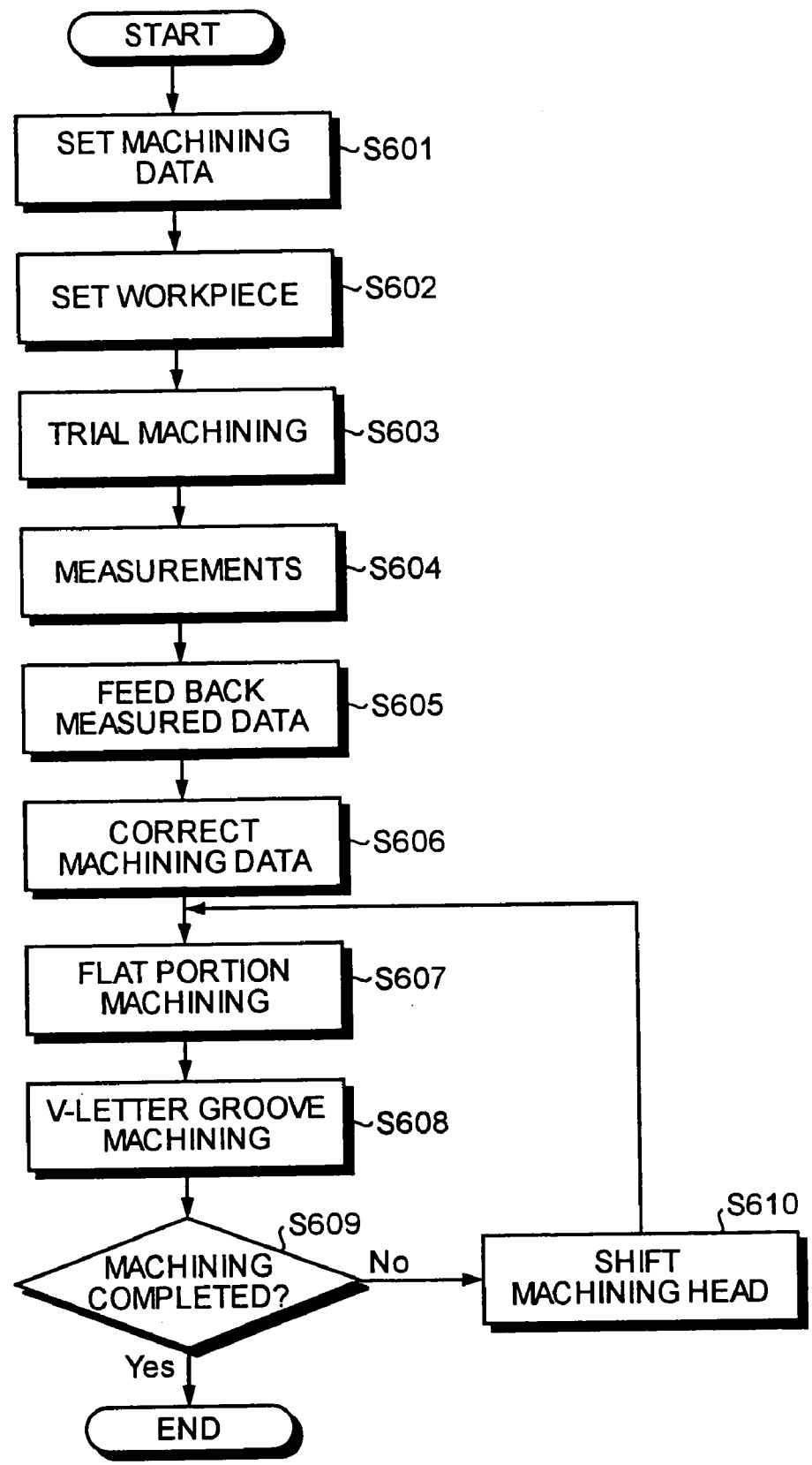
FIG. 32 is a flowchart of a process procedure for manufacturing a group of prisms according to an eleventh embodiment of the present invention.

Referring to FIG. 32, the following description will discuss a sequence of manufacturing processes for a V-shaped groove according to the eleventh embodiment. First, at step S601, in order to form a desired fine shape, the operator inputs machining data, such as a machining position, a machining angle, a machining depth, the number of revolutions of a cutting tool and a machining speed, to a control unit of a cutting machine. Then, a cutting tool having a required shape is attached to a cutting tool holder of the cutting machine. At step S602, a work, which is an object to be machined, is set to a holder in the cutting machine. The work is, for example, parallel flat glass plates. At step S603, a trial machining process for, for example, V-shaped grooves that correspond to the first shape, is carried out on a test machining area that is different from an area on which a group of prisms are formed of the parallel flat glass plates. A peripheral area or the like of the parallel flat glass plates can be used as the test machining area.

At step S604, while maintained as they are without being removed from the work holder, the parallel flat glass plates are subjected to measurements with respect to the fine shape of the V-shaped grooves formed in the trial machining, by using a laser microscope and an atomic force microscope. With respect to parameters for the measuring data, at least one parameter selected from the group consisting of the pitch, the angle, the depth and the flat face roughness is preferably used.

At step S605, the difference between the measured data and the machining data is fed back to the machining data. At step S606, based upon the difference value thus fed back, the machining data is corrected. More specifically, the machining angle of the cutting tool, the cutting depth, the pitch, parameters for the flat face machining and the like are corrected. For example, with respect to the corrections for parameters such as the machining angle, the cutting depth, the groove pitch and the flat face machining, the angle correction of the cutting tool, the depth correction of the cutting tool, the feeding pitch correction, and the feeding pitch correction are respectively carried out. The trial machining processes are finished after these processes. Next, based upon the corrected data, at step S607, the flat portion 311a is formed with the angle of the cutting tool 500 being tilted by θv/2, as shown in FIG. 31B. At step S608, the V-shaped grooves constituted by the refracting surfaces 311b are formed as shown in FIG. 31A.

At step S609, it is determined whether or not the machining processes of the V-shaped grooves have been completed. In the case of "No" in the result of the determination, at step 610, the position of the machining head holding the cutting tool 500 is shifted through the sequence. Then, the machining processes of step S607 and step S608 are carried out repeatedly. In the case of "Yes" in the result of the determination at step S609, the machining process is completed.

As described above, due to influences from disturbance, defective setting of relative positions between the machining cutting tool and the machining work and the like, a desired shape as defined by the machining data sometimes is not obtained, with the result that it is not possible to provide desired machining precision. In the manufacturing method according to the present embodiment, the first shape, preliminarily machined at the trial machining area, is actually measured. Then, by comparing the measured data obtained by measuring the fine-shape elements with the original machining data, the difference between the two pieces of data is calculated. The difference is fed back to the machining data. Next, based upon the machining data corrected by the quantity of the difference, the first shape forming process and the repeating process are carried out. Thus, it is possible to carry out a shape-machining process that is less susceptible to influences from disturbance and the like.

Here, with respect to the flat plates constituting the output-side dust-preventive transparent plate, not particularly limited to glass members, for example, transparent resin such as acrylic resin may be used. Moreover, flat plates on which fine shapes are formed may be subjected to a plating process to form a mold. Moreover, in order to directly form a mold, a hard member, such as a heavy alloy (trade name), may be machined by using the method. Then, by using the hard member thus machined is used as a mold, a group of prisms 210 is manufactured through a transferring process. Even in the case of the group of prisms formed by duplicating processes through transferring, the unit area on the mold and the area of the flat portion as well as the area of the refracting surface with respect to unit area in the group of prisms thus transferred are made identical to each other. For this reason, even the concave-convex format in the shape is reversed, the same functions are exerted as the optical elements.

Twelfth Embodiment

Figure 33A:
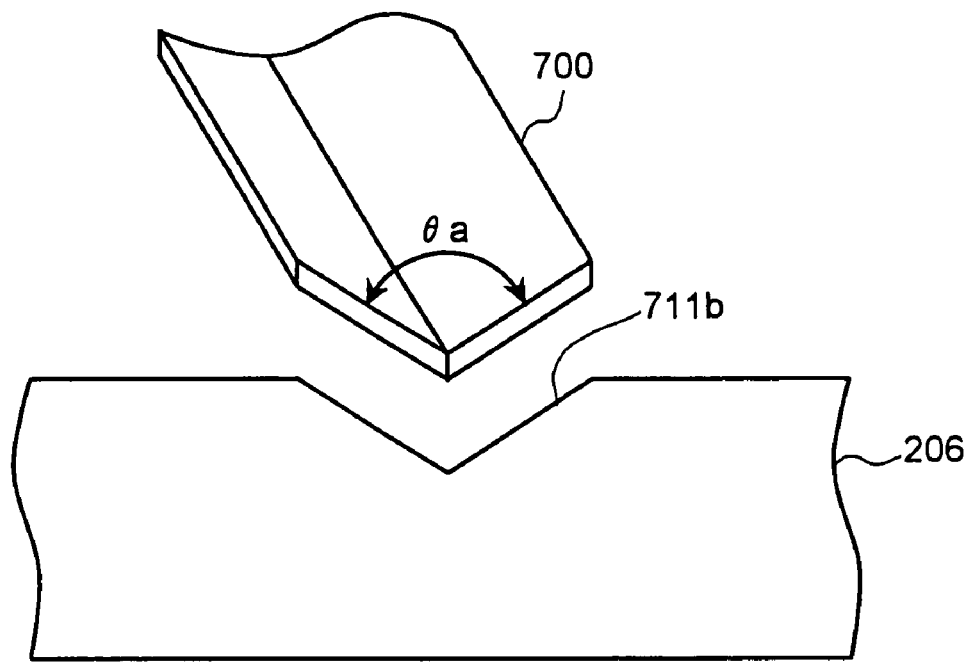
FIG. 33A and FIG. 33B are schematics for illustrating a process for manufacturing a group of prisms.
Figure 33B:
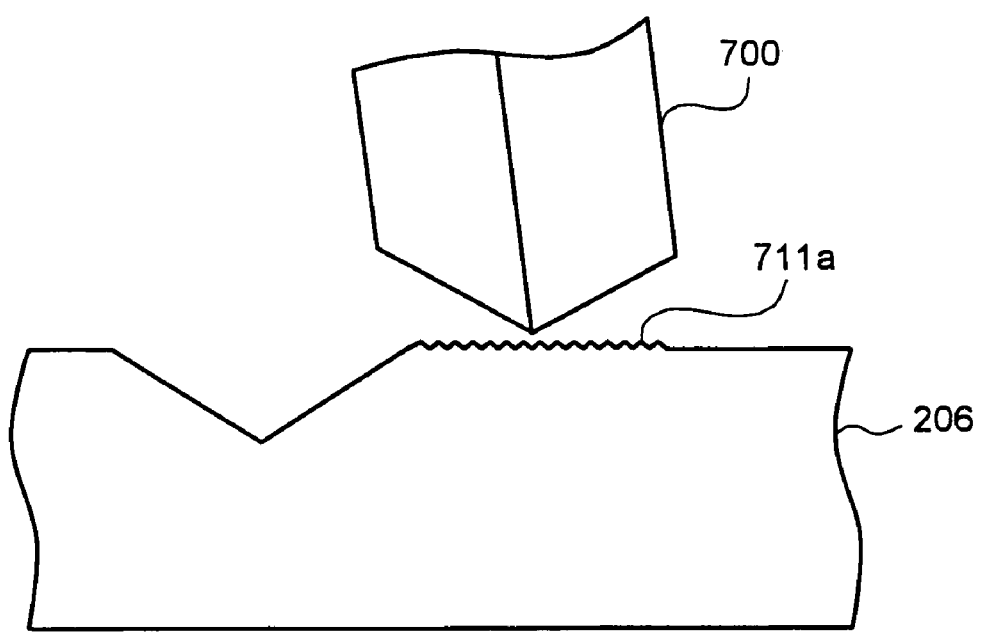
Figure 34A:
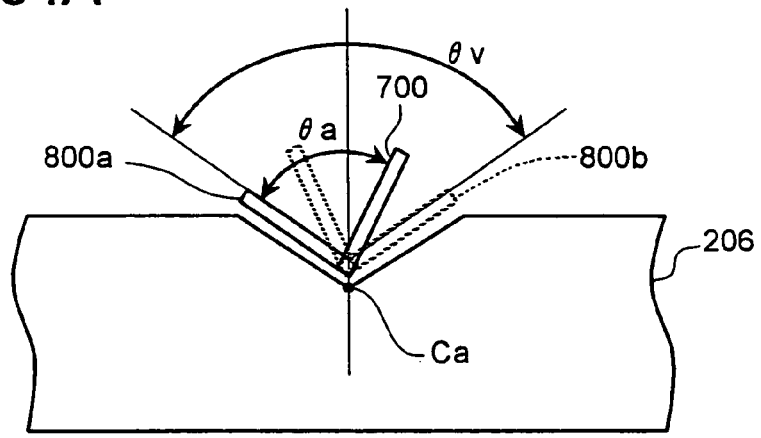
FIG. 34A, FIG. 34B, and FIG. 34C are schematics for illustrating a process for manufacturing V-shaped grooves according to a twelfth embodiment of the present invention.
Figure 34B:
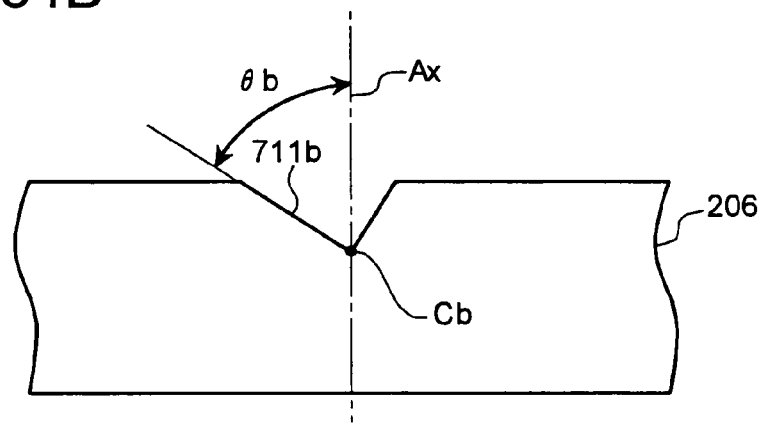
Figure 34C:
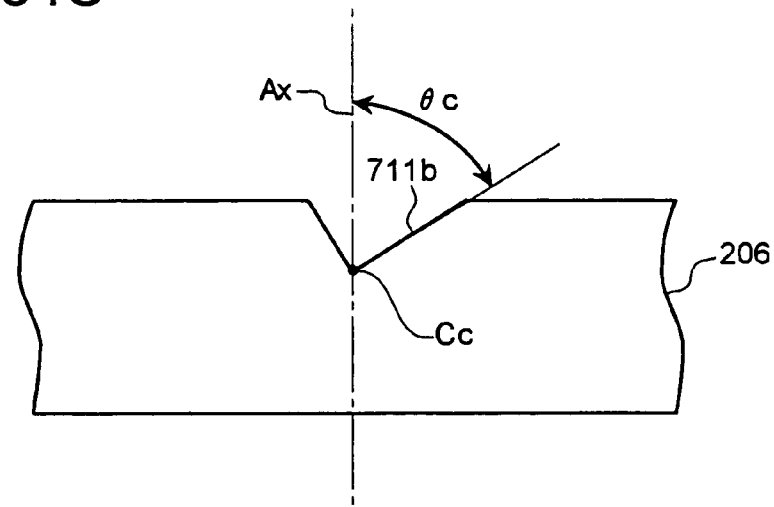

Referring to FIG. 33A and FIG. 33B, the following description will discuss a process for manufacturing V-shaped grooves of a microstructure element according to the twelfth embodiment. Here, a cutting tool 700 has an open angle of θv. As shown in FIG. 33A, by using the V-letter portion of the cutting tool 700, V-shaped grooves are cut and formed. This method is referred to as spring processing. Next, referring to FIG. 34A, FIG. 34B, and FIG. 34C, a sequence of processes for cutting the V-shaped grooves is further explained. Here, for example, suppose that V-shaped grooves are formed by cutting processes of two times. In FIG. 34A, a cutting process is carried out once with the cutting tool 700 being located at a first position 800a. Next, the cutting tool 700 is shifted to a second position 800b, centered on the apex position Ca of the V-letter-shape. More specifically, as shown in FIG. 34B, the first cutting process is carried out with the apex position Cb. At this time, a center axis AX that is virtually orthogonal to the output-side dust-preventive transparent plate 206 that forms flat plates and one of the refracting surfaces 711b that corresponds to one side of the cutting tool 700 are allowed to make an angle θb. Next, as shown in FIG. 34C, the second cutting process is carried out with the apex position Cc. In this state, the center axis AX and the other refracting surface 711b are allowed to make an angle θc. Then, the cutting tool 700 is controlled so that the apex position Cb and the apex position Cc are made coincident with the apex position Ca. The cutting tool 700 is further controlled so that the apex angle θv of the V-shaped groove corresponds to the sum of the angle θb and the angle θc. After having cut and formed the V-shaped groove made of the two refracting surfaces 711b, a machining process is carried out on the flat portion 711a, as shown in FIG. 33B. In the machining process of the flat portion 711a, the feeding pitch of the cutting tool tip is set to a micron order. Thus, it is possible to achieve an Rz degree of flatness in the order of Rz3/100 micrometers.

The sequence of processes to form V-shaped grooves according to the present embodiment is different from those according to the eleventh embodiment in that in the trial machining process, a process, which carries out shape-machining operations of not less than two times at the same position Ca as shown in FIG. 34B and FIG. 34C, is prepared. With respect to those processes that are the same as those according to the eleventh embodiment, the overlapping description thereof is omitted. According to the present embodiment, first, after the trial cutting process at the first position 800a, the angle θb is measured by a laser microscope and an AFM. Next, after the trial cutting process at the second position 800b, the angle θc is measured. Thus, the angle θv (FIG. 34A) at which the slopes of the V-letter shape are formed is calculated based upon the following equation $$\theta v = \theta b + \theta c$$

Moreover, in the trial cutting processes of two times, the apex position θb and the apex position θc are measured, and the machining data is corrected so that these positions are made coincident with each other at an apex position θa. Moreover, with respect to the flat portion 711a, the flat face roughness is measured. Here, the parameters for the measuring data preferably include at least one of the pitch, the angle and the depth. In this manner, according to the present embodiment, the correcting processes for the machining angle, the apex position and the flat face roughness are respectively carried out through cutting tool angle correction, correction of cutting tool imaginary apex position and feeding pitch correction. With this arrangement, even when a fine-shape machining process is carried out by changing the cutting tool angle at the same position, it is possible to obtain a desired fine shape.

Thirteenth Embodiment

Referring to FIG. 35, the following description will discuss a sequence of manufacturing processes of a microstructure element according to the thirteenth embodiment. The present embodiment is different from the other embodiments in that, after forming V-shaped grooves at random positions, a flat portion is machined. First, at step S901, in order to form a desired fine shape, the operator inputs machining data, such as a machining position, a machining angle, a machining depth, the number of revolutions of a cutting tool and a machining speed, to a control unit of a cutting machine. Then, a cutting tool having a required shape is attached to a cutting tool holder of the cutting machine. At step S902, a work, which is an object to be machined, is set to a holder in the cutting machine. The work is, for example, parallel flat glass plates. At step S903, a trial machining process for a refracting surface 711b and a flat portion 711a that constitute, for example, a V-shaped groove that corresponds to the first shape, is carried out on a test machining area that is different from an area on which a group of prisms are formed of the parallel flat glass plates. A peripheral area or the like of the parallel flat glass plates can be used as the test machining area. At step S904, while maintained as they are without being removed from the work holder, the parallel flat glass plates are subjected to measurements in the same manner as the embodiments.

At step S905, the difference between the measured data and the machining data is fed back to the machining data. At step S906, based upon the difference value thus fed back, the machining data is corrected. More specifically, the apex position of the cutting tool, the machining angle, the cutting depth, the pitch, parameters for the flat face machining and the like are corrected. Next, after finishing the trial machining process, machining processes for a group of prisms are carried out. At step S907, based upon the data corrected through the feeding back, machining processes for the V-shaped grooves are carried out. For example, with respect to the depth of the V-shaped grooves, the cutting process is carried out at the depth that is determined by adding the error quantity of the machining device. Next, at step S908, the machining head is shifted to a randomly selected position. At step S909, it is determined whether or not the cutting processes of the V-shaped grooves have been completed. In the case of "No" in the result of the determination at step S909, the cutting processes of the V-shaped grooves are further continued. For example, after a V-shaped groove has been formed along a first straight line, the machining head is shifted, and a V-shaped groove is formed along a second straight line that is parallel to the first straight line and is not adjacent thereto. After all the machining processes of the V-shaped grooves in one of the directions have been completed, V-shaped grooves are randomly formed by repeating the same sequence of processes in a direction virtually orthogonal to the direction. In this manner, by forming the V-shaped grooves at randomly selected positions, it becomes possible to evenly disperse deviations in the cutting depth, that is, deviations in the area of the V-shaped slope, over the flat plates.

In the case of "Yes" in the result of the determination at step S909, cutting processes for the flat portion 711a are carried out at step S910. Further, at step S911, it is determined whether or not all the cutting processes for the flat portion 711a have been completed. In the case of "No" in the result of the determination at step S911, at step S912, the machining head holding the cutting tool 700 is shifted to a position preliminarily selected randomly. Then, the same cutting processes as step S910 are repeated. In the case of "Yes" in the result of the determination at step S911, the processes are completed.

Fourteenth Embodiment

Figure 36A:
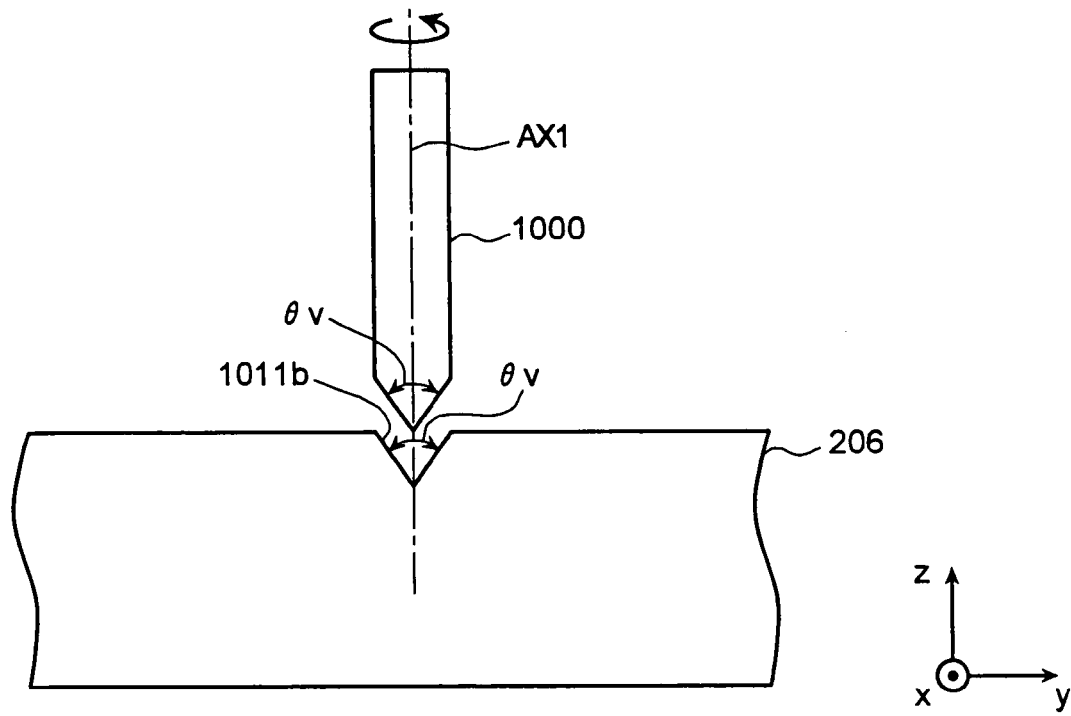
FIG. 36A and FIG. 36B are schematics for illustrating a process for manufacturing a group of prisms according to a fourteenth embodiment of the present invention.

FIG. 36A is a schematic for illustrating a process for manufacturing a microstructure element according to the fourteenth embodiment. The tip of a machining grinding stone 1000 has an angle θv that is identical to the apex angle θv of the V-shaped groove formed by two refracting surfaces 1011b. The machining grinding stone 1000 forms a predetermined depth in an output-side dust-preventive transparent plate 206 that forms flat plates in the z-direction, while rotating centered on the axis AX1. As described above, the predetermined depth is set by adding a variation width in the machining device precision to the depth of the V-shaped groove.

Figure 36B:
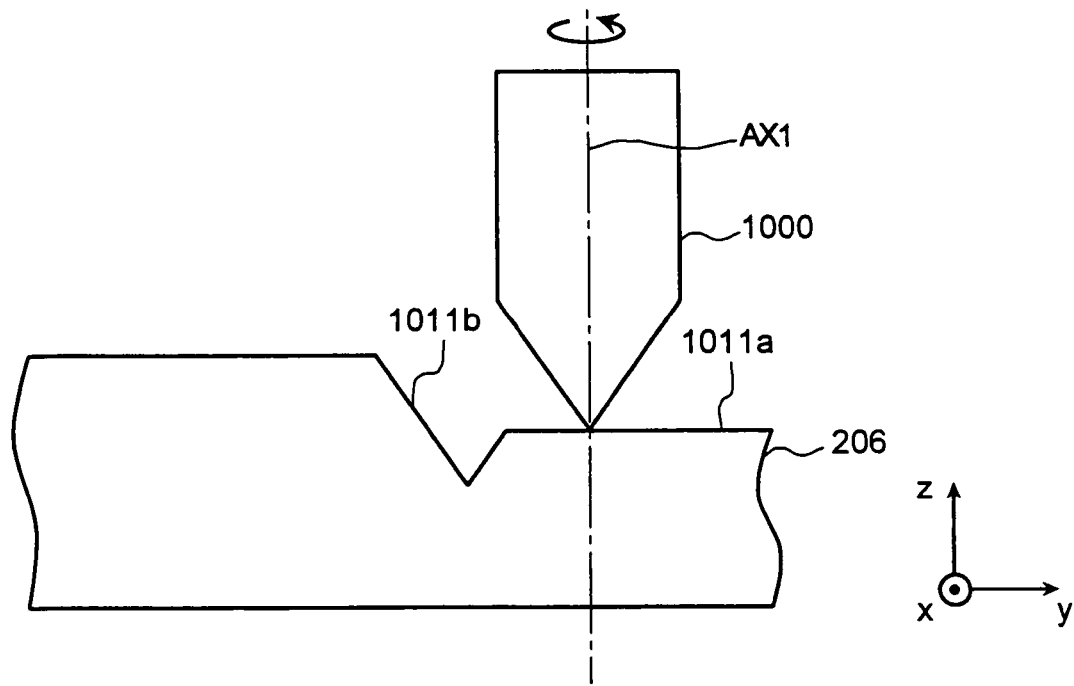
Figure 37A:
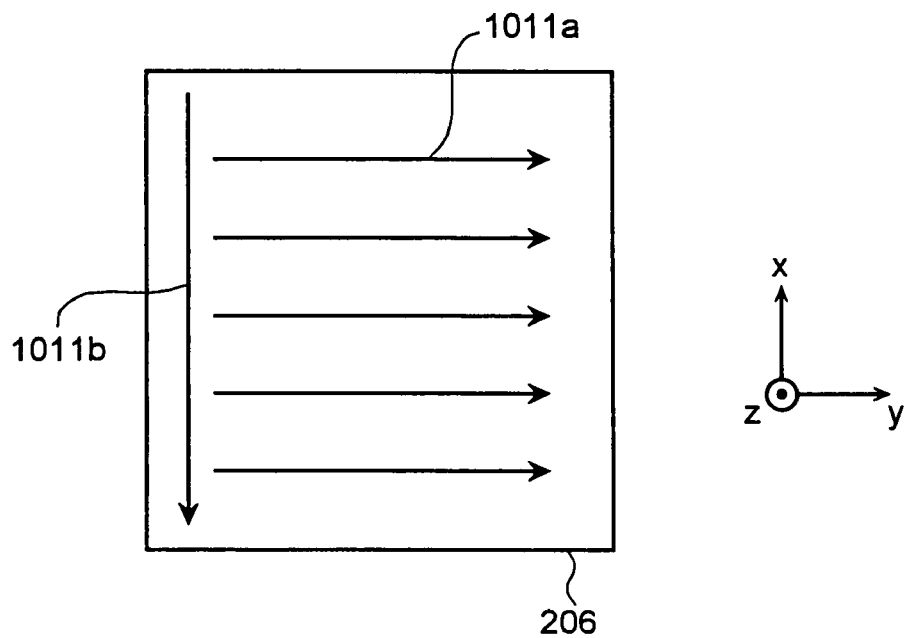
FIG. 37A and FIG. 37B are schematics for illustrating a process for manufacturing a group of prisms according to the fourteenth embodiment.
Figure 37B:
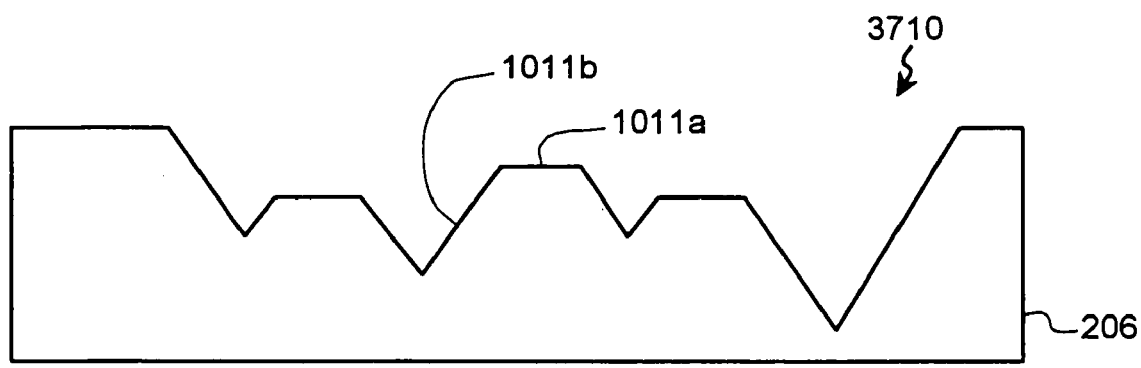

FIG. 36B is a schematic for illustrating a method for forming a flat portion 1011a by using the machining grinding stone 1000. The machining grinding stone 1000 is shifted in the z-direction by a predetermined distance, while being rotated. Then, it is stopped at the position of the flat portion 1011a, and the cutting process is carried out on the flat portion 1011a in the y-direction. In this manner, as shown in FIG. 37A, first, refracting surfaces 1011b that form each of the V-shaped grooves are repeatedly formed through the sequence as described in the ninth embodiment. Next, the flat portion 1011a is formed through the same sequence. FIG. 37B shows a cross-sectional structure of a group of prisms 3710 that are microstructure elements manufactured according to the present embodiment. In the same manner as the respective embodiment, it is possible to carry out machining processes for the V-shaped grooves constituted by the refracting surfaces 1011b and the flat portion 1011a with desired precision.

Moreover, a Ni mold may be manufactured by applying an electroless plating process to the microstructure elements obtained through the manufacturing methods according to the respective embodiment. Thus, duplicated products are prepared through transferring processes using the Ni mold so that it becomes possible to easily manufacture microstructure elements at low costs.

Fifteenth Embodiment

Figure 38:
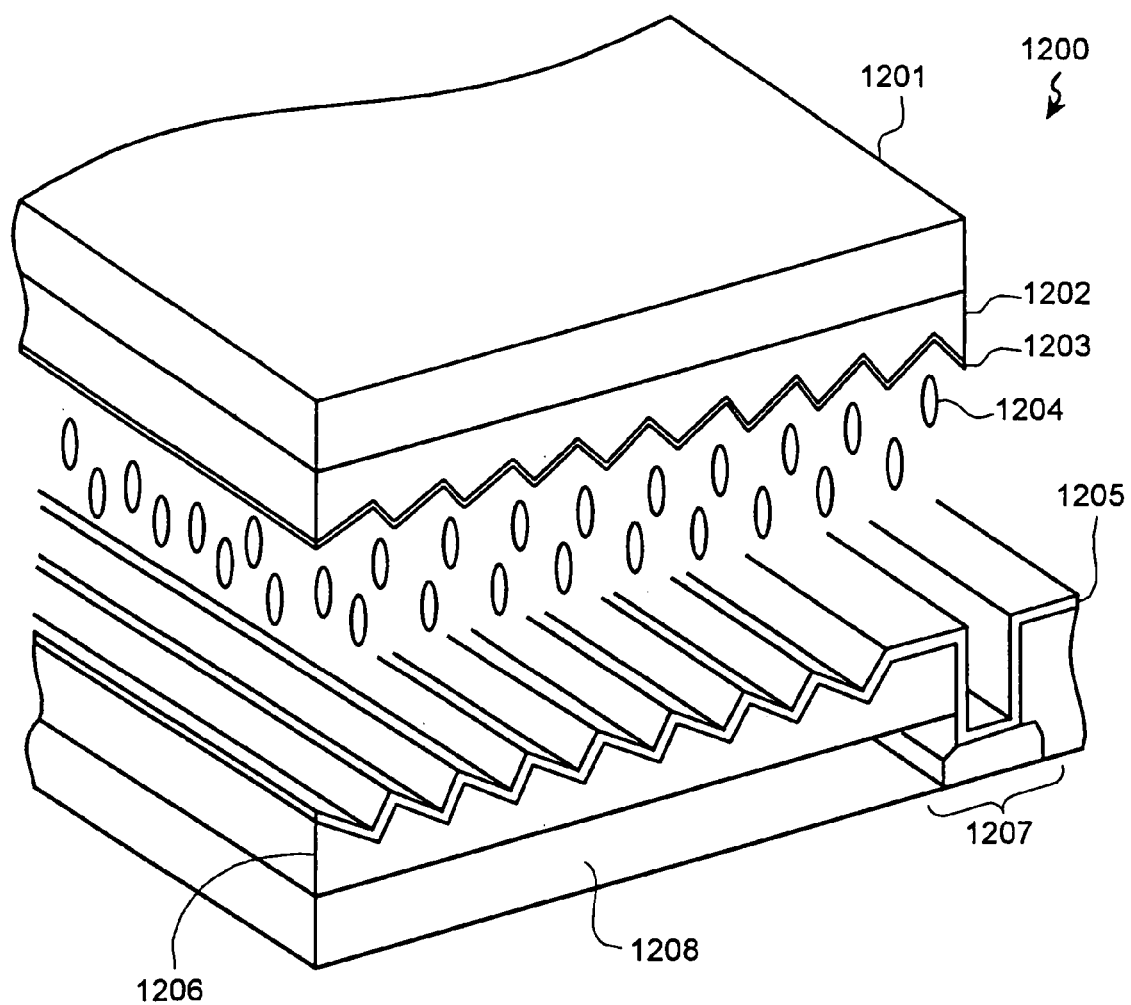
FIG. 38 is a perspective view of a space light modulating apparatus according to a fifteenth embodiment of the present invention.
Figure 39:
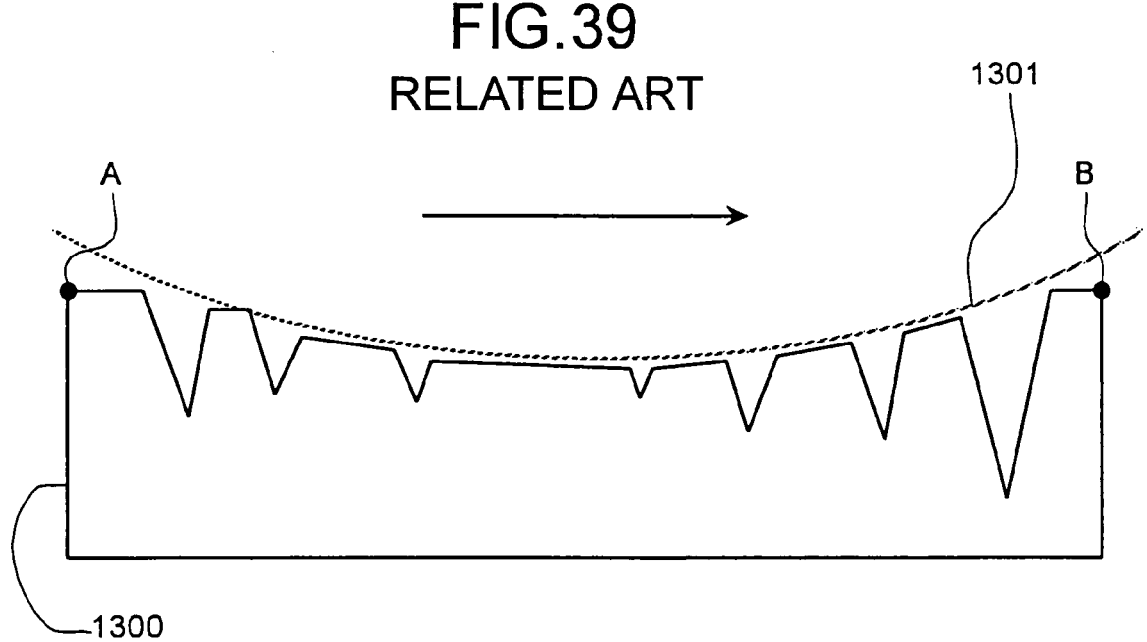
FIG. 39 is a schematic of a group of prisms according to a conventional technology.

FIG. 38 is a perspective cross-sectional view that shows a space light modulating apparatus 1200 according to the fifteenth embodiment of the present invention. The space light modulating apparatus 1200 is a transmission-type liquid crystal space light modulating apparatus. Here, FIG. 38 shows only the main structure, with members such as polarizing plate being omitted. The group of V-shaped grooves 1202 that forms an inorganic perpendicular alignment layer is secured to an opposing substrate 1201 by an optically transparent bonding agent. Transparent electrodes 1203 made of an ITO film or the like are formed in the V-shaped grooves of the group of V-shaped grooves 1202. In the same manner, a group of V-shaped grooves 1206 is secured to a TFT substrate 1208 by an optically transparent bonding agent, and transparent electrodes 1205 are formed in the V-shaped groove portion. Moreover, a thin-film transistor (TFT) unit 1207 is formed on the TFT substrate 1208. Liquid crystal 1204 is sealed between the opposing substrate 1201 and the TFT substrate 1208.

In a state in which no voltage is applied across the transparent electrodes, the liquid crystal molecules are aligned along the V-shaped grooves that serve as an alignment film. In contrast, when a voltage is applied across the transparent electrodes, the liquid crystal molecules are aligned along a perpendicular direction as shown in FIG. 38, in response to the voltage. Thus, it is possible to properly control the quantity of transmission light in accordance with the applied voltage.

The microstructure elements in accordance with the present invention may be applied to, for example, a screen for a rear-projector. The screen of the rear-projector needs to have a Fresnel lens function, and also requires a light diffusing function, in order to effectively direct light toward the viewer. For this reason, by forming the microstructure elements of the present invention on the screen face, it becomes possible to diffuse incident light, and consequently to release the resulting lights toward the viewer. In this manner, not limited to the embodiments, any modification may be made without departing the scope of the present invention.

What is claimed is:

1. A space light modulating apparatus comprising:
   a modulating unit that modulates incident light projected from a light source based on an image signal, and outputs modulated light; and
   a refracting unit that is disposed on an output-side of the modulating unit, and refracts the light from the modulating unit, wherein
   the modulating unit includes
      a plurality of pixels arranged in a matrix format; and
      a light-shielding part placed between the pixels,
   the refracting unit includes a group of prisms formed with a prism element that has at least a refracting surface, and further includes a flat portion virtually parallel to a surface on which the pixels are formed,
   light from one of the pixels is incident on at least a part of the group of prisms,
   a direction of the refracting surface is such that a projection image of the pixels is guided onto a projection image of the light-shielding part on a projection surface at a predetermined distance from the refracting unit, and
   the refracting surface and a reference surface that is formed in a direction perpendicular to an optical axis make a predetermined angle, wherein
   the light transmitted through or reflected on the flat portion from among the light projected from the light source and incident on the pixels propagates substantially straight to form the projection image,
   when an area of one prism element of the group of prisms is defined as a unit area, a ratio between an area of the refracting surface and the unit area corresponds to light intensity of the projection image of the pixels, and
   a sum of intensities of light from the flat portion on the projection surface PW0 and a sum of intensities of light through the refracting surface on the projection surface PW1 satisfy an inequality PW0≧PW1.

2. The space light modulating apparatus according to claim 1, wherein the light-shielding part is in a band shape having a predetermined width arranged in a lattice form, and is formed in such a manner that with respect to a direction of center lines of the light-shielding part, directions along the respective sides of prism elements form virtually an angle of 45°.

3. The space light modulating apparatus according to claim 1, wherein
   the pixels are in a substantially rectangle shape,
   the light-shielding part is in a band shape having a predetermined width arranged in a lattice form, and
   the group of prisms is constituted by prism elements having a polygonal cone shape.

4. The space light modulating apparatus according to claim 3, wherein the group of prisms is constituted by prism elements having a virtually pyramid shape.

5. The space light modulating apparatus according to claim 3, wherein the prism element has the direction of the refracting surface and the predetermined angle in such a manner that an intersection point of center lines of the projection image of the light-shielding part arranged in the lattice form is substantially coincident with one of corners of the projection image of the pixels.

6. The space light modulating apparatus according to claim 1, wherein
   the pixels are in a substantially rectangle shape,
   the light-shielding part is in a band shape having a predetermined width arranged in a lattice form,
   the group of prisms is constituted by two sets of prism elements that have a cross-section of a virtually trapezoidal shape in a first direction with a longitudinal direction in a second direction that is virtually perpendicular to the first direction,
   the two sets of prism elements are arranged in such a manner that the longitudinal directions are virtually at right angles to each other, and
   a slope of the trapezoidal shape corresponds to the refracting surface.

7. The space light modulating apparatus according to claim 1, wherein the prism element has the direction of the refracting surface and the predetermined angle in such a manner that at least parts of the projection images of adjacent pixels are overlapped on the projection image of the light-shielding part.

8. The space light modulating apparatus according to claim 1, wherein the prism element has the direction of the refracting surface and the predetermined angle in such a manner that substantially entire areas of the projection images of adjacent pixels are overlapped on the projection image of the light-shielding part.

9. The space light modulating apparatus according to claim 1, wherein
- a first peak of intensity distribution of the projection images of the pixels formed by light from the flat portion is bigger than a second peak of intensity distribution of the projection images of the pixels formed by light through the refracting surface, and
- light intensity of an area between the first peak and the second peak corresponds to a predetermined intensity distribution curve.

10. A projector comprising:
- a light source that supplies a first-color light, a second-color light, and a third-color light;
- a first-color space light modulating apparatus that modulates the first-color light based on an image signal;
- a second-color space light modulating apparatus that modulates the second-color light based on the image signal;
- a third-color space light modulating apparatus that modulates the third-color light based on the image signal;
- a color-synthesizing optical system that synthesizes the first-color light, the second-color light, and the third-color light, modulated by the first-color space light modulating apparatus, the second-color space light modulating apparatus, and the third-color space light modulating apparatus, respectively; and
- a projection lens that projects light synthesized by the color-synthesizing optical system, wherein
- each of the first-color space light modulating apparatus and the second-color space light modulating apparatus includes
  - a modulating unit that modulates incident light based on an image signal, and outputs modulated light; and
  - a refracting unit that is disposed on an output-side of the modulating unit, and refracts the light from the modulating unit, wherein
    - the modulating unit includes
      - a plurality of pixels arranged in a matrix format; and
      - a light-shielding part placed between the pixels,
    - the refracting unit includes a group of prisms formed with a prism element that has at least a refracting surface, and further includes a flat portion virtually parallel to a surface on which the pixels are formed,
    - light from one of the pixels is incident on at least a part of the group of prisms,
    - a direction of the refracting surface is such that a projection image of the pixels is guided onto a projection image of the light-shielding part on a projection surface at a predetermined distance from the refracting unit, and
    - the refracting surface and a reference surface that is formed in a direction perpendicular to an optical axis make a predetermined angle, wherein
    - the light transmitted through or reflected on the flat portion from among the light projected from the light source and incident on the pixels propagates substantially straight to form the projection image,
    - when an area of one prism element of the group of prisms is defined as a unit area, a ratio between an area of the refracting surface and the unit area corresponds to light intensity of the projection image of the pixels, and
    - a sum of intensities of light from the flat portion on the projection surface PW0 and a sum of intensities of light through the refracting surface on the projection surface PW1 satisfy an inequality $PW0 \geq PW1$.

11. The projector according to claim 10, wherein each of the first-color space light modulating apparatus, the second-color space light modulating apparatus, and the third-color space light modulating apparatus includes the refracting unit.

12. The projector according to claim 10, wherein the refracting unit is disposed on an incident side or the output-side of the color-synthesizing optical system.

13. The projector according to claim 10, further comprising a color-separation optical system that separates light supplied from the light source into the first-color light, the second-color light and the third-color light.

* * * * *